(12) United States Patent
Lörke et al.

(10) Patent No.: US 6,264,738 B1
(45) Date of Patent: Jul. 24, 2001

(54) METHOD OF PRODUCING CEMENT CLINKER AND ASSOCIATED DEVICE

(75) Inventors: Paul Lörke; Alexander Lörke, both of Cologne (DE)

(73) Assignees: Paul Lorke; Alexander Lorke, both of Cologne (DE)

( * ) Notice: Subject to any disclaimer, the term of this patent is extended or adjusted under 35 U.S.C. 154(b) by 0 days.

(21) Appl. No.: 09/029,017

(22) PCT Filed: Nov. 4, 1996

(86) PCT No.: PCT/DE96/02093

§ 371 Date: Feb. 16, 1998

§ 102(e) Date: Feb. 16, 1998

(87) PCT Pub. No.: WO97/16389

PCT Pub. Date: May 9, 1997

(30) Foreign Application Priority Data

Nov. 3, 1995 (DE) .............................................. 195 40 996

(51) Int. Cl.[7] .................................................... C04B 7/43
(52) U.S. Cl. ............................................. 106/739; 106/757
(58) Field of Search ..................................... 106/739, 757

(56) References Cited

U.S. PATENT DOCUMENTS

| | | | |
|---|---|---|---|
| 2,611,714 | * 9/1952 | Witt ...................................... | 106/757 |
| 2,769,719 | * 11/1956 | Vaney .................................... | 106/739 |
| 2,970,925 | * 2/1961 | Dyckerhoff ............................ | 106/739 |
| 4,498,930 | * 2/1985 | Rake et al. ............................ | 106/757 |
| 5,437,721 | * 8/1995 | Kupper et al. ........................ | 106/739 |

* cited by examiner

*Primary Examiner*—Paul Marcantoni
(74) *Attorney, Agent, or Firm*—Reising, Ethington, Barnes, Kisselle, Learman & McCulloch, P.C.

(57) ABSTRACT

Portland cement has hitherto been produced from finely ground raw meal with a residue on the 80 micron sieve of 10–20%, corresponding to a grain size ratio of 0.01–80 micron grains to 80.01–500 micron grains in the raw meal of 9:1 to 4:1. With the novel process, it should be possible to use coarse-ground raw meal. The process involves roasting the raw meal in which the grain size ratio in the basic raw meal components of the 0.01–80 micron grains to the 80.01–2000 micron grains is 1.5:1 to 1:9. The acidic raw meal components with a melting temperature of no higher than 1,300 C. are ground to the same grain size ratio. Also described are devices and processes for grinding and roasting raw meal. The advantages of the invention are reduced energy consumption during grinding of the raw meal, improved throughput of material through ovens and mills and improved cement characteristics.

11 Claims, 11 Drawing Sheets

METHOD OF PRODUCING CEMENT CLINKER AND ASSOCIATED DEVICE

The invention relates to methods of producing cement clinker from basic and acid raw meal components by drying, grinding and heat treatment thereof in stages by means of preheating, calcination, sintering and cooling stages according to the wet and dry process, with heat being supplied from fuel of any type in both the calcination stage and the sintering stage with equipment of any type. Apparatus for carrying out the method is also described.

BACKGROUND OF THE INVENTION

Usually, in order to increase the reactivity of the raw meal, the sieve residues are reduced to the 80 μm and 200 μm sieve, but this leads to an increase in the energy consumption and the operating costs for grinding the raw meal.

It is known that, below a reactivity of the raw meal which is still kept relatively high, the sieve residues on the 80 μm sieve can be raised from approximately 10% up to 20% and on the 200 μm sieve from approximately 1% up to 5%. This corresponds to a grain size ratio of the 0.01–80 μm grain size to the 80.01–500 μm grain size of 9:1 to 4:1. Nevertheless, this is associated with high energy consumption and high operating costs for grinding the raw meal.

The object, therefore, is to set the grain class ratio of the raw meal, particularly of the basic raw meal component, that is to say to grind up the raw meal extremely coarsely, so that the reactivity of the raw meal under extreme coarse grinding is not hindered but favoured, and so that under the extremely changed grain class ratio of the raw meal a method of producing cement by grinding, drying, mixing and then roasting the raw meal is provided with which the necessary energy consumption, and likewise the operating and investment costs for the least possible grinding assemblies required from the point of view of apparatus, are reduced, particularly in the case of grinding raw meal, with a simultaneous increase in the throughput of the raw meal apparatus and the kilns as well as simultaneous reduction of the specific fuel requirement.

The object is achieved by a first example with a method of producing cement in which the basic raw meal component is ground to a grain class ratio of the 0.01–80 μm grain class to the 80.01–500 μm grain class of 1.5:1 to 1:9 so that before the formation of the clinker melt in the sintering zone apart from the conventional topochemically formed $C_2AS$, $C_3A$, $C_{12}A_7$ and $C_4FA$, the easy to melt CS and $C_3S_2$ are largely produced instead of the difficult to melt $C_2S$.

By this measure it is possible to raise the clinker melt content in the sintering stage and to lower the melting temperature, which accelerates the clinker formation and lowers the sintering temperature during the clinker formation. Naturally, in this case the energy consumption during grinding of raw meal is considerably reduced and the output of the grinding plant is increased. The cement properties are improved by the better mineral formation particularly of alite and belite. The discharge of dust from the kiln is reduced thereby, so that the heat loss from the kiln is reduced.

The phenomena which occur in this case are explained as follows:

The clinker formation may be considered as a function of the state of matter (liquid or solid) in the two stages of development. The first stage of development of the mineral formation consists of the topochemical reactions (solid state reactions) and lasts up to 1250° C. The second stage of development of the clinker formation begins at 1250° C. and is principally completed above a temperature of 1300° C. because of the melting process.

It is known from the prior art that in order to lower the fuel requirement during clinker burning and to raise the quality of the clinker it is advantageous to accelerate the rate of mineral formation not only through the melt but also through topochemical reactions. Usually the increased reactivity of the raw meal with unchanged LS II is achieved by relatively fine grinding, relatively low SM and TM and by the use of mineralisers.

The existing conceptions of an optimum fractional composition of the raw meal, i.e. that the content of the particles greater than 80 μm should not amount to more than 10–15%, are not fully substantiated.

As evidence it may be mentioned that due to the solid state reactions between the calcite and $SiO_2$ carrier particles smaller than 60–80 μm premature belite formation because of an increasing time and temperature interval between the alite formation and the belite formation leads to the crystal growth of the topochemically formed belite and of the residual free lime. As a result the dissolving of the recrystallised belite and of the recrystallised free lime in the melt is hindered, which causes a delay in the alite formation, i.e. requires an increase in the sintering temperature. It follows, therefore, that an acceleration of the topochemical reactions in general does not always lead to an increase in the rate of clinker formation. The clinker formation may even be hindered.

The question arises as to how the clinker formation may be optimised.

It is known that the rate of mineral formation through the melt is approximately 10,000–100,000 times higher than through the topochemical reactions. From this it may be concluded that a delay in the topochemical reactions can frequently be made up for at the stage of development of the reactions in the melt. This means that latent reserves for increasing the throughput of the kiln are also located in the sintering zone. It is obvious that at an increased throughput of the kiln, with the other conditions remaining the same, because of a reduction of the specific heat losses the lowest specific energy requirement for the clinker formation can be achieved. For this reason numerous attempts have been made to accelerate the clinker formation and to increase the proportion of clinker melt. However, with the conventional technology for cement production the possibilities described above are greatly restricted because of the necessary properties of the cement and the resulting necessary chemical compositions of the raw meal.

It is, moreover, very important that the rate of clinker formation through the melt is in practice not very dependent upon the size of the particles, particularly of calcite. This is confirmed elsewhere, for example in the crushed stone technology for producing the cement clinker and in metallurgical processes in which the reactions proceed completely in the melt, although the grain size fractions of the starting raw materials may be very coarse-grained (up to 50 mm).

Because of this it may be concluded, contrary to the known conceptions, that hindering of the clinker formation through the melt is not dependent upon the size of the calcite particles (limestone particles) but upon the diversion of the $Ca^{2+}$ ions which are located at the boundary between the melt and solid phases, i.e. at the boundary layer.

Until the boundary layer is saturated as regards the $Ca^{2+}$ ions the dissolution of the solid free lime phase in the melt is hindered.

The elimination of the negative retarding effect of the boundary layer which is saturated with $Ca^{2+}$ ions on the rate of clinker formation can only be achieved by an increase in the reaction surface between the solid and melt phases. For this it is necessary to increase the proportion of melt.

With an increased proportion of clinker melt a mechanical stress is very helpful, since in this case by comparison with the proportion of clinker melt which is reduced below the usual eutectic an effective abrasion of the saturated zone takes place. Thus the slowest reaction stage is accelerated through the melt. As a result the clinker formation is considerably accelerated, particularly in the case of raw meal containing the coarsely ground limestone.

In the question which results from this, "How can the proportion of melt be increased?", it helps us to consider the phase diagram in the C-S-A and C-S-A-F systems.

The analysis of the 3 and 4 substance system shows that for the raw meal, the principle components of which are $CaO$, $SiO_2$, $Al_2O_3$ and $Fe_2O_3$, apart from the usual eutectics present at the C-A margin for the production of both grey and white Portland cement ($C_3S$—$C_2S$—$C_3A$—$C_4AF$ or $C_2S$—$C_3A$—$C_{12}A_7$—$C_4AF$; grey) ($C_2S$—$C_3A$—$C_{12}A_7$; white) there are eutectics still lying opposite on the C-S margin with the same or a lower melting point ($CS$—$CAS_2$—$S$; $C_3S_2$—$CS$—$C_2AS$; $C_3S_2$—$CS$—$C_2AS$—$C_4AF$). As is shown from the existence ranges of the eutectics to be newly considered for sintering of the clinker, they are only formed in the presence of $CS$ and $C_3S_2$ instead of the $C_2S$.

From the comparison of the chemical compositions of the available eutectics it follows that the formation of the eutectics not to be utilised for the clinker sintering is possible with falling or the same melting points due to a considerable increase in the $SiO_2$ fraction with the same or a reduced $CaO$ fraction in the mixture. It may be recognised that the ratio between acidic oxides in the eutectics to be newly considered in precise contrast to the usual eutectics corresponds almost completely to the raw meal for Portland cement production. There is every reason to assume that in the coarse of the linker formation due to the aforementioned eutectics which are to be newly considered all acidic oxides of the raw meal without exception are included completely with a corresponding $CaO$ fraction in the melt. With regard to the conventional technology, in which the clinker melt composition corresponds to the highest fraction of $Al_2O_3$ and $Fe_2O_3$, it has also already been demonstrated that whilst the $Al_2O_3$ and $Fe_2O_3$ oxides of the raw meal go over almost completely into the melt, the $SiO_2$ oxide can only be partially (less than 10% of the total content of $SiO_2$) dissolved in the melt. However, on the basis of the new theoretical conceptions this is only possible when the predominant part of the $CaO$ is capable of solid state reactions.

Because of this it may be expected that the proportion of melt in the course of the clinker formation can be considerably increased by the new eutectics. This results from the following explanations and calculations, in which the reaction sequences are explained on the one hand with the eutectics usually used as a basis and on the other hand by way of the new eutectics.

As already follows unequivocally from the value of the SM, the $SiO_2$ fraction in the raw meal is much greater than the $Al_2O_3$ and $Fe_2O_3$ in total. Because the $SiO_2$ oxide of the raw meal according to the new technology is chemically bound to the easy to melt silicates, such as $CS$, $C_3S_2$ and $C_2AS$, in order to form the new eutectic, the proportion of melt in the sintering zone can be considerably increased with simultaneous formation of usual melt-forming minerals ($C_3A$, $C_4AF$).

The proportion of melt which could theoretically be produced in the clinker formation in the sintering zone based on the new and the usual eutectics of the phase diagram has been calculated for two grey clinkers which differ in their SM and TM as well as for a white clinker.

The calculated data show that the newly considered eutectics ($CS$—$CAS_2$—$S$; $C_3S_2$—$CS$—$C_2AS$; $C_3S_2$—$CS$—$C_2AS$—$C_4AF$) are much more favourable with regard to the proportion of clinker melt than the usual eutectics of the grey and the white clinker ($C_3S$—$C_2S$—$C_3A$—$C_4AF$ or $C_2S$—$C_3A$—$C_{12}A_7$—$C_4AF$; grey) ($C_2S$—$C_3A$—$C_{12}A_7$; white). This means that in the alite formation due to the new eutectic the proportion of melt in the sintering zone can be temporarily increased for the white cement clinker from approximately 11% to 21–23% and for the grey cement clinker from approximately 21% to 45–47%.

This again effects a considerable acceleration of the crystal-chemical conversions. This means that it is most favourable if the chemical composition of the melt for producing the white cement clinker corresponds the eutectic in the system $C_3S_2$—$CS$—$C_2AS$ and the composition for the grey clinker corresponds to the eutectic in the system $C_3S_2$—$CS$—$C_2AS$—$C_4AF$.

From this the question follows: If a quite different eutectic is more favourable than that of the conventional technology, why is the progress of the alite formation itself set by way of the usual eutectic?

In order with regard to this question to point to the appearance of the clinker formation, we consider below the mechanism and the kinetics of the clinker formation.

The present experimental and thermodynamic studies show that the mineral which forms first in the heterogeneous $CaO$—$SiO_2$ system independently of the $CaO:SiO_2$ ration under metastable conditions is $C_2S$. Accordingly, with a $CaO:SiO_2$ molecular ration of 1:1 or 3:2, $CS$ or $C_2S_2$ can only be formed after the proportion of the $CaO$ which is capable of solid state reaction, the $Ca^{2+}$ ions of which are the most mobile, is completely fixed. This means that the desired $CS$ or $C_2S_2$ formation in the $CaO$—$SiO_2$ system is the slowest, i.e. requires a specific time. Because of this the immediate formation of the newly considered eutectics (which corresponds to the $CS$—$CAS_2$—$S$ or $C_3S_2$—$CS$—$C_2AS$ or $C_3S_2$—$CS$—$C_2AS$—$C_4AF$ system) in the raw meal for Portland cement production cannot be achieved, since in the heating under metastable conditions it is heated to the necessary temperature. In this case the main cause is the lack of the easy to melt $CS$, $C_3S_2$ and $C_2AS$ silicates which are necessary for the newly considered eutectic instead of the $C_2S$. This relates likewise to the heterogeneous $CaO$—$SiO_2$ mixture with a $CaO:SiO$ molecular ratio of 1:1 and to a heterogeneous mixture of one of the newly considered eutectics prepared from the $CaO$, $SiO_2$, $Al_2O_3$ and $Fe_2O_3$ oxides. This means that the melting of a heterogeneous mixture, the chemical composition of which corresponds as regards the principal components ($CaO$, $SiO_2$, $Al_2O_3$ and $Fe_2O_3$) to one of the newly considered eutectics, at a corresponding temperature could only take place after the complete chemical fixing of all components. So long as the melting point of the eutectic located in the $CS$—$CAS_2$—$S$ system lies in the temperature range of the simultaneous formation of $C_2S$, $C_3S_2$ and $CS$, and the $C_2S$ forms first amongst the silicates, the formation of this eutectic which occurs at 1170° C. is hindered until the $C_2S$ is completely converted to $CS$. In this case the available $CaO$ fraction capable of the solid state reaction must correspond to the eutectic in the $CS$—$CAS_2$—$S$ system. In practice this means that during the heating of the raw meal in the kiln under metastable conditions the formation of the eutectic in the $CS$—$CAS_2$—$S$ system is not possible.

With regard to the stability and to the necessary time which the $C_2S \rightarrow CS$ conversion could ensure during the heating of the raw meal in the kiln, the eutectics in the $C_3S_2$—$C_2AS$—$CS$ and $C_3S_2$—$C_2AS$—$CS$—$C_4AF$ systems with the melting points of 1310° C. and approximately 1260° C. are therefore to be regarded as the most favourable for clinker formation.

Under the explained conditions the formation of the chosen eutectic in the $C_3S_2$—$C_2AS$—$CS$ and $C_3S_2$—$C_2AS$—$CS$—$C_4AF$ system by topochemical reactions in the raw meal for the production of cement is only possible when the proportion of finely ground calcite particles, i.e. particles which are capable of solid state reactions, is sufficient, apart from the $C_{12}A_7$ ($C_3A$) and $C_4AF$, only for the formation of $CS$ and $C_3S_2$ instead of the $C_2S$ as well as for $C_2AS$, and when an optimally sufficient time is available for the $C_2S \rightarrow CS$ conversions.

So long as the solid state reactions can further be ensured by the presence of the calcite particles and the particles of acidic minerals smaller than 80 $\mu m$, in the production of raw meal the content of calcite particles smaller than 80 $\mu m$ should only be available for the formation of $C_3S_2$, $CS$, $C_2AS$ as well as $C_{12}A_7$ ($C_3A$) and $C_4AF$. In order to be incapable of solid state reactions, after calculations have been carried out the rest of the calcite-containing components of the raw meal must be present in a quantity of approximately 40–80% in the particles over 80 $\mu m$.

Only in this case is the clinker melt formed from $CS$, $C_3S_2$ and $C_2AS$ in addition to the $C_3A$ and $C_4AF$.

This in turn means that the proportion of the melt is increased, so that the rate of clinker formation is accelerated. The coarse-grained calcite which is deacidified later in time enters the sintering zone in the state of finely crystalline highly reactive free lime. This free lime sinters and granulates with the clinker melt better than the recrystallised free lime with coarsely crystalline structure which in the known technology was produced from fine-grained calcite particles by crystal growth of the free lime formed earlier.

As a consequence of this a reasonable ratio must be set between the particles which are capable of solid state reaction and the particles which are capable of melting reaction.

It is obvious that the particles of the substances which contain clay, silicic acid, quartz and iron, which are regarded as acidic components, must also be capable of solid state reaction. In order to be capable of solid state reaction, the particles of the acidic raw meal component must also be correspondingly finely ground. Usually the particles of the acidic raw meal components must be below 80 $\mu m$ and even lower.

The optimisation of the fractional composition of the raw meal must, as already explained above, be targeted so that the proportion of the particles of calcite which are capable of solid state reaction were only sufficient for fixing the acidic raw meal components to $C_3A$, $C_4AF$, $C_2AS$ as well as $CS$ or $C_3S_2$.

The coarsening of the raw meal changes not only the progress of the solid state reaction but also the mechanism for formation of the alite from the melt. Alite is not formed via the reaction in the melt of the sintering zone between the topochemically formed belite and the residual free lime, but it crystallises as does the belite directly out of the melt, with the residual lime included, without formation of the topochemical belite immediately before the melt formation. As a result a lower energy requirement is necessary for formation of the alite.

Expressed more simply, this means that the formation of belite in the first stage of the clinker formation (the solid state reactions) is largely avoided by the corresponding reduction in the fineness of limestone components.

In this case it is particularly desirable that the clinker formation in the case of an unchanged alite content (LS II) preferably takes place in the melt, without increasing the Fe and Al oxide fraction or using mineralisers.

With the aid of the method according to the invention it has been shown that with an optimisation of the fractional composition of raw meal a targeted influence on the mechanisms of the clinker formation can be achieved, by which the proportion of clinker melt can be increased. The grinding of the raw meal should be linked to the clinker burning process so that the remaining portion of the raw meal to be converted in the melt is more coarsely ground.

Several embodiments of the invention are set out or described in greater detail below.

SUMMARY OF THE INVENTION

In order to test the method, a high-percentage limestone and a lime marl as basic raw meal component, a clay, a slate and two pyrite cinder residues were used as acidic raw meal components. The chemical composition of the raw meal components is set out in Table 1.

TABLE 1

| | Chemical composition of the raw materials. | | | | | |
| --- | --- | --- | --- | --- | --- | --- |
| | Raw materials for raw meal 1 | | | Raw materials for raw meal 2 | | |
| Chemical components | High-percentage limestone | Clay | Pyrite cinder residue 1 | Lime marl | Slate | Pyrite cinder residue 2 |
| Loss on ignition | 42,79 | 13,33 | 0,95 | 36,17 | 25,96 | 0,10 |
| $SiO_2$ | 0,80 | 51,97 | 4,24 | 11,17 | 25,36 | 14,28 |
| $Al_2O_3$ | 0,22 | 11,18 | 0,51 | 2,63 | 6.37 | 3,41 |
| $Fe_2O_3$ | 0.38 | 4,49 | 80,93 | 1,73 | 3,92 | 74,62 |
| CaO | 55,10 | 11,96 | 2,35 | 45,56 | 33,29 | 3,71 |
| MgO | 0,43 | 1,48 | 1,67 | 1,15 | 1,43 | 1,55 |
| $SO_3$ | 0,12 | 0,12 | 4,56 | 0,78 | 0,78 | 2,01 |
| $K_2O$ | 0,06 | 2,92 | 0,67 | 0,05 | 1,34 | 0,22 |

TABLE 1-continued

Chemical composition of the raw materials.

| Chemical compo-nents | Raw materials for raw meal 1 | | | Raw materials for raw meal 2 | | |
|---|---|---|---|---|---|---|
| | High-percentage limestone | Clay | Pyrite cinder residue 1 | Lime marl | Slate | Pyrite cinder residue 2 |
| Na$_2$O | 0,04 | 1,78 | 0,49 | 0,04 | 0,90 | 0,10 |
| Rest | 0,06 | 0,77 | 3,63 | 0,72 | 0,65 | |
| Total | 100,00 | 100,00 | 100,00 | 100,00 | 100,00 | 100,00 |

The high-percentage limestone and lime marl were ground up in a laboratory ball mill extremely coarsely to 33, 40, 50, 60, 70, 80 and 90% residue on the 80 μm sieve with a constant residue on the 200 μm sieve of 5% in a grain size range of 0.01 to 500 μm, and ground finely, as is necessary according to generally applicable conceptions for the usual technology, to 20% residue on the 80 μm sieve and to 5% residue on the 200 μm sieve in a grain size range from 0.01 to 315 μm.

Clay, slate and both pyrite cinder residues were ground to below 80 μm, as is also necessary according to generally applicable conceptions for the usual technology.

In order to examine the influence of the ratio of the <80 μm grain class to the >80 μm grain class of the basic raw meal component on the reactivity of the raw meal, on the basis of the calculations which were carried out 7 raw meals were produced from the high-percentage limestone ground to various grain class ratios of the 0.01 to 80 μm grain class to the 80.01 to 500 μm grain class and the clay and pyrite cinder residue 1 ground to below 80 μm, and 7 raw meals were produced from the lime marl ground to various grain class ratios of the 0.01 to 80 μm grain class to the 80.01 to 500 μm grain class and the slate ground to below 80 μm and pyrite cinder residue 2 (Table 2). In order to enable the results of the new technology to be compared with the known technology, a reference raw meal was also prepared from the high-percentage limestone ground to 20% residue on the 80 μm sieve and to 5% residue on the 200 μm sieve in a grain class range from 0.01 to 315 μm and the clay and pyrite cinder residue 1 ground to below 80 μm, and a reference raw meal was also prepared from the lime marl ground to 20% residue on the 80 μm sieve and 5% residue on the 200 μm sieve in a grain size range from 0.01 to 315 μm and the slate and pyrite cinder residue 2 ground to below 80 μm. The raw meals produced on the basis of the high-percentage limestone and the lime marl differ in their ratio of limestone and lime marl fractions between <80 μm and >80 μm. The limestone and lime marl fraction from 200 to 500 μm was kept constant correspondingly at 3.63 and 3.87% as regards the raw meal.

The homogenisation of the raw meals was carried out in each case within two hours in a mixer with rubber balls as mixing elements.

For the following roasting tests tablets were produced from the raw meals with a constant weight of 4 g, a constant diameter of 20 mm at constant pressure of 200 bars. The pressed tablets roasted in a laboratory electric kiln at 1450° C. in the following way.

For each roasting, 2 tablets of each raw meal were placed in the laboratory kiln which had been previously heated to 700° C. Then the tablets were heated from 700° C. to 1450° C. at a uniform heating speed of 17° C./min and finally kept isothermally in each case for 35 minutes. Afterwards the roasted tablets were taken out of the kiln and quickly cooled to room temperature with static air.

In each case one tablet of a raw meal was crushed to the necessary fineness and the content of free lime was determined using wet chemistry.

The chemical characteristic of the raw meals and the energy consumption for the raw meal grinding established as a function of the grain size ratio of the raw meal as well as the free lime content in the kiln feed may be seen in Tables 2 and 3.

TABLE 2

Results of investigations on the basis of raw meal 1

| Raw meal | Composition of the raw meal [%] | | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|---|
| | Limestone | Clay | Pyrite cinder residue 1 | LS II | SM | TM | | | |
| | Reference raw meal according to known technology | | | | | | | | |
| 1 | 72,68 | 25,94 | 1,38 | 96,4 | 2,5 | 1,2 | 4:1 (14,5) | 0,95 | 12,4 |
| | Raw meals according to new technology | | | | | | | | |
| 2* | 72,68 | 25,94 | 1,38 | 96,4 | 2,5 | 1,2 | 2:1 (24,0) | 1,56 | 8,5 |
| 3 | 72,68 | 25,94 | 1,38 | 96,4 | 2,5 | 1,2 | 15:1 (29,1) | 0,61 | 4,9 |
| 4 | 72,68 | 25,94 | 1,38 | 96,4 | 2,5 | 1,2 | 1:1 (36,3) | 0,54 | 4,7 |
| 5 | 72,68 | 25,94 | 1,38 | 96,4 | 2,5 | 1,2 | 1:1,5 (43,6) | 0,50 | 4,4 |
| 6 | 72,68 | 25,94 | 1,38 | 96,4 | 2,5 | 1,2 | 1:2 (45,7) | 0,72 | 4,1 |
| 7 | 72,68 | 25,94 | 1,38 | 96,4 | 2,5 | 1,2 | 1:3 (54,5) | 0,82 | 3,8 |

TABLE 2-continued

Results of investigations on the basis of raw meal 1

| Raw meal | Composition of the raw meal [%] | | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|---|
| | Limestone | Clay | Pyrite cinder residue 1 | LS II | SM | TM | | | |
| 8* | 72,68 | 25,94 | 1,38 | 96,4 | 2,5 | 1,2 | 1:4 (58,1) | 1,84 | 3,6 |
| 9* | 72,68 | 25,94 | 1,38 | 96,4 | 2,5 | 1,2 | 1:9 (65,4) | 3,82 | 3,4 |

TABLE 3

Results of investigations on the basis of raw meal 2

| Raw meal | Composition of the raw meal [%] | | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|---|
| | Lime marl | Slate | Pyrite cinder residue 1 | LS II | SM | TM | | | |
| | Reference raw meal according to known technology | | | | | | | | |
| 1 | 77,41 | 22,36 | 0,23 | 93,2 | 2,45 | 1,45 | 4:1 (15,5) | 0,74 | 14,8 |
| | Raw meals according to new technology | | | | | | | | |
| 2* | 77,41 | 22,36 | 0,23 | 93,2 | 2,45 | 1,45 | 2:1 (25,5) | 0,95 | 10,4 |
| 3 | 77,41 | 22,36 | 0,23 | 93,2 | 2,45 | 1,45 | 1,5:1(23019) | 0,71 | 6,2 |
| 4 | 77,41 | 22,36 | 0,23 | 93,2 | 2,45 | 1,45 | 1:1(38,7) | 0,38 | 6,0 |
| 5 | 77,41 | 22,36 | 0,23 | 93,2 | 2,45 | 1,45 | 1:1,5 (46,4) | 0,46 | 5,5 |
| 6 | 77,41 | 22,36 | 0,23 | 93,2 | 2,45 | 1,45 | 1:2 (51,8) | 0,52 | 5,1 |
| 7 | 77,41 | 22,36 | 0,23 | 93,2 | 2,45 | 1,45 | 1:3 (58,0) | 0,63 | 4,8 |
| 8 | 77,41 | 22,36 | 0,23 | 93,2 | 2,45 | 2,45 | 1:4 (61,9) | 0,84 | 4,5 |
| 9* | 77,41 | 22,36 | 0,23 | 93,2 | 2,45 | 1,45 | 1:9 (69,6) | 1,52 | 3,1 |

The results for the free lime content which are set out in Tables 2 and 3 show that with a reduction in the grain class ratio of basic raw meal components of both the studied raw meals, which are naturally different, from 4:1 to 2:1 or an increase in the residue of raw meal on the 80 μm sieve of 14.5–15.5% to 24.0–25.5% the free lime content in the kiln feed of the two raw meals rises. This means that the reactivity of the raw meals is hindered in conformity with the conventional conceptions.

With a further reduction in the grain class ratio of the basic raw meal component in the range from 1.5:1 to 1:3–1:4, however, the burnability of the raw meal at maximum reactivity is increased in the middle of this range in the comparison with the reference raw meal. The reduction in the grain class ratio of the limestone or lime marl as far as 1:9 leads to the hindering of the raw meal reactivity, by which an increase in the free lime content up to 3.82 and 1.52% is correspondingly confirmed.

On the basis of the laboratory studies which were carried out it follows that the optimal grain class ratio of the <80 μm grain class to the >80 μm grain class of the basic raw meal component with studied raw meals is between 1.5:1 and 1:4.

Moreover, it follows from this that the energy consumption for the grinding of the raw meal drops considerably with the reduction in the grain class ratio of limestone and lime marl particles.

In a second embodiment of the invention that the acidic raw materials and/or secondary substances, in which the principal components are finely and regularly distributed, which are used for cement production with a module (M)= $CaO+MgO+FeO+0.31Fe_3O_4/(0.93-1.4)*SiO_2+0.94*Al_2O_3+0.7*Fe_2O_3+0.7*0.69*Fe_3O_4$ of 0.25–1.2 and a melting temperature of a maximum of 1300° C. is ground up with the basic raw material component to a grain class ratio of the 0.01 to 80 μm grain class to 80.01 to 500 μm grain class of 1.5:1 to 1:9.

By this measure it is possible additionally to increase the clinker melt content in the sintering stage and to lower the melt temperature. This is the reason for accelerating the clinker formation and lowering the sintering temperature during the clinker formation. Naturally, as this is done the specific energy consumption in the raw meal grinding and clinker sintering is additionally considerably reduced and the throughput of the grinding installation and of the rotary kiln is increased. The discharge of dust from the kiln is reduced, so that the heat loss from the kiln is reduced. Thus the operating costs in the clinker production are reduced.

The reason for this is explained as follows:

There are several raw and secondary materials which are rich in $SiO_2$ and which with regard to their chemical composition in the principal components ($SiO_2$, $Al_2O_3$, $Fe_2O_3$ and CaO) correspond to a eutectic which is already regarded as rich in $SiO_2$. The chemical correspondence of the raw and secondary materials of the newly considered eutectics which are rich in $SiO_2$ and selected in particular as optimal is not by itself a sufficient prerequisite for the formation of the easy to melt $SiO_2$-rich melt. For this it is also necessary that the chemical principal and secondary components have been correspondingly finely and regularly distributed amongst one another. This means that the raw and secondary materials which are present must be chemically homogeneous, or more precisely expressed, have been chemically and mineralogically attached to corresponding minerals for the formation of the newly considered eutectics. Slate, oil shale, basalt, tefrite basalt, phosphor slag, blast furnace slag, clinker from the Welz process and other raw and secondary materials may for example be considered as such materials. Since the topochemical formation both of the CS and also of the $C_3S_2$ even with a $CaO:SiO_2$ molecular ratio of 1:1 to 3:2 is completed by the $C_2S$ mineral, a temperature interval and time interval is necessary for the $C_2S \rightarrow CS$ and $C_3S_2$ conversion. In this case the $C_3S_2$ mineral is formed by the $C_2S$ mineral over 1000–1200° C. and CS mineral by the $C_2S$ mineral over 1100–1300° C. For this reason, and moreover in order to form the necessary eutectic, the acidic raw materials which are chemically heterogeneous should be corrected by a specific quantity of the basic raw meal fraction which is capable of solid state reaction, finely ground below 80 μm in the raw meal preparation. In order to preserve the chemical-mineralogical composition of the easy to melt raw and secondary materials and the like listed above immediately before the melt formation in the sintering zone, it is advantageous, in contrast to the heterogeneous acidic raw materials or a mixture consisting of acidic components, for the easy to melt acidic raw meal components also to be ground coarsely like basic raw material components. In this case the proportion of melt or the reactivity of the raw meal is increased.

In order to test the method, two high-percentage limestones and one lime marl were used as basic raw meal components as well as a slate, a basalt, a phosphor slag and a pyrite cinder residue were used as acidic raw meal components. The chemical composition of the raw materials is set out in Table 4.

The high-percentage limestones, lime marl and the basalt, phosphor slag and slate used as acidic raw meal components were ground separately in a laboratory ball mill extremely coarsely to 33, 40, 50, 60, 70, 80 and 90% residue on the 80 μm sieve with a constant residue on the 200 μm sieve of 5% in a grain size range of 0.01 to 500 μm, and ground finely, as is necessary according to generally applicable concep-tions for the usual technology, to 20% residue on the 80 μm sieve and to 5% residue on the 200 μm sieve in a grain size range from 0.01 to 315 μm.

Basalt, slate, pyrite cinder residue and phosphor slag were, as is also necessary according to generally applicable conceptions for the usual technology, also ground below 80 μm.

TABLE 4

Chemical composition of the raw materials

| Chemical components | Raw materials 1 | | Raw materials 2 | | Raw materials 3 | | |
|---|---|---|---|---|---|---|---|
| | Limestone 1 | Basalt | Limestone 2 | Phosphor slag | Lime marl | Slate | Pyrite cinder residue 2 |
| | 41,33 | | 42,30 | | 36,17 | 25,96 | 0,10 |
| $SiO_2$ | 2,20 | 43,92 | 2,60 | 40,48 | 11,17 | 25,36 | 14,28 |
| $Al_2O_3$ | 0,45 | 11,98 | 0,50 | 2,29 | 2,63 | 6,37 | 3,41 |
| $Fe_2O_3$ | 0,90 | 12,85 | 0,15 | 0,23 | 1,73 | 3,92 | 74,62 |
| CaO | 54,52 | 10,54 | 53,66 | 47,89 | 45,56 | 33,29 | 3,71 |
| MgO | 0,40 | 7,10 | 0,31 | 2,60 | 1,15 | 1,43 | 1,55 |
| $SO_3$ | 0,15 | 0,45 | 0,33 | 0,51 | 0,78 | 0,78 | 2,01 |
| $P_2O_3$ | — | — | — | 1,93 | — | — | — |
| F | — | — | — | 1,87 | — | — | — |
| $K_2O$ | 0,03 | 2,65 | 0,05 | 0,42 | 0,05 | 1,34 | 0,22 |
| $Na_2O$ | 0,02 | 1,55 | 0,04 | 0,30 | 0,04 | 0,90 | 0,10 |
| Rest | | 8,96 | 0,06 | 1,48 | 0,72 | 0,65 | |
| | 100,00 | 100,00 | 100,00 | 100,00 | 100,00 | 100,00 | 100,00 |

In order to examine the influence of the ratio of <80 μm grain class to the >80 μm grain class of the basic and acidic raw meal components on the reactivity of the three groups of raw materials which are naturally dissimilar, 7 raw meals were produced for each group of raw materials on the basis of the calculations which were carried out (Table 5). In order to enable the results of the new technology to be compared with the usual technology, a reference raw meal was also prepared for each group of raw materials from the high-percentage limestones ground to 20% residue on the 80 μm sieve and to 5% residue on the 200 μm sieve in a grain size range from 0.01 to 315 μm and the basalt, phosphor slag and slate and pyrite cinder residue 1 ground to below 80 μm, and a reference raw meal was also prepared from the lime marl ground to 20% residue on the 80 μm sieve and to 5% residue on the 200 μm sieve in a grain size range from 0.01 to 315 μm and the slate ground to below 80 μm and pyrite cinder residue 2. The raw meals produced from the same raw materials differ predominantly in their ratio between <80 μm and >80 μm grain classss not only of the basic but also of the acidic raw material. Therefore the grain class from 200 to 500 μm was not kept constant at 3.63 and 3.87% as regards the raw meal, as is the case according to the first described embodiment of, but at 5%.

The homogenisation of the raw meals was carried out in each case within two hours in a mixer with rubber balls as mixing elements.

For the following roasting tests tablets were produced from the raw meals with a constant weight of 4 g, a constant diameter of 20 mm at constant pressure of 200 bars. The pressed tablets were roasted in a laboratory electric kiln at 1450° C. in the following way.

For each roasting, 2 tablets of each raw meal were placed in the laboratory kiln which had been previously heated to 700° C. Then the tablets were heated from 700° C. to 1450° C. at a uniform heating speed of 17° C./min and finally kept isothermally in each case for 35 minutes. Afterwards the roasted tablets were taken out of the kiln and quickly cooled to room temperature with static air.

In each case one tablet of a raw meal was crushed to the necessary fineness and the content of free lime was determined using wet chemistry.

The chemical characteristic of the raw meals and the energy consumption established as a function of the grain size ratio of the raw meal as well as the free lime content are set out in Tables 5, 6 and 7.

The results set out in Tables 5, 6 and 7 show that with a reduction in the grain class ratio from 4:1 to 2:1 or an increase in the residue of raw meal on the 80 μm sieve of 12.1–15.5% to 33.3% irrespective of the nature of the raw meals examined the free lime content rises in three types of raw meal roasted at 1450° C. This means that, as was to be expected, the reactivity of the raw meals is hindered in this case. However, it is observed that the increase in the free lime content in this case, when both acidic and basic components are coarsely ground, is lower than in the case of roasted raw meals according to the first described embodiment.

With a further reduction in the grain class ratio of the basic and the acidic raw meal component in the range from 1.5:1 to 1:4–1:9, however, the burnability of the studied raw meals at maximum reactivity is increased in the middle of this range in comparison with the reference raw meal (datum raw meal). The reduction in the grain class ratio as far as 1:9 leads to the hindering of the raw meal reactivity, which confirms an increase in the free lime content up to 1.12; 0.9 and 1.32%. in this case it may be noted that the free lime content, particularly in the case of the raw meals which contain the basalt or the phosphor slag as acidic component remains substantially lower than in the earlier described examples described earlier. This makes it possible to produce the clinker from a coarser raw meal.

TABLE 5

Results of investigations of the raw meal on the basis of the raw materials[1]

| Raw meal | Composition of the raw meal [%] | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|
| | Limestone | Basalt | LS II | SM | TM | | | |
| | Reference raw meal according to known technology | | | | | | | |
| 1 | 75,20 | 24,8 | 94,1 | 1,81 | 1,5 | 4:1 (15,0) | 0,42 | 15,1 |
| | Raw meal according to Claim 1 | | | | | | | |
| 2 | 75,20 | 24,8 | 94,1 | 1,81 | 1,5 | 1:1 (37,6) | 0,28 | 5,3 |
| | Raw meals according to new technology | | | | | | | |
| 3 | 75,20 | 24,8 | 94,1 | 1,81 | 1,5 | 2:1 (33,3) | 0,65 | 8,9 |
| 4 | 75,20 | 24,8 | 94,1 | 1,81 | 1,5 | 1,5:1 (40) | 0,41 | 6,4 |
| 5 | 75,20 | 24,8 | 94,1 | 1,81 | 1,5 | 1:1 (50) | 0,28 | 5,3 |
| 6 | 75,20 | 24,8 | 94,1 | 1,81 | 1,5 | 1:1,5 (60) | 0,36 | 4,9 |
| 7 | 75,20 | 24,8 | 94,1 | 1,81 | 1,5 | 1:2 (66,7) | 0,50 | 4,6 |
| 8 | 75,20 | 24,8 | 94,1 | 1,81 | 1,5 | 1:3 (75) | 0,63 | 4,4 |
| 9 | 75,20 | 24,8 | 94,1 | 1,81 | 1,5 | 1:4 (80) | 0,74 | 4,2 |
| 10* | 75,20 | 24,8 | 94,1 | 1,81 | 1,5 | 1:9 (90) | 1,12 | 3,9 |

TABLE 6

Results of investigations of the raw meal on the basis of the raw materials 2

| Raw meal | Composition raw meal [%] | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|
| | Limestone | Phosphor slag | LS II | SM | TM | | | |
| | Reference raw meal according to known technology | | | | | | | |
| 1 | 60,60 | 39,40 | 100 | 12,68 | 6,59 | 4:1 (12,1) | 0,44 | 15,6 |
| | Raw meal according to Claim 1 | | | | | | | |
| 2 | 60,60 | 39,40 | 100 | 12,68 | 6,59 | 1:1 (30,3) | 0,30 | 8,1 |
| | Raw meal according to new technology | | | | | | | |
| 3 | 60,60 | 39,40 | 100 | 12,68 | 6,59 | 2:1 (33,3) | 0,62 | 8.8 |
| 4 | 60,60 | 39,40 | 100 | 12,68 | 6,59 | 1,5:1 (40) | 0,53 | 5,4 |
| 5 | 60,60 | 39,40 | 100 | 12,68 | 6,59 | 1:1 (50) | 0,30 | 5,1 |
| 6 | 60,60 | 39,40 | 100 | 12,68 | 6,59 | 1:1,5 (60) | 0,43 | 4,9 |
| 7 | 60,60 | 39,40 | 100 | 12,68 | 6,59 | 1:2 (66,7) | 0,50 | 5,1 |
| 8 | 60,60 | 39,40 | 100 | 12,68 | 6,59 | 1:3 (75) | 0,53 | 4,4 |

TABLE 6-continued

Results of investigations of the raw meal on the basis of the raw materials 2

| Raw meal | Composition raw meal [%] | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|
| | Limestone | Phosphor slag | LS II | SM | TM | | | |
| 9 | 60,60 | 39,40 | 100 | 12,68 | 6,59 | 1:4 (80) | 0,64 | 4,1 |
| 10 | 60,60 | 39,40 | 100 | 12,68 | 6,59 | 1:9 (90) | 0,95 | 3,7 |

TABLE 7

Results of investigations of the raw meal on the basis of the raw materials 3

| Raw meal | Composition of the raw meal [%] | | | | | | Ratio of the <80 μm to the >80 μm of the limestone (residue on the 80 μm sieve of the raw meal [%]) | Free lime content [%] | Sp. energy consumption for the raw meal grinding [kWh/t] |
|---|---|---|---|---|---|---|---|---|---|
| | Lime marl | Slate | Pyrite cinder residue 2 | LS II | SM | TM | | | |
| Reference raw meal according to known technology |
| 1 | 77,41 | 22,36 | 0,23 | 93,2 | 2,45 | 1,45 | 4:1 (15,5) | 0,74 | 14,8 |
| Raw meal according to Claim 1 |
| 2 | 77,41 | 22,36 | 0,23 | 93,2 | 2,45 | 1,45 | 1:1,5 (46,4) | 0,38 | 6,0 |
| Raw meals according to new technology |
| 3* | 77,41 | 22,36 | 0,23 | 93,2 | 2,45 | 1,45 | 2:1 (33,3) | 0,82 | 8,5 |
| 4 | 77,41 | 22,36 | 0,23 | 93,2 | 2,45 | 1,45 | 1,5:1 (40) | 0,58 | 5,2 |
| 5 | 77,41 | 22,36 | 0,23 | 93,2 | 2,45 | 1,45 | 1:1 (50) | 0,26 | 4,9 |
| 6 | 77,41 | 22,36 | 0,23 | 93,2 | 2,45 | 1,45 | 1:1,5 (60) | 0,32 | 4,6 |
| 7 | 77,41 | 22,36 | 0,23 | 93,2 | 2,45 | 1,45 | 1:2 (66,7) | 0,40 | 4,3 |
| 8 | 77,41 | 22,36 | 0,23 | 93,2 | 2,45 | 1,45 | 1:3 (75) | 0,55 | 4,0 |
| 9 | 77,41 | 22,36 | 0,23 | 93,2 | 2,45 | 1,45 | 1:4 (80) | 0,75 | 3,8 |
| 10* | 77,41 | 22,36 | 0,23 | 93,2 | 2,45 | 1,45 | 1:9 (90) | 1,32 | 3,6 |

On the basis of the laboratory studies carried out it follows that with the simultaneous coarsening of the basic and acidic raw meal components and with the chemical composition for the acidic raw meal components available with a homogeneous structure corresponding to the newly considered eutectics enriched with $SiO_2$, the range of the optimal grain class ratio of the <80 μm grain class to the >80 μm grain class lies between 1.5:1 and 1:9.

Moreover, it follows from the data present in Tables 5, 6 and 7 that the energy consumption for the grinding of the raw meal is considerably reduced even further as the grain class ratio of both raw meal components falls.

Thus, in contrast to all previous conceptions, coarser raw meal can be very well sintered and granulated if corresponding preconditions therefor are created.

In a further embodiment of the invention it is proposed that in a method of producing cement using dynamic sintering of the raw meal, i.e. mechanical stress during heat treatment of the raw meal in the rotating kiln, and with a grain class ratio of the 0.01 to 80 μm grain class to the >80.01 μm grain class of the basic raw meal components of 1.5:1 to 1:9 as regards the acidic raw meal components completely ground below 80 μm, the grain class with grain sizes of >80 μm of basic raw material components contains the grains up to 2000 μm.

It is the object of the present invention to reduce the energy consumption necessary in the production of cement for the raw meal grinding and subsequent roasting of the homogenised raw meal in a sintering kiln, and likewise to reduce the operating and investment costs particularly in the grinding of raw meal, whilst also increasing the throughput of the raw meal apparatus and the kilns with a simultaneous reduction of the specific fuel requirement. This should take place with the aid of an optimisation of the fractional grain size composition of the raw meal and also with the aid of a device which from the point of view of apparatus requires the least possible grinding assemblies, so that additional investment costs are largely avoided.

Due to this measure it is possible to increase the clinker melt content in the sintering stage and to reduce the melting temperature, so that the clinker formation is accelerated and the sintering temperature during the clinker formation is lowered. Naturally in this case the energy consumption during raw meal grinding is reduced and the output of the grinding installation is increased. The cement properties are improved by the better mineral formation particularly of the alite and belite. The discharge of dust from the kiln is reduced, so that the heat loss with the kiln is reduced.

The phenomena which occur in this case are explained as follows:

Due to the coarsening of the coarse fraction of the basic (calcite-containing) raw meal components up to 2000 μm the reaction surface of the basic raw meal component is substantially reduced. As a consequence of this the unwanted topochemical formation of the $C_2S$ instead of the CS and/or $C_3S_2$ before the sintering zone on the surface of the coarse calcite particles which are deacidified at a later time is substantially reduced and the proportion of clinker melt is increased due to the solution of the CS and $C_3S_2$ produced in the greater quantity in the melt, i.e. due to the higher enrichment of the melt with $SiO_2$. As a consequence of this the melt acquires the ability to penetrate into the pores of the coarse-grained calcite which is deacidified at a later time. This brings about a splitting off and consequently a subsequent dispersion of the coarse lime grains to the individual crystal blocks. In this case the speed of solution of the resulting crystal blocks is very high because on the one hand the presence of the increased volume of melt causes the convective removal of the "CaO-melt" boundary layers which are saturated with $Ca^{2+}$ cations and on the other hand the CaO residue consisting of the crystal blocks is recrystallised the least. Consequently the clinker formation is accelerated by the accelerated transition of the new portions of split-off coarse lime grains in the melt. This ensures more favourable conditions for the formation of alite and belite from the melt.

It is obvious that under dynamic conditions of roasting in the rotating kiln, i.e. a mechanical stress during the heat treatment of the raw meal, the reactivity of the coarsest raw meal is accelerated more than that of the finest raw meal. It follows from this that the finest raw meal is relatively homogeneous because of its fineness. For this reason, in the case of the finest raw meal by comparison with the coarser raw meals no strong diffusion resistance is to be expected which would have to be overcome under dynamic roasting conditions.

Further embodiments of the invention are set out or described in greater detail below:

In order to test the method, a limestone was used as basic raw meal component and a clay and a pyrite cinder residue were used as acidic raw meal components. The chemical composition of the raw materials is set out in Table 8.

The limestone was ground to the following grain size ranges of 0.01–500 μm, 0.01–1000 μm, 0.01–1500 μm, 0.01–2000 μm and 0.01–2500 μm. The energy consumption established in this case as a function of the grain size ratio of the limestone is set out in Table 9.

TABLE 8

Chemical composition of the raw materials

| Chemical components | Limestone | Clay | Pyrite cinder |
|---|---|---|---|
| Loss on ignition | 41.36 | 9.70 | 0.70 |
| $SiO_2$ | 2.36 | 63.14 | 10.61 |
| $Al_2O_3$ | 0.76 | 17.00 | 3.85 |
| $Fe_2O_3$ | 0.81 | 6.45 | 56.30 |
| CaO | 53.60 | 1.03 | 3.68 |
| MgO | 0.70 | 1.13 | 6.22 |
| $SO_3$ | 0.15 | 0.50 | 12.54 |
| $K_2O$ | 0.06 | 0.63 | 0.70 |
| $Na_2O$ | 0.04 | 0.41 | 0.55 |
| Rest | 0.16 | 0.01 | 4.85 |
| Total | 100.00 | 100.00 | 100.00 |

TABLE 9

Actual energey consumption for the grinding of the limestone as a function of the grain size ranges ground and fraction ratios

| Grinding No. | Grain size range [μm] | Ratio of the 0.01-80 μm fraction to the > 80 μm fraction | Residue on the 80 μm sieve [%] | Specific energy consumption kWh/t |
|---|---|---|---|---|
| 1 Grinding | 0.01–500 | 1.5:1 | 40 | 4.01 |
| 2 Grinding | 0.01–1000 | 1.0:1.0 | 50 | 3.30 |
| 3 Grinding | 0.01–1500 | 1:1.5 | 60 | 2.90 |
| 4 Grinding | 0.01–2000 | 1:2.33 | 70 | 2.60 |
| 5 Grinding | 0.01–2500 | 1:2.5 | 70 | 2.45 |
| 6 Reference grinding according to usual technology | 0.01–315 | 4:1 | 18 | 10.41 |

The data set out here show clearly that the energy consumption for the grinding of the limestone drops considerably as the size of the limestone particles increases.

6 raw meal mixtures were produced from the limestone which was ground to various grain size ranges and the clay and pyrite cinder residue ground below 80 μm in the following way on the basis of the calculations carried out for the subsequent roasting tests.

The homogenisation of the raw meals was carried out within two hours in each case in a mixer with rubber balls as mixing elements. Afterwards with the addition of water granules were produced from the raw meals with a diameter of 5–10 mm. Then the granules were dried for two hours at 110° C.

The laboratory meals produced differ only in the ground grain size ranges of the limestone greater than 80 μm and ratios of the limestone fractions between <80 μm and >80 μm. The chemical composition of six produced raw mixtures is the same and is set out in Table 10.

TABLE 10

Chemical composition of the raw meals

| Chemical components | Raw meal |
|---|---|
| Loss on ignition | 35.03 |
| $SiO_2$ | 13.76 |
| $Al_2O_3$ | 3.82 |
| $Fe_2O_3$ | 2.44 |
| CaO | 43.29 |
| MgO | 0.81 |
| $SO_3$ | 0.63 |
| $K_2O$ | 0.18 |
| $Na_2O$ | 0.11 |
| LS II | 97.0 |
| SM | 2.2 |
| TM | 1.6 |

The chemical characteristics, limestone grain class ratios and raw material ratios of the produced raw meals and the free lime content established in raw meals roasted at 1450° C. are set out in Table 11.

TABLE 11

Effect of the grain size ranges and fractional mixture ratios of the limestone on the reactivity of the raw meal

| | | | | | Ratio between raw meal components [%] | | | | |
|---|---|---|---|---|---|---|---|---|---|
| Raw meals | LS II | SM | TM | Grain size range of the limestone [μm] | Limestone fraction <80 μm | Limestone fraction >80 μm | Clay <80 μm | Pyrite Cinder residue <80 μm | Free lime content [%] |
| 1 - according to Claim 1 | 97 | 2,2 | 1,6 | 0,01–500 | 48,21 | 32,13 | 18,62 | 1,04 | 0,85 |
| 2 - according to Claim 2 | 97 | 2,2 | 1,6 | 0,01–1000 | 40,17 | 40,17 | 18,62 | 1,04 | 0,72 |
| 3 - according to Claim 3 | 97 | 2,2 | 1,6 | 0,01–1500 | 32,13 | 48,21 | 18,62 | 1,04 | 0,65 |
| 4 - according to Claim 2 | 97 | 2,2 | 1,6 | 0,01–2000 | 24,1 | 56,24 | 18,62 | 1,04 | 0,81 |
| 5 - outside optimum range | 97 | 2,2 | 1,6 | 0,01–2500 | 24,1 | 56,24 | 18,62 | 1,04 | 1,82 |
| 6 - according to usual technology | 97 | 2,2 | 1,6 | 0,01–315 | 65,88 | 14,46 | 18,62 | 1,04 | 0,94 |

The raw meal 1 with coarsely ground limestone is representative for the method of the first embodiment which has already been set out. The raw meal 6 with the finely ground limestone is representative for usual technology and serves as reference raw meal. The granules produced were roasted at 1450° C. in the following way.

A sample of approximately 500 g of each raw meal was used for the roasting.

In the laboratory rotary kiln which had previously been heated to 600° C. the dried granules of each raw meal were heated electrically in 50 minutes to 1450° C., and then sintered for 30 electrically in 50 minutes to 1450° C., and then sintered for 30 minutes at this temperature. Then the roasted raw meals were discharged from the kiln and quickly cooled to room temperature with static air. Afterwards in each case one sample of a produced clinker was crushed to the necessary fineness and the content of free lime was determined using wet chemistry. The results for the free lime content which are set out in Table 11 show that with an increase in the grain size range from 0.01–500 μm to 0.01–2000 μm and a residue on the 80 μm sieve of 41.017–56.24% the free lime content in the case of roasted raw meals 2, 3, and 4 is lower by comparison with roasted raw meals 1, 5 and 6. It may be noted that the free lime content in such in such a widened grain size range above 80 μm only changes slightly, i.e. lies below 1%. An increase in the grain size range of the limestone fractions above 80 μm to 80–2500 μm leads to a hindering of the raw meal reactivity. This confirms an increase in the free lime content to 1.8%.

On the basis of the laboratory investigations carried out it follows that under dynamic sintering of the raw meal, i.e. a mechanical stress during the heat treatment of the raw meal in the rotating kiln, the optimal grain size range of the basic raw meal component is above 80 μm up to 2000 μm.

It should be emphasised that the upper grain size limit of the basic raw meal component for producing cement clinker lies not only at 500 μm and at 2000 μm, but it can be any value between 500 and 2000 μm.

Thus, in contrast to all previous conceptions, coarser raw meal can be sintered and granulated well if corresponding preconditions therefor are created.

On the basis of microscopic examinations of clinker the earlier opinion must be corrected that the coarse raw meal exerts an unfavourable influence on the homogeneity of the clinker, as is normally usual. In spite of extremely high sieve residues the result is a surprisingly homogeneous clinker, which we cannot normally observe.

It was established that the alite in the clinker sintering crystallises out of optimally coarsened raw meal mostly in the rhombohedral modification. This causes the activity of a clinker or cement produced therefrom to rise, which was confirmed by strength testing of the cement.

In a further embodiment of the invention it is proposed that in a method of producing cement using dynamic sintering of the raw meal, i.e. mechanical stress during heat treatment of the raw meal in the rotating kiln, and with a grain class ratio of the 0.01 to 80 μm grain class to the >80.01 μm grain class of the raw meal of 1.5:1 to 1:9; the grain class with grain sizes of >80.01 μm both of basic raw material components and also of acidic raw material components present with a melting temperature of a maximum of 1300° C. contains the grains up to 2000 μm.

Due to this measure it is possible to increase the clinker melt content in the sintering stage and to reduce the melting temperature, so that the clinker information is accelerated and the sintering temperature during the clinker formation can be lowered. Naturally in this case the specific energy consumption during raw meal grinding and clinker sintering is additionally considerably reduced and the output of the grinding installation and of the rotary kiln is increased. The discharge of dust from the kiln is reduced, so that the heat loss with the kiln is reduced. Thus the operating costs in the production of clinker are reduced.

The reason for this is explained as follows:

Due to the coarsening of the coarse fraction of the basic and acidic raw meal components up to 2000 μm the reaction surface between the basic and acidic raw meal components is substantially reduced. As a consequence of this the unwanted topochemical formation of the $C_2S$ instead of the CS or $C_3S_2$ already present in the acidic raw material components before the sintering zone is substantially reduced and the proportion of $SiO_2$-rich clinker melt resulting from the acidic raw meal component is increased.

Further embodiments of the invention are explained in greater detail below.

For the laboratory examinations the raw materials 2 and 3 set out in Table 4 were used. The raw materials 2 consist of limestone and phosphor slag, and the raw materials 3 consist of lime marl, slate and pyrite cinder residue 2. The raw meal preparation and the burning of the raw meals were carried out precisely as in the example according to claim 3. The difference residues in the fact that not only the basic but also the acidic raw meal components were ground to grain size ranges of 0.01–500 µm, 0.01–1000 µm, 0.01–1500 µm and 0.01–2000 µm.

The homogenisation of the raw meals was carried out within two hours in each case in a mixer with rubber balls as mixing elements. Afterwards with the addition of water granules were produced from the raw meals with a diameter of 5–10 mm. Then the granules were dried for two hours at 110° C.

The granules produced were roasted at 1450° C. in the following manner.

In the laboratory rotary kiln which had previously been heated to 600° C. the dried granules of each raw meal were heated electrically in 50 minutes to 1450° C., and then sintered for 30 minutes at this temperature. Then the roasted raw meals were discharged from the kiln and quickly cooled to room temperature with static air. Afterwards in each case one sample of a produced clinker was crushed to the necessary fineness and the content of free lime was determined using wet chemistry.

The chemical characteristics of the raw meals and the energy consumption established as a function of the ground grain size ratios and grain size ranges of the raw meal and the free lime are to be seen in Tables 12 and 13.

TABLE 12

Results of investigations of the raw meal on the basis of the raw materials 2

| Raw meal | Composition of the raw meal [%] | | | | | Grain size ranges of the raw meal [µm] Ratio of the <80 µm to the >80 µm of the limestone (residue on the 80 µm sieve of the raw meal [%]) | Free lime content [%] | Sp. energy consumption for the raw meal grinding [kWh/t] |
|---|---|---|---|---|---|---|---|---|
| | Limestone | Phosphor slag | LS II | SM | TM | | | |
| | | | | | | Raw meal according to Claim 2 | | |
| 1 | 60,60 | 39,40 | 100 | 12,68 | 6,59 | 500 (1:1) | 0,30 | 5,1 |
| | | | | | | Raw meal according to Claim 4 | | |
| 2 | 60,60 | 39,40 | 100 | 12,68 | 6,59 | 500 (1,5:1) | 0,53 | 5,4 |
| 3 | 60,60 | 39.40 | 100 | 12.68 | 6.59 | 1000 (1:1) | 0,22 | 4,5 |
| 4 | 60,60 | 39,40 | 100 | 12,68 | 6,59 | 1500 (1:1,5) | 0,40 | 3,5 |
| 5 | 60,60 | 39,40 | 100 | 12,68 | 6.59 | 2000 (1:2) | 0,46 | 3,0 |
| 6 | 60,60 | 39,40 | 100 | 12,68 | 6,69 | 2000 (1:3) | 0,55 | 2,8 |
| 7 | 60,60 | 39.40 | 100 | 12,68 | 6,59 | 2000 (1:9) | 0,98 | 2,2 |

TABLE 13

Results of investigations of the raw meal on the basis of the raw materials 3

| Raw meal | Composition of the raw meal [%] | | | | | | Grain size ranges of the raw meal [µm] Ratio of the <80 µm to the >80 µm of the limestone (residue on the 80 µm sieve of the raw meal [%]) | free lime content [%] | Sp. energy consumption for the raw meal grinding [kWh/t] |
|---|---|---|---|---|---|---|---|---|---|
| | Lime marl | Slate | Pyrite cinder residue 2 | LS II | SM | TM | | | |
| | | | | | | | Raw meal according to Claim 2 | | |
| 1 | 77,41 | 22,36 | 0,23 | 93,2 | 2,45 | 1,45 | 500 (1:1) | 0,26 | 4,9 |
| | | | | | | | Raw meal according to Claim 4 | | |
| 2 | 77,41 | 22,36 | 0,23 | 93,2 | 2,45 | 1,45 | 500 (1,5:1) | 0,58 | 5,2 |
| 3 | 77,41 | 22,36 | 0,23 | 93,2 | 2,45 | 1,45 | 1000 (1:1) | 0,24 | 4,6 |
| 4 | 77,41 | 22,36 | 0,23 | 93,2 | 2,45 | 1,45 | 1500 (1:1,5) | 0,30 | 4,0 |
| 5 | 77,41 | 22,36 | 0,23 | 93,2 | 2,45 | 1,45 | 2000 (1:2) | 0,44 | 3,2 |
| 6 | 77,41 | 22,36 | 0,23 | 93,2 | 2,45 | 1,45 | 2000 (1:3) | 0,68 | 3,0 |
| 7 | 77,41 | 22,36 | 0,23 | 93,2 | 2,45 | 1,45 | 2000 (1:9) | 1,56 | 2,6 |

The results set out in Tables 12 and 13 show that the free lime content in samples roasted at 1450° C. from two different types of raw meal studied with a reduction in the grain class ratio of 1.5:1 to 1:9 and an increase in the grain size range from 0.01–500 µm to 0.01–2000 µm irrespective of the nature of the raw meal is principally somewhat lower than in some of the samples described earlier. This means that the reactivity of the raw meals increases.

In this case it should be noted that with a simultaneous decrease in the grain class ratio of the basic and the acidic raw meal components in the range from 1.5:1 to 1:4–1:9 and an increase in the grain size range up to 0.01–1000 µm, 0.01–1500 µm and 0.01–2000 µm the reactivity of the raw meals studied with maximum reactivity in the middle of this range is increased in comparison to a raw meal example described earlier the second embodiment. The reduction in the grain class ratio to 1:9 leads to the hindering of the raw meal reactivity, which is confirmed by an increase in the free lime content correspondingly to 0.98 and 1.56%. It may be noted that the free lime content with a grain class ratio of 1:9 remains somewhat higher than in examples such earlier described. Nevertheless it is possible to achieve the production of the clinker from the coarser raw meal.

On the basis of the investigations carried out it follows that with simultaneous coarsening of the basic and acidic raw meal components and conformity of the chemical composition of the acidic raw meal components with the newly considered eutectics the optimum grain size range of the raw meal with grain size ratios of the <80 µm grain class to the >80 µm grain class of 1.5:1 to 1:9 can be increased up to 2000 µm.

Furthermore, from the data set out in Tables 12 and 13 it follows that the energy consumption for the grinding of the raw meal falls considerably with the reduction in the grass ratio and an increase in the grain size range up to 0.01–1000 µm, 0.01–1500 µm and 0.01–2000 µm of both raw meal components.

In a further embodiment of the invention it is proposed that with a grain class ratio of the 0.01–80 µm grain class to the >80.01 grain class of basic raw material components of 1.5:1 to 1:9, the proportion of basic raw meal components to be fine-ground below 80 µm can be jointly or separately ground with the acidic raw meal components to be fine-grounded below 80 µm ($SiO_2$, $Al_2O_3$ and $Fe_2O_3$ carriers) to a grain class of 0.01–32 µm to 0.01–70 µm and the proportion of basic raw material components to be coarse-ground above 80 µm is ground separately to a grain class of 90–2000 µm to 200–2000 µm, and that the intermediate grain class with grain sizes from 70–90 µm to 32–200 µm of basic raw meal components is completely or partially removed.

Using this measurement it is already possible at low temperatures to accelerate the solid state reactions considerably and as a consequence to increase the formation of the easy to melt silicates such as CS and $C_3S_2$ instead of the $C_2S$. This results in an increase in the throughput of the kiln and reduction in the specific fuel requirement for the clinker production.

This may be explained as follows:

The present experimental and thermodynamic studies show that the mineral which forms first in the heterogeneous $CaO$—$SiO_2$ system independently of the $CaO:SiO_2$ ratio under metastable conditions is $C_2S$. Accordingly, with a $CaO:SiO_2$ molecular ratio of 1:1 or 3:2, CS or $C_2S_2$ can only be formed after the proportion of the CaO which is capable of solid state reaction, the $Ca^{2+}$ ions of which are the most mobile, is completely fixed. This means that the desired CS or $C_2S_2$ formation in the $CaO$—$SiO_2$ system is the slowest, because a specific time is required. That means that so long as the particles (<80 µm) of the basic and acidic raw meal components which are capable of solid state reaction have not been fixed up to 1200° C. (before the melt formation) and the difficult to melt $C_2S$ is preferably not fully converted to the easy to melt CS and $C_3S_2$ silicates, the proportion of melt in the alite formation in the sintering zone is not increased. As a consequence of this the new technology cannot be fully implemented.

An additional size reduction of the fine-ground proportion of the basic raw meal components and in particular of the acidic raw meal components, which should be capable of solid state reaction, to below 70 µm or 32 µm causes a considerable acceleration of the solid state reactions. This results in a prompt formation of the easy to melt silicates instead of the $C_2S$, which form the selected eutectic, before the raw meal is heated to approximately 1250° C. This leads to a consolidation and conservation of the chemical composition of the resulting new $SiO_2$-rich eutectic before it is melted. This results in an increase in the proportion of melt.

The coarsening of the proportion of the basic raw meal components which is capable of melting reaction (the grain class between 80–2000 µm) by the removal of the particles with a grain size of 80–90 µm up to 80–200 µm leads due to a reduction in the reaction surface of the basic raw meal components to a reduction in the topochemical formation of the $C_2S$ at 1200–1280° C. before the clinker melt appears. This results in an increase in the proportion of clinker melt. As a consequence thereof the reactivity of the raw meal can be increased.

In order to generalise the explanation described above it should be noted that the grain size range from 32 µm to 200 µm has an intermediate position as regards its reactivity (capable of solid state or melting reaction). Because of this it is sensible to remove this intermediate grain size range in order to increase the reactivity of the raw meal.

Further embodiments are described below:

For the laboratory investigations the same raw material components were used as in the example 1 the third embodiment, which are shown in Table 1.

The clay together with the pyrite cinder residue and the fine-ground proportion of the limestone separately were ground additionally to grain size ranges of 0.01–20 µm, 0.01–32 µm, 0.01–45 µm and 0.01–72 µm. The coarse-ground proportion of the limestone was ground to grain size ranges of 90–2000 µm, 125–2000 µm, 200–2000 µm and 250–2000 µm. The grain size ratios of the limestone are set out in Table 14.

TABLE 14

The grain size ranges of the limestone and the ratios thereof

| Grinding No. | Grain size fractions in % <80 μm | Grain size fractions in % >80 μm | Ratio of the fractions | Residue on the 80 μm sieve % | Specific energy consumption kWh/h |
|---|---|---|---|---|---|
| 1 Grinding | 0,01–32 | 80–2000 | 1,0:1,5 | 60 | 3,20 |
| 2 Grinding | 0,01–45 | 80–2000 | 1,0:1,5 | 60 | 2,87 |
| 3 Grinding | 0,01–72 | 80–2000 | 1,0:1,5 | 60 | 2,68 |
| 4 Grinding | 0,01–32 | 90–2000 | 1,0:1,0 | 50 | 3,10 |
| 5 Grinding | 0,01–45 | 125–2000 | 1,5:1,0 | 40 | 2,96 |
| 6 Grinding | 0,01–72 | 200–2000 | 1,5:1,0 | 40 | 2,85 |
| 7 Grinding - outside optimum range | 0,01–72 | 250–2000 | 1,5:1,0 | 40 | 2,61 |
| 8 Grinding - outside optimum range | 0,01–25 | 90–2000 | 1,0:1,0 | 50 | 3,60 |
| 9 Grinding - according to Claim 1 | 0,01–80 | 80–500 | 1,5:1,0 | 40 | 4,04 |

Table 14: The grain size ranges of the limestone and the ratios thereof

After this, based on the calculations carried out, raw mixtures were produced from the clay, pyrite cinder residue and the limestone fractions, the mixture ratios being shown in Table 6.

The homogenisation and burning of the raw meals was carried out as in the example according to the third embodiment.

The results of the investigations are shown in Table 15.

Table 15: Effect of the removal of the intermediate fractions from the limestone, clay and pyrite cinder residue on the reactivity of the raw meal

| | | | | Grain size fraction of the limestone | | Ratio between the raw meal components [%] | | | | Free lime content |
|---|---|---|---|---|---|---|---|---|---|---|
| | | | | | | Limestone fraction | Limestone fraction | Clay | Pyrite cinder residue | |
| Raw meal | LS II | SM | TM | <80 μm | >80 μm | <80 μm | >80 μm | >80 μm | <80 μm | [%] |
| 1 | 2 | 3 | 4 | 5 | 6 | 7 | 8 | 9 | 10 | 11 |
| | | | | Clay and pyrite cinder residue under 32 μm | | | | | | |
| 1 | 97 | 2,2 | 1,6 | 0,01–32 | 80–2000 | 32,13 | 48,21 | 18,62 | 1,04 | 0,24 |
| 2 | 97 | 2,2 | 1,6 | 0,01–45 | 80–2000 | 32,13 | 48,21 | 18,62 | 1,04 | 0,36 |
| 3 | 97 | 2,2 | 1,6 | 0,01–72 | 80–2000 | 32,13 | 48,21 | 18,62 | 1,04 | 0,51 |
| 4 | 97 | 2,2 | 1,6 | 0,01–32 | 90–2000 | 40,17 | 40,17 | 18,62 | 1,04 | 0,18 |
| 5 | 97 | 2,2 | 1,6 | 0,01–45 | 125–2000 | 32,13 | 48,21 | 18,62 | 1,04 | 0,31 |
| 6 | 97 | 2,2 | 1,6 | 0,01–72 | 200–2000 | 32,13 | 48,21 | 18,62 | 1,04 | 0,42 |
| | | | | Clay and pyrite cinder residue under 45 μm | | | | | | |
| 7 | 97 | 2,2 | 1,6 | 0,01–32 | 80–2000 | 32,13 | 48,21 | 18,62 | 1,04 | 0,33 |
| 8 | 97 | 2,2 | 1,6 | 0,01–45 | 80–2000 | 32,13 | 48,21 | 18,62 | 1,04 | 0,45 |
| 9 | 97 | 2,2 | 1,6 | 0,01–72 | 80–2000 | 32,13 | 48,21 | 18,62 | 1,04 | 0,59 |
| 10 | 97 | 2,2 | 1,6 | 0,01–32 | 90–2000 | 40,17 | 40,17 | 18,62 | 1,04 | 0,26 |
| 11 | 97 | 2,2 | 1,6 | 0,01–45 | 125–2000 | 32,13 | 48,21 | 18,62 | 1,04 | 0.42 |
| 12 | 97 | 2,2 | 1,6 | 0,01–72 | 200–2000 | 32,13 | 48,21 | 18,62 | 1,04 | 0,51 |
| | | | | Clay and pyrite cinder residue under 72 μm | | | | | | |
| 13 | 97 | 2,2 | 1,6 | 0,01–32 | 80–2000 | 32,13 | 48,21 | 18,62 | 1,04 | 0,45 |
| 14 | 97 | 2,2 | 1,6 | 0,01–45 | 80–2000 | 32,13 | 48,21 | 18,62 | 1,04 | 0,53 |
| 15 | 97 | 2,2 | 1,6 | 0,01–72 | 80–2000 | 32,13 | 48,21 | 18,62 | 1,04 | 0,60 |
| 16 | 97 | 2,2 | 1,6 | 0,01–32 | 90–2000 | 40,17 | 40,17 | 18,62 | 1,04 | 0,38 |
| 17 | 97 | 2,2 | 1,6 | 0,01–45 | 125–2000 | 32,13 | 48,21 | 18,62 | 1,04 | 0,59 |
| 18 | 97 | 2,2 | 1,6 | 0,01–72 | 2000–2000 | 32,13 | 48,21 | 18,62 | 1,04 | 0,60 |
| | | | | Outside optimum parameters - clay and pyrite cinder residue under 52 μm | | | | | | |
| 19 | 97 | 2,2 | 1,6 | 0,01–72 | 250–2000 | 32,13 | 48,21 | 18,62 | 1,04 | 1,53 |
| 1 | 2 | 3 | 4 | 5 | 6 | 7 | 8 | 9 | 10 | 11 |

-continued

| | | | | Grain size fraction of the limestone | | Ratio between the raw meal components [%] | | | | |
| | | | | | | Limestone fraction | Limestone fraction | Clay | Pyrite cinder residue | Free lime content |
| Raw meal | LS II | SM | TM | <80 μm | >80 μm | <80 μm | >80 μm | >80 μm | <80 μm | [%] |
|---|---|---|---|---|---|---|---|---|---|---|
| 20 | 97 | 2,2 | 1,6 | 0,01–25 | 90–2000 | 40,17 | 40,17 | 18,62 | 1,04 | 0,16 |
| | | | | Raw meal according to Claim 1 | | | | | | |
| 21 | 97 | 2,2 | 1,6 | 0,01–80 | 80–500 | 32,13 | 48,21 | | | 0,85 |

The present results show that a removal of the grain size fractions above and below 80 μm leads to an increase in the reactivity of the raw meal.

The invention is not limited only to the embodiments described. Thus, for example, a removal of the intermediate fractional range of 32–200 μm in the raw meal can be carried out completely or also partially.

In a further embodiment of the invention it is proposed that with a grain class ratio of the 0.01–80 μm grain class to the >80.01 μm grain class of basic raw meal components of 1.5:1 to 1:9 the grain size fraction of basic raw meal components which is enriched with quartz crystal grains greater than 40 μm is separated off and is then fine-ground below 40–80 μm with the acidic raw meal components which are to be fine-ground and with the basic raw meal component to be provided accordingly for the proportion to be fine-ground.

In this way it is already possible at relatively low temperatures considerably to accelerate the solid state reactions of the chemical fixing of the quartz and to increase the formation of the easy to melt silicates such as CS and $C_3S_2$ instead of the $C_2S$. This results in an increase in the throughput of the kiln and reduction in the specific fuel requirement for the clinker production.

This may be explained as follows:

The quartz grains are about twice as hard as calcite grains. This results during raw meal grinding in an enrichment of the quartz in a grain size range which corresponds to the most common grain sizes of the quartz.

If the quartz grains are finely and regularly distributed in the rock, i.e. the quartz grains are present below 40 μm, there is no danger of hindering the reactivity of the raw meal If the quartz grain size is above 40 μm the reactivity of the raw meal both according to conventional technology, where the raw meal is usually fine-ground, and in the new technology, where the basic raw meal component is coarse-ground, is considerably hindered.

The coarse quartz particles (>40 mm) cannot be completely chemically fixed in a low temperature range of 900–1200° C. This leads to the presence of excess free CaO which is capable of solid state reaction. This results in the unwanted topochemical formation of the $C_2S$ silicates instead of the easy to melt Cs or $C_3S_2$ silicates. In this way, since the coarse quartz grains cannot be converted to the easy to melt silicates (CS and $C_3S_2$), the proportion of melt is reduced and the clinker formation is hindered. For this reason it is necessary to separate off the coarse grain range enriched with $SiO_2$ and to fine-grind it below 40–70 μm.

Further embodiments of the invention are described below:

For the investigations the limestone, clay and pyrite cinder residue from a cement works were used, the chemical composition of which is set out in Table 16.

TABLE 16

Chemical compositon of the raw materials

| Components | Limestone | Clay | Pyrite cinder |
|---|---|---|---|
| Loss on ignition | 40.66 | 13.95 | 8.70 |
| $SiO_2$ | 5.40 | 54.68 | 12.20 |
| $Al_2O_3$ | 1.13 | 15.41 | 2.58 |
| $Fe_2O_3$ | 0.56 | 3.83 | 68.70 |
| CaO | 51.15 | 8.93 | 2.25 |
| MgO | 0.84 | 1.43 | 0.98 |
| $SO_3$ | 0.12 | 0.60 | 3.45 |
| $K_2O$ | 0.05 | 0.71 | 0.65 |
| $Na_2O$ | 0.03 | 0.36 | 0.31 |
| Rest | 0.06 | 0.1 | 0.19 |
| Total | 100 | 100 | 100 |

The proportion of quartz in the limestone according to chemical analysis amounts to 2.8%. On the basis of its computer-determined calcite content of 91% this material may be designated as marly limestone. The character of the quartz distribution was examined with the aid of thin sections in transmitted light. The quartz often shows a zonal structure. The grain size of the elongated crystals ranges from 150*70 μm to 600*150 μm. The commonest grain size of the quartz is about 180*90 μm. In order to establish the distribution of the quartz, the coarse-ground limestone with a residue on the 80 μm sieve of 50% was divided by means of hand sieving into the <32 μm, 32–63 μm, 63–90 μm, 90–125 μm, 125–200 μm, 200–250 μm, 250–315 μm, 315–500 μm, 500–1000 μm and >1000 μm grain size fractions.

The quartz content of the total sample and of the individual fractions was analysed using chemical analysis. The results may be seen from Table 17.

TABLE 17

Effect of the grinding on the quartz distribution between the grain classes

| Proportion of material [%] | Total sample | Grain size fraction [%] | | | | | | | | |
|---|---|---|---|---|---|---|---|---|---|---|
| | | >1000 | 315–500 | 250–315 | 200–250 | 125–200 | 80–125 | 63–80 | 32–63 | <32 |
| Fractional proportion | 100 | 2,4 | 4,1 | 5,3 | 8,5 | 15,5 | 9 | 5,4 | 7,0 | 39,6 |
| Quartz content in individual fractions | 2,2 | 2,2 | 2,15 | 2,14 | 2,11 | 2,64 | 4,31 | 4,07 | 2,75 | 1,24 |
| Quartz fraction total content | 100 | 2,27 | 4,09 | 5,00 | 8,18 | 18,64 | 17,73 | 10,00 | 8,64 | 22,27 |

The ground limestone is distinguished by a marked enrichment of the quartz content in a range from 63–200 µm. This quartz-enriched range corresponds to the maximum proportion of the quartz in crystal grains of 180*90 mm. It is obvious that a quartz enrichment in the coarse grain fractions is not favourable either for the usual fine-ground raw meal nor for the coarse-ground raw meal.

In order to establish the negative effect of the quartz enrichment in the grain size fraction of 63–200 µm on the reactivity of the raw meal, a grain size range of 63 µm to 200 µm was separated off from the second half of the coarse-ground limestone, then reground below 40 µm and afterwards put back with the remaining proportion of this half. Thus it is possible for almost half of the quartz, more precisely 1.02% of 2.2% or 46.37% of the total quartz content, to be ground below 40 µm. Finally the following two raw meals were produced:

the first raw meal on the basis of the first half of the coarse-ground limestone, the second raw meal on the basis of the second half of the coarse-ground limestone in which a quartz-enriched grain class of 63–200 µm was redone below 40 µm.

The raw meal preparation and the roasting of the raw meals were carried out precisely as in the example according to the third embodiment.

The ratio of the grain size fractions of limestone between below 80 µm and above 80 µm, and the ratio of the raw meal components and moreover the free lime content in roasted samples are set out in Table 18.

It follows from the present data that in the raw meal roasted within 30 minutes at 1450° C., of which the limestone in a grain size range of 63–200 µm is not reground, the free lime content is markedly higher than in the kiln feed from the raw meal of which the limestone in quartz-enriched fraction of 36–200 µm is reground. From this it may be concluded that, if the grain size range of the basic raw meal component enriched with coarsely crystalline quartz is not reground, the new technology cannot function. This means that the clinker formation progresses according to the conventional mechanism.

The invention is not limited only to the embodiments described. Thus for example the separation and subsequent regrinding below 40–80 µm of the grain class of the basic raw meal component enriched with the coarsely crystalline quartz can take place during the common grinding of all raw materials.

TABLE 18

Effect on the reactivity of the raw meal of the regrinding of the grain fraction of the basic raw material enriched with coarse-crystalline quartz

| | | | Raw material ratio [%] | | | Chemical composition of the raw meal [%] | | | | | | Ratio between limestone fractions <80 >80 µm | Residue of the raw meal on the 80 µm sieve [%] | Free lime content [%] |
|---|---|---|---|---|---|---|---|---|---|---|---|---|---|---|
| Nt IPI | SM | MT | Lime-stone | Clay | Pyrite cinder residue | Loss on igni-tion | SiO$_2$ | Al$_2$O$_3$ | Fe$_2$O$_3$ | CaO | | | | |
| The quartz-enriched range from 63–200 µm is nor reground | | | | | | | | | | | | | | |
| 95 | 2,5 | 1,8 | 81,08 | 17,65 | 1,27 | | 65,54 | 14,18 | 3,67 | 2,00 | 43,08 | 1,17:1,0 | 37,3 | 6,23 |
| The quartz-enriched range from 63–200 µm was reground below 40 µm | | | | | | | | | | | | | | |
| 95 | 2,5 | 1,8 | 81,08 | 17,65 | 1,27 | | 35,54 | 14,18 | 3,67 | 2,00 | 43,08 | 1,70:1,0 | 30,0 | 0,89 |

In a further embodiment of the invention it is proposed that the proportion of basic (calcite-containing) raw meal components to be coarse-ground above 80 µm should be ground separately and the proportion of basic (calcite-containing) raw meal components to be fine-ground below 80 µm should be ground together with the acidic raw meal components to be fine-ground below 80 µm, and then without previous mixing should be directly delivered, jointly or separately and using a known method in a corresponding ratio based on an optimum LS II, for roasting.

By this measure it is possible to increase the reactivity of the raw meal, i.e. to increase the throughput of the kiln and to lower the fuel requirement for burning the clinker.

This may be explained as follows:

It is known that in fine grinding of the kiln feed formation of agglomerates and coating of the grinding media take place. Such re-solidification of fine-ground material is caused by:

- static electricity. The finest particles are charged with static electricity during grinding. The particles charged with an unequal electrical charge attract one another and agglomerate in this way.
- surface energies. The valence of atoms or groups of atoms on the surface of solid bodies is (possibly and when the grinding aids are used) not completely saturated.

preparation and the roasting of the raw meals were carried out precisely as in the example according to the third embodimet. The only exception is the raw meal preparation according to the design of this part of the invention.

The proportion of the raw materials to be ground below 80 $\mu$m was ground jointly, and the calcite-containing proportion of the basic raw meal component to be ground above 80 $\mu$m was ground separately.

The raw material ratios and grain size ranges of raw meals used with the influence of the homogenisation process before the roasting is set out in Table 19.

TABLE 19

Influence of the method of mixing on the reactivity of the raw meal.

| Raw meal | LS II | SM | TM | Grain size fraction of the limestone [$\mu$m] <80 $\mu$m / >80 $\mu$m | Ratio between the raw meal components [%] Limestone fraction <80 $\mu$m | Limestone fraction >80 $\mu$m | Clay | Pyrite cinder residue | Free lime content [%] |
|---|---|---|---|---|---|---|---|---|---|
| Common grinding of all raw material components |
| 1 | 97 | 2,2 | 1,6 | 0,01–80 80,01–2000 | 32,13 | 48,23 | 18,62 | 1,04 | 0,61 |
| 2 | 97 | 2,2 | 1,6 | 0,01–45 80,01–2000 | 32,13 | 48,23 | 18,62 | 1,04 | 0,33 |
| 3 | 95 | 2,5 | 1,83 | 0,01–63 125–1500 | 51,08 | 30,00 | 17,65 | 1,27 | 0,82 |
| Separate grinding of all raw material components with subsequent homogenisation of the raw meal in the mixer with mixing elements before the roasting |
| 4 | 97 | 2,2 | 1,6 | 0,01–80 80,01–2000 | 32,13 | 48,23 | 18,62 | 1,04 | 0,67 |
| 5 | 97 | 2,2 | 1,6 | 0,01–45 80,01–2000 | 32,13 | 48,23 | 18,62 | 1,04 | 0,36 |
| 6 | 95 | 2,5 | 1,83 | 0,01–63 125–1500 | 51,08 | 30,00 | 17,65 | 1,27 | 0,89 |
| Common grinding of acidic raw meal components with the proportion of the basic raw meal component to be fine-ground. Homogenisation of the raw meal in the mixer wihtout mixing elements before the roasting. |
| 7 | 97 | 2,2 | 1,6 | 0,01–80 80,01–2000 | 32,13 | 48,23 | 18,62 | 1,04 | 0,46 |
| 8 | 97 | 2,2 | 1,6 | 0,01–45 80,01–2000 | 32,13 | 48,23 | 18,62 | 1,04 | 0,24 |
| 9 | 95 | 2,5 | 1,83 | 0,01–63 125–1500 | 51,08 | 30,00 | 17,65 | 1,27 | 0,73 | mechanical packing. The agglomerates are pounded and tamped down when the grinding elements collide.

These phenomena can be used advantageously for increasing the reactivity of the raw meal under conditions of the new technology.

The formation of the agglomerates only from the fine proportion of the homogenised raw meal with subsequent tamping of the agglomerates leads on the one hand, due to compacting of the raw meal, i.e. by a reduction of the distance between fine particles, to an increase in the rate of solid state reactions. As a consequence of this the conversion of the $SiO_2$ and of the fine-ground calcite to easy to melt CS and $C_3S_2$ with temporary formation of $C_2$ is increased.

On the other hand, due to the absence of homogenisation, a reduction in the surface reactions between the fine-ground proportion and the coarse-ground proportion of the raw meal leads to conservation and consolidation of the easy to melt composition of the kiln feed. At the finishing burn temperature this results in an increase in the proportion of melt and the reactivity of raw meal.

Further embodiments of the invention are described below:

For the investigations the same raw meal components were used as in the examples 3 and 6. The raw meal The present data show clearly that the joint grinding of the proportion of raw meal which is to be fine-ground improves the reactivity of the raw meal.

In a further preferred embodiment it is provided that the fractional proportion of the raw meal present below 80 $\mu$m, i.e. the proportion of basic (calcite-containing) raw meal components ground below 80 $\mu$m together with the acidic raw meal components ground below 80 $\mu$m, are delivered separately before the proportion of basic raw meal components ground above 80 $\mu$m, into the string of the double-string cyclone preheater, with a calcination stage divided into a stage for precalcination and a stage for recalcination, which is heated by the exhaust gases from the sintering stage, and the proportion of the basic raw meal component ground above 80 $\mu$m is delivered separately to the second string, which is heated by the hot gases from the hot gas producer of the precalcination arrangement.

By this measure it is possible to increase the reactivity of the raw meal, i.e. to increase the throughput of the kiln and to reduce the fuel requirement for roasting the clinker.

This is explained as follows:

1) In order to avoid the emission of $SO_3$, $Cl_2$ and $F_2$ it is advantageous to pass the kiln gases through the fine-ground proportion of the raw meal. The reason for this is the increased reaction surface.
2) The presence of gaseous secondary components, such as volatile Cl, F, S and alkali compounds, in the kiln gases accelerates the chemical conversions of the coarse-grained quartz particles. This is particularly important for increasing the CS and/or $C_3S_2$ proportion instead of the $C_2S$. This results in an increase in the proportion of clinker melt and the reactivity of the raw meal.

3) The reduction in the formation of deposits in the inlet chamber and in the lowest cyclones of the heat exchanger.

4) Heating of the fine-ground proportion of raw meal separately from the coarse-ground proportion of raw meal improves conditions for increasing the quantity of clinker melt.

Further embodiments of the invention are described below:

For the investigations the raw meal 4 from the example according to claim 3 was used. The raw meal was distributed over three samples and first of all 0.5% $MgSiF_6$, 0.5% $CaCl_2$ and 1.0% $Na_2O$ with $K_2O$ were fed separately into the proportion of the raw meal to be fine-ground in a ratio of 1:3, then ground and homogenised. In this way the cycle was simulated. The raw meal preparation and roasting treatment were carried out in precisely the same way as in the example according to the third embodiment.

In order to determine the separate effects of the $MgSiF_6$, $CaCl_2$ and of the alkalis on the degree of quartz fixing, the free quartz content in the kiln feed at 1200° C. was additionally analysed.

The data obtained are set out in Table 20.

From the results it follows that the content of unfixed quartzite in the samples with $MgSiF_6$, $CaCl_2$ and alkalis at 1200° C. is lower than in the raw meal without addition. This causes a reduction in the free lime content in the kiln feed in the finishing burn range (1450° C. after 30 minutes of isothermal burning), since the proportion of melt increases because of the formation of CS and/or $C_3S_2$ instead of the $C_2S$.

Moreover the present data show that the positive effect of the additions of $MgSiF_6$, $CaCl_2$ and alkalis on the reactivity of the raw meal, in which the limestone is course-ground as claimed in this invention, is more effective than on the reference raw meal which is fine-ground according to the usual technology.

The invention is not limited only to the embodiments described. Thus for example the separate supply of the proportion of raw meal ground below 80 μm can be delivered in either string of the double-string cyclone preheater in which both strings are heated by the exhaust gases from the sintering stage.

In a further embodiment it is provided that taking account of the effect of the circulation of alkali on the actual content of alkalis in the hot meal when it is fed into the sintering stage and in conformity with the actual content of the MgO capable of solid state reaction in the hot meal, i.e. with the MgO content in the proportion of the raw meal ground below 80 μm, the ratio of the MgO content to the total alkali content in the feeding of the MgO or alkali correcting additions must lie in a range from 2:1 to 5:1.

By this measure it is possible to increase the reactivity of the raw meal, i.e. to increase the throughput of the kiln and to lower the fuel requirement for roasting the clinker. Furthermore the sulphate resistance and the resistance over time of the cement increases.

This is explained as follows:

During cement roasting in the rotary kiln a proportion of the alkalis volatilises and gives rise to an alkali circulation. The $SO_2$ produced from the raw meal and fuel combines in the kiln gas, whilst taking up oxygen, with the volatilised alkali to form vaporous alkali sulphate, which condenses on the kiln feed in the colder kiln zones and in the preheater and

TABLE 20

Effect of the additives containing F, Cl and alikali on the reactivity of the raw meal

| Raw meal | LS II | SM | TM | Grain range of the lime-stone [%] | Ratio between the raw meal components [%] | | | | Quartz content at 1200° C. [%] | Free lime content at 1450° C. [%] |
|---|---|---|---|---|---|---|---|---|---|---|
| | | | | | Limestone fraction <80 μm | Limestone fraction >80 μm | Clay <80 μm | Pyrite cinder residue >80 μm | | |
| according to Claim 3 | 97 | 2,2 | 1,6 | 0,01–2000 | 24,10 | 56,24 | 18,62 | 1,04 | 2,01 | 0,81 |
| with 0.5% $MgSiF_4$ | 97 | 2,2 | 1,6 | 0,01–2000 | 24,10 | 56,24 | 18,62 | 1,04 | 0,84 | 0,19 |
| with 0.5% $CaCl_2$ | 97 | 2,2 | 1,6 | 0,01–2000 | 24,10 | 56,24 | 18,62 | 1,04 | 0,95 | 0,23 |
| with 1% $Na_2O + K_2O$ | 97 | 2,2 | 1,6 | 0,01–2000 | 24,10 | 56,24 | 18,62 | 1,04 | 1,23 | 0,64 |
| Reference raw meal | 97 | 2,2 | 1,6 | 0,01–250 | 79,00 | 1,33 | 18,62 | 1,04 | 1,90 | 0,93 |
| Reference raw meal with 0.5% $MgSiF_4$ | 97 | 2,2 | 1,6 | 9,01–250 | 79,00 | 1,33 | 18,62 | 1,04 | 0,98 | 0,70 |
| Reference raw meal with 1% $Na_2O + K_2O$ | 97 | 1,2 | 1,6 | 0,01–250 | 79,00 | 1,33 | 18,62 | 1,04 | 1,15 | 1,26 | calciner. As a consequence of this the alkali sulphate principally travels back with the kiln feed to the sintering zone and by virtue of its low volatility, if not decomposed under low $O_2$ partial pressure and high temperature, is discharged in the clinker. The alkali carbonates, in so far as they are not fixed in the clinker phases, are again vaporised in the sintering zone. Thus the concentration of the alkalis in the kiln feed increases between the sintering zone and cyclone preheater. On the one hand this accelerates the solid state reactions, specifically the quartz conversions, on the other hand this hinders the alite formation. In order to avoid the negative effect of the alkalis on the alite formation and to improve the sulphate resistance and the resistance over time of the cement, it is necessary to combine the alkalis at the end of the clinker formation with the alkali magnesia silicates, namely $Na_2O*MgO*SiO_2$ and $K_2O*MgO*6SiO_2$. Alkali magnesia silicates which are produced can also chemically activate the quartz.

No problems occur with the constancy of volume, since the alkali magnesia silicate $Na_2O*MgO*SiO_2*K_2O*MgO*SiO_2$ is temperature-resistance to 1450° C. and the alite produced under conditions of the new technology can contain more MgO.

Further embodiments are described below. For the investigations the raw meal 4 from the example according to the third embodiment was used. The alkalis and magnesium were fed separately to the raw meal, which was distributed over five samples, and then homogenised. The quantitative ratios are set out in Table 21.

TABLE 21

Quantitative ratio of the additives in the raw meals to be roasted.

| | Additive content (on annealed material) [%] | | | | |
|---|---|---|---|---|---|
| Additives | Sample 1 | Sample 2 | Sample 3 | Sample 4 | Sample 5 |
| $Na_2O$ | 0,4 | 0,4 | 0,4 | 0,4 | 0,4 |
| $Kg_2O$ | 1,1 | 1,1 | 1,1 | 1,1 | 1,1 |
| MgO | 1,5 | 3,0 | 4,0 | 5,0 | 8,0 |

TABLE 22

Effect of the MgO:alkali ratio on the reactivity of the raw meal.

| Raw meal | Alkali content | MgO content | LS II | SM | TM | Grain size range of the limestone [μm] | Ratio between the raw meal components [%] | | | | Free quartz content [%] | Free lime content [%] |
|---|---|---|---|---|---|---|---|---|---|---|---|---|
| | | | | | | | Limestone fraction <80 μm | Limestone fraction >80 μm | Clay <80 μm | Pyrite cinder residue >80 μm | | |
| 1 | 1,5 | 1,5 | 97 | 2,2 | 1,6 | 0,01–2000 | 24,10 | 56,24 | 18,62 | 1,04 | 1,20 | 0,63 |
| 2 | 1,5 | 3,0 | 97 | 2,2 | 1,6 | 0,01–2000 | 24,10 | 56,24 | 18,62 | 1,04 | 1,01 | 0,47 |
| 3 | 1,5 | 4,0 | 97 | 2,2 | 1,6 | 0,01–2000 | 24,10 | 56,24 | 18,62 | 1,04 | 0,90 | 0,42 |
| 4 | 1,5 | 6,0 | 97 | 2,2 | 1,6 | 0,01–2000 | 24,10 | 56,24 | 18,62 | 1,04 | 0,88 | 0,40 |
| 5 | 1,5 | 8,0 | 97 | 2,2 | 1,6 | 0,01–2000 | 24,10 | 56,24 | 18,62 | 1,04 | 0,92 | 0,41 |

TABLE 23

Effect of the MgO content on the sulphate resistance.

| Alkali content [%] | MgO content [%] | Degree of sulphate resistance Na₂SO₄ content in the hardening solution [%] | | |
|---|---|---|---|---|
| | | 0,37 | 0,92 | 3,0 |
| 0,5 | 1,5 | 0,79 | 0,73 | 0,64 |
| 1,5 | 4,0 | 0,83 | 0,81 | 0,73 |

The raw meal preparation and roasting treatment were carried out in precisely the same way as in the example according to the third embodiment.

In order to determine the effect of the total presence of the MgO with the alkalis in various ratios on the reactivity of the quartz and overall of the raw meal, the free quartz content at 1200° C. and the free lime content at 1450° C. as analysed by wet chemistry after the 30 minute duration in the kiln feed. The data obtained are shown in Table 22.

The present results show clearly that under optimally MgO:alkali ratios the reactivity of the raw meal (Table 22) and the sulphate resistance of the cement (Table 23) is increased. As the mineralogical investigations have shown, these positive effects are connected with the formation of the alkali magnesium silicates.

In a fifth embodiment of the invention using a grain class ratio of the 0.01–80 μm grain class to the >80.01 μm grain class of basic raw meal components or of the raw meal from 1.5:1 to 1:9, the coarse grain class of basic raw meal components which is present with grain sizes of 80–500 to 80–2000 μm is introduced separately in a corresponding quantity directly through the kiln flame or through the opposite side of the kiln behind the sintering zone into a temperature range of 1250–1350° C. in order to incorporate the introduced coarse grain class of basic raw meal component with grain sizes from 80–500 to 80–2000 μm into the clinker.

The quantity of the basic raw meal component above 80 μm can be sufficiently high to ensure the complete incorporation into the clinker.

A preferred object of the invention according to the fifth embodiment is a reduction of the topochemical $C_2S$ formation instead of the CS and $C_3S_2$ immediately before the sintering zone. Thus the conditions for the formation of the new $SiO_2$-rich eutectic are favoured and consequently the proportion of melt is increased.

By this measure it is possible to increase the reactivity of the raw meal, i.e. to increase the throughput of the kiln and to reduce the fuel requirement for roasting the clinker.

By this measure it is possible, as it already was previously, to increase the reactivity of the raw meal.

This is explained as follows:

The separation and separate introduction of the coarse fractional proportion of the basic raw meal component into the kiln in a temperature range of 1250–1350° C. causes in the kiln feed even better conditions than according to the third embodiment for the conservation and consolidation of the easy to melt composition of the $SiO_2$-enriched new eutectic. This results in an even greater increase in the proportion of melt with the chemical composition of the $SiO_2$-enriched eutectic. This leads to an increase in the raw meal reactivity. Furthermore, the formation of the freshly produced free lime causes immediately before and in the sintering zone an increase in the chemical activity of the free lime, since the free lime is fine and not yet recrystallised.

Embodiments of the invention according to fifth embodiment are set out below:

For the investigations the raw meal 7 from Table 19 was used. The raw meal preparation and the burning behaviour differ in these investigations only in that the coarse fractional proportion of the basic raw meal component in comparison with the example of the implementation process was delivered to the fine-ground proportion of the raw meal not from the start of roasting but after the fine-ground proportion of raw meal had already been heated to 1250–1350° C. in the rotating laboratory kiln. The results are set out in Table 24.

From the present data it follows that the reactivity of the coarse-ground raw meal under the conditions carried out according to fifth embodiment, i.e. with separate feeding of the coarse-ground proportion of limestone to the fine-ground proportion of raw material previously heated in the rotating kiln up to 1250–1350° C., increases.

TABLE 24

Effect on the reactivity of the raw meal of the separate introduction of the coarse-ground proportion of limestone to the fine-ground proportion of raw meal previously heated in the rotating kiln up to 1250–1350° C.

| Raw meal | LS II | SM | TM | Grain size range of the limestone [μm] | | Ratio between the raw meal components [%] | | | | Temperature of the preliminary heating of the fine proportion of raw meal [° C.] | Free lime content [%] |
|---|---|---|---|---|---|---|---|---|---|---|---|
| | | | | | | Limestone fraction | Limestone fraction | Clay | Pyrite cinder residue | | |
| | | | | <80 μm | >80 μm | <80 μm | >80 μm | >80 μm | >80 μm | | |
| Common fine grinding of acidic raw meal components with the proportion of limestone to be fine-ground and separate grinding of the proportion of limestone to be coarse-ground. The coarse-ground proportion of limestone was delivered to the fine-ground proportion of raw meal before the commencement of roasting. | | | | | | | | | | | |
| 1 | 97 | 3.3 | 1.6 | 0.01–80 | 80.01–2000 | 32.13 | 48.23 | 18.62 | 1.04 | | 0.46 |
| The coarse-ground proportion of limestone was delivered to the fine-ground proportion of raw meal before the fine-ground proportion of raw meal had been heated up to 1250–1350° C. in the rotating kiln. | | | | | | | | | | | |

TABLE 24-continued

Effect on the reactivity of the raw meal of the
separate introduction of the coarse-ground proportion of
limestone to the fine-ground proportion of raw meal previously
heated in the rotating kiln up to 1250–1350° C.

| Raw meal | LS II | SM | TM | Grain size range of the limestone [μm] | | Ratio between the raw meal components [%] | | | | Temperature of the preliminary heating of the fine proportion of raw meal [° C.] | Free lime content [%] |
|---|---|---|---|---|---|---|---|---|---|---|---|
| | | | | <80 μm | >80 μm | Limestone fraction <80 μm | Limestone fraction >80 μm | Clay >80 μm | Pyrite cinder residue >80 μm | | |
| 2 | 97 | 3.3 | 1.6 | 0.01–80 | 80.01–2000 | 32.13 | 48.23 | 18.62 | 1.04 | 1250 | 0.28 |
| 3 | 97 | 3.3 | 1.6 | 0.01–80 | 80.01–2000 | 32.13 | 48.23 | 18.62 | 1.04 | 1300 | 0.23 |
| 4 | 97 | 3.3 | 1.6 | 0.01–80 | 80.01–2000 | 32.13 | 48.23 | 18.62 | 1.04 | 1350 | 0.38 |
| 5 | 97 | 3.3 | 1.6 | 0.01–80 | 80.01–2000 | 32.13 | 48.23 | 18.62 | 1.04 | 1400 | 1.80 |
| 6 | 97 | 3.3 | 1.6 | 0.01–80 | 80.01–2000 | 32.13 | 48.23 | 18.62 | 1.04 | 1200 | 0.410.45 |

The invention is not limited only to the embodiment described. Thus for example the proportion of the raw meal which has been separated off can be introduced both in the preheated state and in the calcined state into the kiln in a temperature range of 1250–1350° C.

In a sixth embodiment of the invention using a grain class ratio of the 0.01–80 μm grain class to the >80.01 μm grain class of basic raw meal components or of the raw meal from 1.5:1 to 1:9, the intermediate grain class of the basic raw meal component with grain sizes of 60–125 μm to 80–200 μm is introduced separately in a more or less great quantity directly through the kiln flame or through the opposite side of the kiln behind the sintering zone into a temperature range of 1250–1400° C. in order to incorporate the introduced intermediate grain class of basic raw meal component with grain sizes from 60–125 to 80–200 μm into the clinker.

A preferred object of the invention is a reduction of the topochemical $C_2S$ formation instead of the CS and $C_3S_2$ immediately before the sintering zone. Thus the conditions for the formation of the new $SiO_2$-rich eutectic are favoured and consequently the proportion of melt is increased.

By this measure it is possible, as described above, to increase the reactivity of the raw meal.

The separation and separate introduction of the intermediate fractional proportion of the basic raw meal component into the kiln in a temperature range of 1250–1400° C. causes in the kiln feed even better conditions than according to the third embodiment for the conservation and consolidation of the easy to melt composition of the $SiO_2$-enriched new eutectic. This results in an even greater increase in the proportion of melt and the reactivity of the raw meal. The freshly formed free lime of calcite particles with a size of 60–200 μm is immediately incorporated into the clinker, since the proportion of the intermediate grain size particles of 60–200 μm is smaller than the grain size fractional proportion of 80–2000 μm. The absence of the calcium carbonate particles smaller than 60 μm in the intermediate grain size fraction precludes the discharge of dust when it is fed through the kiln flame behind the sintering zone into a temperature range of 1250–1450° C. Furthermore the intermediate grain size fraction is relatively narrower in grain size range than the entire range above 80 μm, namely from 80 to 2000 μm. Because of this it is possible to accomplish the delivery of the intermediate grain size fraction of the basic raw meal component into the region between the sintering and transition zones of the kiln more precisely. On the basis of the above explanation it may be established that a preferred object of this part of the invention is to preclude the $C_2S$ formation immediately before the sintering zone. In this case the proportion of melt is increased by the prevention of the formation of the usual eutectic.

Examples of the sixth embodiment of the invention are described below

For the investigations the raw meal 4 from Table 11 and the raw meal 7 from Table 19 were used. The raw meal preparation and the roasting behaviour in the rotating kiln were carried out as follows.

The intermediate grain size fractions of the basic raw meal component of 60–200 μm were separated off. The rest of the basic raw meal component, i.e. the particles smaller than 60 mm and the particles above 200 μm, were delivered together with the acidic raw meal components into the electrically heated laboratory rotary kiln which had previously been heated to 600° C. In order to heat the samples homogeneously at 600° C. they were kept isothermally for 3 minutes from the start of roasting. Then, before the intermediate grain size fraction of the basic raw meal component was delivered into the rotating kiln, the remaining principal proportion of the raw meal was heated from 600° C. up to 1250–1450° C. with a uniform heating speed of 17° C./min. Thereafter the cut size of the basic raw meal component is delivered to the remaining principal proportion of the raw meal preheated in the rotating kiln to 1250–1450° C. Afterwards the entire sample was kept isothermally for 3 minutes at the necessary temperature in a range from 1250–1450° C. and further heated to the finishing burn temperature (1450° C.) at the same heating speed of 17° C./min and then kept isothermally for 30 minutes in each case. At the end of the roasting the clinker obtained was rapidly cooled to room temperature with static air.

The results of the investigations carried out are presented in Table 25.

The present invention show clearly that by the delivery of the separated-off intermediate grain size proportion (particles of 60–200 μm of the basic raw meal component (particles of 0–2000 μm) into the region between the sintering and transition zones of the kiln at temperatures of 1250–1450° C. the reactivity of the raw meal is increased. This confirms a reduction in the free lime content in the obtained clinker. This results in an increase in the throughput of the kiln and a reduction of the fuel requirement for roasting the clinker.

TABLE 25

Effect on the reactivity of the raw meal of separating off the intermediate fractional proportion of basic raw meal component with subsequent feeding into the temperature range between transition and sintering zones at 1250–1400° C.

| Raw meal | LS II | SM | TM | Grain size distribution of the limestone [μm] | | | Ratio between the raw meal components [%] | | | | | Feed temperature Pyrite cinder residue | Free lime content |
| | | | | Fine fraction | Intermediate fraction | Coarse fraction | Limestone fraction | | | Clay | limestone intermediate fraction [° C.] | [%] |
| | | | | | | | Fine | Intermediate | Coarse | | | |
|---|---|---|---|---|---|---|---|---|---|---|---|---|
| | | | | | | Under optimum conditions | | | | | | |
| 1 | 97 | 2.2 | 1.6 | 0.01–63 | 63.01–90 | 90.01–2000 | 28.63 | 5.90 | 45.83 | 18.62 | 1.04 | 1300 | 0.20 |
| 2 | 97 | 2.2 | 1.6 | 0.01–63 | 63.01–125 | 125.01–2000 | 28.63 | 10.20 | 41.53 | 18.62 | 1.04 | 1300 | 0.15 |
| 3 | 97 | 2.2 | 1.6 | 0.01–63 | 63.01–200 | 200.01–2000 | 28.63 | 14.50 | 37.23 | 18.62 | 1.04 | 1300 | 0.19 |
| 4 | 97 | 2.2 | 1.6 | 0.01–72 | 72.01–125 | 125.01–2000 | 30.33 | 8.50 | 41.53 | 18.62 | 1.04 | 1300 | 0.27 |
| 5 | 97 | 2.2 | 1.6 | 0.01–80 | 80.01–200 | 200.01–2000 | 32.13 | 11.00 | 37.23 | 18.62 | 1.04 | 1300 | 0.22 |
| 6 | 97 | 2.2 | 1.6 | 0.01–63 | 63.01–125 | 125.01–2000 | 28.63 | 10.20 | 41.53 | 18.62 | 1.04 | 1250 | 0.23 |
| 7 | 97 | 2.2 | 1.6 | 0.01–63 | 63.01–125 | 125.01–2000 | 28.63 | 10.20 | 41.53 | 18.62 | 1.04 | 1350 | 0.20 |
| 8 | 97 | 2.2 | 1.6 | 0.01–63 | 63.01–125 | 125.01–2000 | 28.63 | 10.20 | 41.53 | 18.62 | 1.04 | 1400 | 0.45 |
| 9 | 97 | 2.2 | 1.6 | 0.01–63 | 63.01–200 | 200.01–2000 | 28.63 | 14.50 | 37.23 | 18.62 | 1.04 | 1250 | 0.25 |
| 10 | 97 | 2.2 | 1.6 | 0.01–63 | 63.01–90 | 90.01–2000 | 28.63 | 5.90 | 45.83 | 18.62 | 1.04 | 1400 | 0.30 |
| | | | | | | Outside optimum conditions | | | | | | |
| 11 | 97 | 2.2 | 1.6 | 0.10–15 | 45.01–80 | 80.01–2000 | 25.03 | 7.10 | 48.23 | 18.62 | 1.04 | 1300 | 1.30 |
| 12 | 97 | 2.2 | 1.6 | 0.01–90 | 90.01–250 | 250.01–2000 | 32.13 | 7.60 | 40.63 | 18.62 | 1.04 | 1300 | 0.90 |
| 13 | 97 | 2.2 | 1.6 | 0.01–63 | 63.01–125 | 125.01–2000 | 28.63 | 10.20 | 41.53 | 18.62 | 1.04 | 1200 | 0.78 |
| 14 | 97 | 2.2 | 1.6 | 0.01–63 | 63.01–125 | 125.01–2000 | 28.63 | 10.20 | 41.53 | 18.62 | 1.04 | 1450 | 0.91 |
| | | | | For comparison an example according to Claim 7 of the raw meal 4. Common grinding of all raw material components | | | | | | | | |
| 15 | 97 | 2.2 | 1.6 | 0.01–80 | — | 80.01–2000 | 32.13 | — | 48.23 | 18.62 | 1.04 | — | 0.46 |
| | | | | For comparison an example according to Claim 7 of the raw meal 7. Common grinding of acidic raw materials with proportion of limestone to be fine-ground and separate grinding of proportion of limestone to be coarse-ground without preliminary homogenisation of the raw meal before roasting. | | | | | | | | |
| 16 | 97 | 2.2 | 1.6 | 0.01–45 | — | 80.01–2000 | 32.13 | — | 48.23 | 18.62 | 1.04 | — | 0.24 |

In a seventh embodiment of the invention it is provided that, with a grain class ratio of the 0.01–80 μm grain class to the >80.01 μm grain class of basic raw meal components or of the raw meal from 1.5:1 to 1:9 as regards the acidic raw meal components completely ground below 80 μm, the fine grain class of basic raw meal components which is present below 60–80 μm is introduced together with the acidic raw meal components fine-ground below 60–80 μm, separately from the coarse grain class of basic raw meal components which is present above 80 μm, is introduced directly in a corresponding quantity directly into the kiln flame through the kiln outlet and/or through the inlet chamber of the kiln behind the sintering zone into a temperature range of 1100–1400° C. in order to incorporate the fine grain class of basic raw meal component which is present below 60–80 μm together with the acidic raw meal components fine-ground below 60–80 μm into the clinker.

A preferred object of the invention according to the seventh embodiment is a reduction of the topochemical $C_2S$ formation instead of the CS and $C_3S_2$ immediately before the sintering zone. Thus the conditions for the formation of the new $SiO_2$-rich eutectic are favoured and consequently the proportion of melt is increased.

By this measure it is possible to increase the reactivity of the raw meal.

This is explained as follows:

The separation and separate introduction of the fine fractional proportion of the basic raw meal component together with the fine-ground acidic raw meal components into a temperature range of 1200–1450° C. causes in the kiln feed even better conditions than according to the third embodiment for the conservation and consolidation of the easy to melt composition of the $SiO_2$-enriched raw eutectic. This results in an even greater increase in the proportion of melt with the chemical composition of the $SiO_2$-enriched eutectic, which leads to an increase in the raw meal reactivity.

Examples of the seventh embodiments of the invention are set out below:

The raw meal from Table 24 was used for the investigations. The preparation of the raw meal and the roasting behaviour differ in these investigations by comparison with the example of the implementation process according to claim 12 only in that it was not the coarse fractional proportion of the basic raw meal component which was delivered from the start of roasting to the previously heated fine-ground proportion of the raw meal, but the fine-ground proportion of the raw meal was delivered to the coarse fractional proportion of the basic raw meal component which had previously been heated to 1200–1450° C. in the rotating laboratory kiln. The results are set out in Table 26.

TABLE 26

Effect on the reactivity of the raw meal of the
separate introduction of the fine-ground proportion of raw
meal to the coarse proportion of limestone previously heated
in the rotating kiln up to 1250–1450° C.

| Raw meal | LS II | SM | TM | Grain size fractions of limestone | | Ratio between the raw meal components [%] | | | | Temperature of the preliminary heating of the coarse proportion of limestone [° C.] | Free lime content [%] |
|---|---|---|---|---|---|---|---|---|---|---|---|
| | | | | <80 μm | >80 μm | Limestone fraction <80 μm | Limestone fraction >80 μm | Clay >80 μm | Pyrite cinder residue >80 μm | | |

The fine-ground proportion of raw meal was fed to the coarse-ground proportion of limestone after the coarse-ground proportion of limestone had been heated in the rotating kiln up to 1200–1450° C.

| | | | | | | | | | | | |
|---|---|---|---|---|---|---|---|---|---|---|---|
| 1 | 97 | 3.3 | 1.6 | 0.01–80 | 80.01–2000 | 32.13 | 48.23 | 18.62 | 1.04 | 1200 | 0.22 |
| 2 | 97 | 3.3 | 1.6 | 0.01–80 | 80.01–2000 | 32.13 | 48.23 | 18.62 | 1.04 | 1300 | 0.29 |
| 3 | 95 | 3.3 | 1.83 | 0.01–80 | 80.01–2000 | 32.13 | 48.23 | 18.62 | 1.04 | 1400 | 0.36 |
| 4 | 97 | 3.3 | 1.6 | 0.01–80 | 80.01–2000 | 32.13 | 48.23 | 18.62 | 1.04 | 1450 | 0.85 |
| 5 | 97 | 3.3 | 1.6 | 0.01–80 | 80.01–2000 | 32.13 | 48.23 | 18.62 | 1.04 | 1100 | 0.39 |

The present data show that the reactivity of the raw meal is increased under optimum conditions.

The invention is not limited only to the described embodiments. Thus for example the proportion of the raw meal which is separated off can be introduced both in the preheated and in the calcined state into the kiln in a temperature range of 1250–1350° C.

In a further preferred embodiment of the invention it is provided that with a grain class ratio of the 0.01–80 μm grain class to the >80.01 μm grain class of the basic raw meal component or of the raw meal of 1.5:1 to 1:9 the heat treatment of the raw meal to be roasted takes place in a temperature range from 850° C. to 1250° C. under a reducing gas atmosphere.

A preferred object of the invention is a chemical activation of the quartz. In this way the topochemical $C_2$ formation instead of the CS and $C_3S_2$ is largely avoided before the sintering zone and the formation of the new $SiO_2$-rich eutectic is favoured. This results in an increase in the proportion of melt.

By this measure it is possible to increase the reactivity of the raw meal.

This is explained as follows:

Under reducing conditions which can be created by the reducing gas medium in the kiln feed the reduction of the iron oxides ($Fe_2O_3 \rightarrow Fe_3O_4 \rightarrow FeO$) and of the S, Cr, and Mn oxides takes place in the sintering stage. The crystal lattice of the quartz is chemically activated thereby. The chemical activation of the quartz which is heat treated under reducing gas medium is caused at the higher temperatures by a reduction of the stoichiometric oxygen:silicon molecular ratio of below 2. The $O^2$ vacancies thus produced in the crystal lattice of the quartz have the effect that the crystal-chemical conversions and chemical activity of the quartz increase.

The deacidification of the $CaCO_3$ which takes place under reducing conditions is to be reduced to 60° C.

Furthermore, the catalytic effect of the reducing gas medium on the chemical activity of the quartz is to be explained by the extremely high chemical activity of the resulting $Fe^{2+}$ ions. The $Fe^{2+}$ ions produced under a reducing gas medium are capable of forming a new solution with different components which contain $Ca^{2+}$ ions and easy to melt local melt with low viscosity in the contact zones with $SiO_2$.

In this way the complete fixing of the quartz to the easy to melt silicates namely CS and $C_3S_2$ immediately before the sintering zone is favoured at 1100–1200° C. This results in an increase in the formation of the CS and/or $C_3S_2$ instead of the $CS_2$ and the increase in the proportion of melt.

Embodiments of the invention are described below:

The raw meal 4 from Table 11 according to the sixth embodiment was used for the investigations. The homogenisation of the raw meal was carried out within two hours in a mixer with rubber balls as mixing elements. For the subsequent roasting tests granules with a diameter of 5–10 μm were produced from the raw meal with the addition of water. The granules were dried for two hours at 110° C.

The granules produced from the raw meal were roasted in the following way.

The granules of each sample which were to be roasted were fed in a quantity of 400 g into the electrically heated laboratory rotary kiln which had previously been heated to 600° C. Then the kiln feed was heated in 50 minutes to 1450° C. at a uniform heating speed of 17° C./min. Afterwards the kiln feed was kept isothermally in each case at 1450° C. for 30 minutes.

In order to create a reducing gas medium in the kiln feed of the rotary kiln in a temperature range of 850–1000° C. to 850–200° C. graphite pebbles with a diameter of 30 mm are fed into the rotating kiln at each roasting and correspondingly discharged at 950° C., 1000° C., 1100° C., 1200° C. and 1250° C. Thus reducing gas medium was created in the kiln feed of the rotating kiln in the temperature ranges of respectively 850–950° C., 850–1000° C., 850–1100° C., 850–1200° C. and 850–1250° C. Finally the samples of the raw meal which are roasted with reduction are discharged from the kiln and quickly cooled to room temperature.

In order to determine the effect of the reducing gas medium at various temperature ranges on the reactivity of the quartz and overall of the raw meal, the free quartz content at 1200° C. and the free lime content at 1450° C. were chemically analysed after the 30 minutes duration in the kiln feed. The data obtained are set out in Table 27.

The present data show clearly that the reactivity of the raw meal under reducing conditions increases as the temperature range increases up to 850–1200° C. Further increase in the reducing temperature range up to 850–1250° C. does not bring any increase in the raw meal reactivity.

TABLE 27

Influence of the reducing gas medium on the reactivity of the raw meal as a function of temperature.

| No. | LS II | SM | TM | Grain size range of limestone [%] | Ratio between raw meal components [%] | | | Pyrite cinder | Temperature range of the reducing roasting | Free quartz content at 1200° C. [%] | Free lime content at 1450° C. [%] |
|---|---|---|---|---|---|---|---|---|---|---|---|
| | | | | | <80 μm | >80 μm | Clay | residue | | | |
| 1 | 97 | 2.2 | 1.6 | 0.01–2000 | 24.10 | 56.24 | 18.62 | 1.04 | — | 2.01 | 0.81 |
| 2 | 97 | 2.2 | 1.6 | 0.01–2000 | 24.10 | 56.24 | 18.62 | 1.04 | 850–950 | 1.95 | 0.78 |
| 3 | 97 | 2.2 | 1.6 | 0.01–2000 | 24.10 | 56.24 | 18.62 | 1.04 | 850–1000 | 1.46 | 0.54 |
| 4 | 97 | 2.2 | 1.6 | 0.01–2000 | 24.10 | 56.24 | 18.62 | 1.04 | 850–1100 | 0.89 | 0.29 |
| 5 | 97 | 2.2 | 1.6 | 0.01–2000 | 24.10 | 56.24 | 18.62 | 1.04 | 850–1200 | 0.56 | 0.15 |
| 6 | 97 | 2.2 | 1.6 | 0.01–2000 | 24.10 | 56.24 | 18.62 | 1.04 | 850–1250 | 0.52 | 0.16 |

In an eighth embodiment of the invention it is proposed that for the coarse grinding the ratio of the grinding media charge to the feed material charge is between 3 and 5, the first chamber of the two-chamber mill and the single chamber mill is charged with binary ball charge with a mean-weight ball diameter of 84.7 mm and with the ball charge produced from various ball sizes with a mean-weight ball diameter from 82 to 88 mm and the partition of the two-chamber tube mill operated for material grinding in closed and open circuit is installed with a ratio of lengths of the first chamber to the second chamber of 2.1 to 5.6:1.

By this measure it is possible to reduce the energy consumption for the grinding of the materials, the throughput of the mill and the residue on the 80 μm sieve and to reduce the level of noise as well as the abrasion of grinding media and armoured cladding during operation of the tube mill.

This is explained as follows:

It is known that formation of agglomerates and coating of the grinding media occur during fine grinding of the feed material. Such re-solidification of the fine-ground material is caused by static electricity, surface energies or mechanical packing as described on page 51.

These phenomena are a considerable hindrance to the grinding process during fine grinding. It is obvious that these phenomena show very little during coarse grinding.

According to the prior art the grinding balls often rebound against one another in the mill without striking the feed material grain. This phenomenon is important particularly for the output of the first chamber, since the size reduction occurs predominantly due to the ball impacts.

In order to make optimum use of the grinding energy the ratio of the grinding media charge to the feed material charge should be correspondingly harmonised to one another and indeed taking account of the fineness of grinding. This ratio is greater the higher the fineness of the feed material should be. A recommended ratio of the ball charge to the feed material charge is adapted to the ultimate fineness with maximum utilisation of the grinding energy. This means that it is much greater than can be optimal for the first grinding chamber. Because of this the first grinding chamber is usually not fully loaded, i.e. it is operated with a lower throughput than would be optimal.

Since the slot openings only allow pre-ground material of a certain grain size to pass through, it is also known that the partitions hinder the passage of oversize feed material into the next grinding chamber. That is the reason why even with a slight increase in the throughput of mills and a usual position of the partition with a ratio of the lengths of the first chamber to the second chamber of 1:2 to 1:1 the oversize feed material can not be allowed through into the second chamber. As a result the first grinding chamber is overfilled, which causes the grinding operation to break down. This means that the first grinding chamber is undesirably operated at a low load which is not optimal. This increases the ineffective work of the balls of the first chamber or the no-load work of the ball impacts is increased. The abrasion of the balls and armoured cladding (wear) is increased thereby. This results in a loss of the degree of whiteness of white cement due both to the raw grinding and to the cement grinding.

It is clear from the above that the wear is intensified. This is the reason why, in order to make optimum use of the grinding energy, the first chamber must be operated at a higher feed material charge or a lower ratio of the ball charge to the feed material charge. In this case it should also be noted that the specific surface of the feed material in the single pass in the coarse fineness range, where the grinding takes place predominantly due to the impact, is not very dependent upon the ratio of the surface area of the grinding media to the volume of the grinding media. The optimum ball charge cannot be altered in this case, since it is based (optimised) on optimal utilisation of kinetic energy of falling balls.

On the basis of the explanation given above it follows that the feed material charge of the first chamber should be optimised. For this it is necessary to correct the position of the partition.

Examples of the eighth embodiment of the invention are described below.

For the investigations limestone with a grain size up to 20 mm was used. The grinding of the limestone was carried out in two stages in a ball mill consisting of two grinding chambers. The general grinding duration of both stages of the grinding was 20 minutes, which corresponds to a residence time of the feed material in an industrial tube mill with a dimension of 2.6*13 or 3.2*15 m. The grinding duration of the first stage, where limestone is comminuted with balls, was 10, 12, 13, 14, 15, 16 and 17 minutes. In a second stage of the grinding process limestone was reground in the grinding chamber loaded with Cylpebs up to a summary grinding duration of 20 minutes, corresponding to 10, 8, 7, 6, 5, 4 and 3 minutes. In this way the operation of the industrial tube mill depending upon the arrangement of the partition was simulated (modelled) and the effect of the arrangement of the partition on the sieve residue was examined.

For the first stage of the grinding process the first grinding chamber was loaded with binary and usual ball charge at a loading percentage of 30%. The usual ball charge consisted of the grinding balls with a diameter of 90, 80, 70, 60 and 50 mm with a mean-weight ball diameter of 76.5; 79.25; 82; 84; 86 and 88 mm. The binary ball charge consisted of the balls with a diameter of 90 and 50 mm at weight ratio of 9:1 and a mean-weight ball diameter of 84.7 mm. Thus the influence of the ball grading on sieve residues was examined.

For the second stage a second chamber was filed with Cylpebs with a loading percentage of 30%.

In order to simulate (model) the effect of the throughput of the tube mill on sieve residues of limestone on the 80 $\mu$m and 200 $\mu$m sieve, moreover, the limestone charge in the grinding chamber was also changed with a ratio of grinding media charge to feed material charge of 2; 3.7; 4 and 8.

The grinding media grading and arrangement of the partition in the tube mill as they existed at the time are chosen appropriately in this way so that the quantity of the grain class smaller than 80 $\mu$m would be produced to a maximum. Therefore the partitions in industrial two-chamber mills divide the mill cylinder into two chambers usually with a ratio of the length of the first chamber to the second chamber of approximately 1:1. It follows from this that with a general residence time of the feed material in the two-chamber mill of 20 minutes the residence time in each chamber is approximately 10 minutes. In this investigation, in order to achieve the increase in the residue on the 80 $\mu$m sieve with simultaneous reduction of the grain class greater than 500–2000 $\mu$m, research is carried out into the effect of the feed material charge when the ratio of the length of the first chamber to the second chamber changes and the grading of the grinding media.

The results of the investigations carried out are set out in Table 28.

TABLE 28

Effect on sieve residues of the feed material charge of limestone in the case of alteration of the ratio of length of the first chamber to the second chamber and grinding element grading

| No. 1 | Mean-weight ball diameter [mm] 2 | Ratio of the grinding media charge to the limestone charge 3 | Duration of grinding (min) [mm] 1 chamber 4 | 2 chamber 5 | Ratio of the length of the first to the second chamber 6 | Sieve size of the sieve test [$\mu$m] 7 | Sieve residue [%] 1 chamber 8 | 2 chamber 9 |
|---|---|---|---|---|---|---|---|---|
| Known ball grading with mixed ball size from 40 mm to 100 mm ||||||||
| 1 | 76,5 | 8 | 10 | 10 | 1:1 | 200 | 20,0 | 2,4 |
|   |      |   |    |    |     | 80  | 42,2 | 11,9 |
| 2 | 76,5 | 4 | 10 | 10 | 1:1 | 200 | 26,2 | 8,0 |
|   |      |   |    |    |     | 80  | 44,8 | 28,9 |
| 3 | 76,5 | 2,7 | 10 | 10 | 1:1 | 200 | 29,4 | 10,4 |
|   |      |   |    |    |     | 80  | 42,2 | 29,2 |
| 4 | 76,5 | 8 | 13 | 7 | 1,86:1 | 200 | 17,4 | 5,6 |
|   |      |   |    |    |     | 80  | 41,2 | 15,5 |
| 5 | 76,5 | 4 | 13 | 7 | 1,86:1 | 200 | 24,6 | 12,9 |
|   |      |   |    |    |     | 80  | 41,8 | 29,4 |
| 6 | 76,5 | 2,7 | 13 | 7 | 1,86:1 | 200 | 28,8 | 23,0 |
|   |      |   |    |    |     | 80  | 44,6 | 32,8 |
| 7 | 76,5 | 8 | 15 | 5 | 3:1 | 200 | 14,2 | 9,2 |
|   |      |   |    |    |     | 80  | 34,1 | 20,0 |
| 8 | 76,5 | 4 | 15 | 5 | 3:1 | 200 | 22,0 | 16,1 |
|   |      |   |    |    |     | 80  | 43,8 | 32,6 |
| 9 | 76,5 | 2,7 | 15 | 5 | 3:1 | 200 | 26,7 | 24,8 |
|   |      |   |    |    |     | 80  | 43,8 | 34,2 |
| 10 | 76,5 | 8 | 17 | 3 | 5,6:1 | 200 | 12,2 | 10,7 |
|    |      |   |    |    |     | 80  | 32,1 | 23,1 |
| 11 | 76,5 | 4 | 17 | 3 | 5,6:1 | 200 | 20,4 | 17,9 |
|    |      |   |    |    |     | 80  | 42,1 | 33,6 |
| 12 | 76,5 | 2,7 | 17 | 3 | 5,6:1 | 200 | 24,9 | 24,0 |
|    |      |   |    |    |     | 80  | 42,8 | 37,4 |
| Intermediate ball grading with mixed ball size from 40 mm to 100 mm ||||||||
| 13 | 79,25 | 8 | 10 | 10 | 1:1 | 200 | 34,6 | 14,6 |
|    |       |   |    |    |     | 80  | 25,6 | 23,9 |
| 14 | 79,25 | 4 | 10 | 10 | 1:1 | 200 | 28,2 | 13,6 |
|    |       |   |    |    |     | 80  | 38,2 | 34,2 |
| 15 | 79,25 | 2,7 | 10 | 10 | 1:1 | 200 | 27,2 | 12,0 |
|    |       |   |    |    |     | 80  | 42,1 | 37,8 |
| 16 | 79,25 | 8 | 13 | 7 | 1,86:1 | 200 | 27,8 | 10,4 |
|    |       |   |    |    |     | 80  | 31,3 | 25,6 |
| 17 | 79,25 | 4 | 13 | 7 | 1,86:1 | 200 | 24,6 | 11,6 |
|    |       |   |    |    |     | 80  | 39,6 | 36,6 |
| 18 | 79,5 | 2,7 | 13 | 7 | 1,86:1 | 200 | 23,6 | 11,3 |
|    |      |   |    |    |     | 80  | 42,7 | 39,4 |
| 19 | 79,5 | 8 | 15 | 5 | 3:1 | 200 | 22,5 | 8,68,6 |

TABLE 28-continued

Effect on sieve residues of the feed material charge of limestone in the case of alteration of the ratio of length of the first chamber to the second chamber and grinding element grading

| No. 1 | Mean-weight ball diameter [mm] 2 | Ratio of the grinding media charge to the limestone charge 3 | Duration of grinding (min) [mm] 1 chamber 4 | 2 chamber 5 | Ratio of the length of the first to the second chamber 6 | Sieve size of the sieve test [μm] 7 | Sieve residue [%] 1 chamber 8 | 2 chamber 9 |
|---|---|---|---|---|---|---|---|---|
| 20 | 79,5 | 4 | 15 | 5 | 3:1 | 80 | 31,6 | 25,8 |
|  |  |  |  |  |  | 200 | 20,1 | 9,7 |
| 21 | 79,5 | 2,7 | 15 | 5 | 3:1 | 80 | 41,8 | 40,1 |
|  |  |  |  |  |  | 200 | 20,4 | 9,9 |
| 22 | 79,5 | 8 | 17 | 3 | 5,6:1 | 80 | 43,0 | 40,8 |
|  |  |  |  |  |  | 200 | 20,6 | 11,9 |
| 23 | 79,5 | 4 | 17 | 3 | 5,6:1 | 80 | 32,1 | 29,4 |
|  |  |  |  |  |  | 200 | 18,7 | 13,2 |
| 24 | 79,5 | 2,7 | 17 | 3 | 5,6:1 | 80 | 42,0 | 38,9 |
|  |  |  |  |  |  | 200 | 19,4 | 14,1 |
|  |  |  |  |  |  | 80 | 43,4 | 40,7 |
| Offered ball grading with mixed ball size from 40 mm to 100 mm |
| 25 | 82 | 8 | 10 | 10 | 1:1 | 200 | 38,6 | 17,6 |
|  |  |  |  |  |  | 80 | 22,6 | 27,6 |
| 26 | 82 | 4 | 10 | 10 | 1:1 | 200 | 29,0 | 14,6 |
|  |  |  |  |  |  | 80 | 36,6 | 35,0 |
| 27 | 82 | 2,7 | 10 | 10 | 1:1 | 200 | 26,1 | 13,2 |
|  |  |  |  |  |  | 80 | 42,2 | 39,8 |
| 28 | 82 | 8 | 12 | 8 | 1,5:1 | 200 | 34,6 | 14,4 |
|  |  |  |  |  |  | 80 | 24,8 | 28,6 |
| 29 | 82 | 4 | 12 | 8 | 1,5:1 | 200 | 26,6 | 13,5 |
|  |  |  |  |  |  | 80 | 37,2 | 38,2 |
| 30 | 82 | 2,7 | 12 | 8 | 1,5:1 | 200 | 24,8 | 11,0 |
|  |  |  |  |  |  | 80 | 41,5 | 40,6 |
| 31 | 82 | 8 | 13 | 7 | 1,86:1 | 200 | 32,4 | 13,6 |
|  |  |  |  |  |  | 80 | 26,2 | 29,8 |
| 32 | 82 | 4 | 13 | 7 | 1,86:1 | 200 | 25,6 | 12,5 |
|  |  |  |  |  |  | 80 | 37,4 | 39,6 |
| 33 | 82 | 2,7 | 13 | 7 | 1,86:1 | 200 | 22,8 | 10,8 |
|  |  |  |  |  |  | 80 | 42,5 | 42,0 |
| 34 | 82 | 8 | 14 | 6 | 2,33:1 | 200 | 30,6 | 12,0 |
|  |  |  |  |  |  | 80 | 28,8 | 28,6 |
| 35 | 82 | 4 | 14 | 6 | 2,33:1 | 200 | 24,6 | 10,5 |
|  |  |  |  |  |  | 80 | 40,0 | 37,6 |
| 36 | 82 | 2,7 | 14 | 6 | 2,33:1 | 200 | 20,6 | 7,7 |
|  |  |  |  |  |  | 80 | 41,4 | 42,4 |
| 37 | 82 | 8 | 15 | 5 | 3:1 | 200 | 25,6 | 8,8 |
|  |  |  |  |  |  | 80 | 29,0 | 29,9 |
| 38 | 82 | 4 | 15 | 5 | 3:1 | 200 | 18,4 | 8,0 |
|  |  |  |  |  |  | 80 | 42,4 | 43,6 |
| 39 | 82 | 2,7 | 15 | 5 | 3:1 | 200 | 18,5 | 5,4 |
|  |  |  |  |  |  | 80 | 44,6 | 48,6 |
| 40 | 82 | 8 | 16 | 4 | 4:1 | 200 | 24,0 | 9,6 |
|  |  |  |  |  |  | 80 | 33,5 | 33,4 |
| 41 | 82 | 4 | 16 | 4 | 4:1 | 200 | 19,0 | 8,8 |
|  |  |  |  |  |  | 80 | 41,2 | 44,5 |
| 42 | 82 | 2,7 | 16 | 4 | 4:1 | 200 | 18,4 | 7,5 |
|  |  |  |  |  |  | 80 | 45,4 | 49,8 |
| 43 | 82 | 8 | 17 | 3 | 5,6:1 | 200 | 22,0 | 14,0 |
|  |  |  |  |  |  | 80 | 34,2 | 31,2 |
| 44 | 82 | 4 | 17 | 3 | 5,6:1 | 200 | 18,2 | 12,4 |
|  |  |  |  |  |  | 80 | 42,0 | 41,0 |
| 45 | 82 | 2,7 | 17 | 3 | 5,6:1 | 200 | 15,6 | 11,2 |
|  |  |  |  |  |  | 80 | 44,8 | 43,4 |
| Offered ball grading with mixed ball size from 40 mm to 100 mm |
| 46 | 84 | 8 | 10 | 10 | 1:1 | 200 | 38,8 | 18,1 |
|  |  |  |  |  |  | 80 | 22,8 | 27,9 |
| 47 | 84 | 4 | 10 | 10 | 1:1 | 200 | 29,2 | 16,2 |
|  |  |  |  |  |  | 80 | 37,2 | 36,1 |
| 48 | 84 | 2,7 | 10 | 10 | 1:1 | 200 | 26,6 | 15,6 |
|  |  |  |  |  |  | 80 | 42,4 | 39,8 |
| 49 | 84 | 8 | 12 | 8 | 1,5:1 | 200 | 34,6 | 16,0 |
|  |  |  |  |  |  | 80 | 25,0 | 28,9 |
| 50 | 84 | 4 | 12 | 8 | 1,5:1 | 200 | 26,6 | 14,2 |

TABLE 28-continued

Effect on sieve residues of the feed material charge of limestone in the case of alteration of the ratio of length of the first chamber to the second chamber and grinding element grading

| No. 1 | Mean-weight ball diameter [mm] 2 | Ratio of the grinding media charge to the limestone charge 3 | Duration of grinding (min) 1 chamber 4 | 2 chamber 5 | Ratio of the length of the first to the second chamber 6 | Sieve size of the sieve test [μm] 7 | Sieve residue [%] 1 chamber 8 | 2 chamber 9 |
|---|---|---|---|---|---|---|---|---|
| 51 | 84 | 2,7 | 12 | 8 | 1,5:1 | 80<br>200 | 37,8<br>25,0 | 38,6<br>12,4 |
| 52 | 84 | 8 | 13 | 7 | 1,86:1 | 80<br>200 | 41,7<br>32,2 | 40,9<br>13,8 |
| 53 | 84 | 4 | 13 | 7 | 1,86:1 | 80<br>200 | 26,8<br>25,6 | 29,8<br>13,1 |
| 54 | 84 | 2,7 | 13 | 7 | 1,86:1 | 80<br>200 | 37,8<br>23,3 | 39,9<br>12,3 |
| 55 | 84 | 8 | 14 | 6 | 2,33:1 | 80<br>200 | 43,0<br>30,9 | 42,4<br>12,5 |
| 56 | 84 | 4 | 14 | 6 | 2,33:1 | 80<br>200 | 29,4<br>24,6 | 28,6<br>11,2 |
| 57 | 84 | 2,7 | 14 | 6 | 2,33:1 | 80<br>200 | 41,0<br>20,6 | 41,2<br>8,1 |
| 58 | 84 | 8 | 15 | 5 | 3:1 | 80<br>200 | 41,9<br>25,6 | 44,1<br>10,3 |
| 59 | 84 | 4 | 15 | 5 | 3:1 | 80<br>200 | 30,3<br>18,4 | 29,8<br>10,0 |
| 60 | 84 | 2,7 | 15 | 5 | 3:1 | 80<br>200 | 42,6<br>18,6 | 44,9<br>8,2 |
| 61 | 84 | 8 | 16 | 4 | 4:1 | 80<br>200 | 44,4<br>24,0 | 48,9<br>12,1 |
| 62 | 84 | 4 | 16 | 4 | 4:1 | 80<br>200 | 33,4<br>18,8 | 34,9<br>10,1 |
| 63 | 84 | 2,7 | 16 | 4 | 4:1 | 80<br>200 | 41,4<br>18,3 | 46,6<br>9,6 |
| 64 | 84 | 8 | 17 | 3 | 5,6:1 | 80<br>200 | 45,8<br>21,8 | 50,8<br>13,7 |
| 65 | 84 | 4 | 17 | 3 | 5,6:1 | 80<br>200 | 36,6<br>17,3 | 34,4<br>12,8 |
| 66 | 84 | 2,7 | 17 | 3 | 5,6:1 | 80<br>200 | 44,2<br>15,6 | 44,0<br>12,2 |
|  |  |  |  |  |  | 80 | 46,3 | 47,3 |

Offered ball grading with mixed ball size from 40 mm to 100 mm

| 67 | 86 | 8 | 10 | 10 | 1:1 | 200<br>80 | 38,7<br>23,4 | 18,8<br>27,9 |
| 68 | 86 | 4 | 10 | 10 | 1:1 | 200<br>80 | 29,2<br>37,8 | 17,4<br>36,5 |
| 69 | 86 | 2,7 | 10 | 10 | 1:1 | 200<br>80 | 27,0<br>42,6 | 16,6<br>40,1 |
| 70 | 86 | 8 | 12 | 8 | 1,5:1 | 200<br>80 | 34,8<br>25,2 | 17,0<br>29,2 |
| 71 | 86 | 4 | 12 | 8 | 1,5:1 | 200<br>80 | 26,6<br>38,4 | 15,7<br>38,9 |
| 72 | 86 | 2,7 | 12 | 8 | 1,5:1 | 200<br>80 | 25,4<br>41,9 | 12,7<br>41,2 |
| 73 | 86 | 2 | 12 | 8 | 1,5:1 | 200<br>80 | 25,0<br>41,5 | 12,4<br>41,5 |
| 74 | 86 | 8 | 13 | 7 | 1,86:1 | 200<br>80 | 32,2<br>26,8 | 14,3<br>29,9 |
| 75 | 86 | 4 | 13 | 7 | 1,86:1 | 200<br>80 | 25,8<br>38.4 | 13.8<br>40.4 |
| 76 | 86 | 2,7 | 13 | 7 | 1,86:1 | 200<br>80 | 24,0<br>43,8 | 12,3<br>42,9 |
| 77 | 86 | 2 | 13 | 7 | 1,86:1 | 200<br>80 | 23,4<br>44,2 | 12,2<br>43,0 |
| 78 | 86 | 8 | 14 | 6 | 2,33:1 | 200<br>80 | 30,9<br>30,2 | 12,7<br>28,2 |
| 79 | 86 | 4 | 14 | 6 | 2,33:1 | 200<br>80 | 24,7<br>41,5 | 11,7<br>43,0 |
| 80 | 86 | 2,7 | 14 | 6 | 2,33:1 | 200<br>80 | 20,7<br>47,4 | 8,3<br>45,5 |
| 81 | 86 | 2 | 14 | 6 | 2,33:1 | 200<br>80 | 18,4<br>49,6 | 8,0<br>47,9 |
| 82 | 86 | 8 | 15 | 5 | 3:1 | 200 | 25,6 | 11,4 |

TABLE 28-continued

Effect on sieve residues of the feed material charge of limestone in the case of alteration of the ratio of length of the first chamber to the second chamber and grinding element grading

| No. | Mean-weight ball diameter [mm] | Ratio of the grinding media charge to the limestone charge | Duration of grinding (min) 1 chamber | Duration of grinding (min) 2 chamber | Ratio of the length of the first to the second chamber | Sieve size of the sieve test [μm] | Sieve residue [%] 1 chamber | Sieve residue [%] 2 chamber |
|---|---|---|---|---|---|---|---|---|
| 1 | 2 | 3 | 4 | 5 | 6 | 7 | 8 | 9 |
| | | | | | | 80 | 30,9 | 29,8 |
| 83 | 86 | 4 | 15 | 5 | 3:1 | 200 | 19,2 | 11,2 |
| | | | | | | 80 | 43,8 | 44,9 |
| 84 | 86 | 2,7 | 15 | 5 | 3:1 | 200 | 18,6 | 9,6 |
| | | | | | | 80 | 44,4 | 48,9 |
| 85 | 86 | 2 | 15 | 5 | 3:1 | 200 | 17,8 | 9,4 |
| | | | | | | 80 | 45,2 | 50,3 |
| 86 | 86 | 8 | 16 | 4 | 4:1 | 200 | 23,8 | 12,7 |
| | | | | | | 80 | 34,8 | 35,8 |
| 87 | 86 | 4 | 16 | 4 | 4:1 | 200 | 18,8 | 11,6 |
| | | | | | | 80 | 42,4 | 47,4 |
| 88 | 86 | 2,7 | 16 | 4 | 4:1 | 200 | 18,2 | 10,8 |
| | | | | | | 80 | 46,1 | 51,0 |
| 89 | 86 | 2 | 16 | 4 | 4:1 | 200 | 18,0 | 10,3 |
| | | | | | | 80 | 46,4 | 52,0 |
| 90 | 86 | 8 | 17 | 3 | 5,6:1 | 200 | 21,7 | 13,7 |
| | | | | | | 80 | 37,2 | 36,8 |
| 91 | 86 | 4 | 17 | 3 | 5,6:1 | 200 | 17,0 | 12,9 |
| | | | | | | 80 | 45,4 | 47,5 |
| 92 | 86 | 2,7 | 17 | 3 | 5,6:1 | 200 | 15,6 | 12,4 |
| | | | | | | 80 | 47,8 | 51,6 |
| 93 | 86 | 2 | 17 | 3 | 5,6:1 | 200 | 15,3 | 12,0 |
| | | | | | | 80 | 48,6 | 53,8 |
| Offered ball grading with mixed ball size from 40 mm to 100 mm | | | | | | | | |
| 94 | 88 | 8 | 10 | 10 | 1:1 | 200 | 38,6 | 19,6 |
| | | | | | | 80 | 24,2 | 28,4 |
| 95 | 88 | 4 | 10 | 10 | 1:1 | 200 | 29,4 | 18,4 |
| | | | | | | 80 | 38,0 | 37,5 |
| 96 | 88 | 2,7 | 10 | 10 | 1:1 | 200 | 27,7 | 17,2 |
| | | | | | | 80 | 42,8 | 40,7 |
| 97 | 88 | 8 | 12 | 8 | 1,5:1 | 200 | 34,9 | 17,4 |
| | | | | | | 80 | 25,2 | 29,4 |
| 98 | 88 | 4 | 12 | 8 | 1,5:1 | 200 | 26,8 | 16,2 |
| | | | | | | 80 | 38,8 | 39,2 |
| 99 | 88 | 2,7 | 12 | 8 | 1,5:1 | 200 | 25,6 | 13,2 |
| | | | | | | 80 | 42,0 | 41,2 |
| 100 | 88 | 2 | 12 | 8 | 1,5:1 | 200 | 25,2 | 12,8 |
| | | | | | | 80 | 44,3 | 44,5 |
| 101 | 88 | 8 | 13 | 7 | 1,86:1 | 200 | 32,4 | 14,8 |
| | | | | | | 80 | 27,2 | 29,9 |
| 102 | 88 | 4 | 13 | 7 | 1,86:1 | 200 | 25,6 | 14,2 |
| | | | | | | 80 | 38,7 | 41,0 |
| 103 | 88 | 2,7 | 13 | 7 | 1,86:1 | 200 | 24,1 | 12,4 |
| | | | | | | 80 | 44,0 | 43,6 |
| 104 | 88 | 2 | 13 | 7 | 1,86:1 | 200 | 23,6 | 11,9 |
| | | | | | | 80 | 45,7 | 44,5 |
| 105 | 88 | 8 | 14 | 6 | 2,33:1 | 200 | 31,2 | 12,9 |
| | | | | | | 80 | 30,4 | 27,5 |
| 106 | 88 | 4 | 14 | 6 | 2,33:1 | 200 | 24,8 | 12,0 |
| | | | | | | 80 | 42,0 | 44,1 |
| 107 | 88 | 2,7 | 14 | 6 | 2,33:1 | 200 | 20,8 | 8,4 |
| | | | | | | 80 | 42,8 | 46,2 |
| 108 | 88 | 2 | 14 | 6 | 2,33:1 | 200 | 18,6 | 8,1 |
| | | | | | | 80 | 43,9 | 47,5 |
| 109 | 88 | 8 | 15 | 5 | 3:1 | 200 | 25,6 | 12,4 |
| | | | | | | 80 | 31,0 | 29,9 |
| 110 | 88 | 4 | 15 | 5 | 3:1 | 200 | 19,6 | 12,3 |
| | | | | | | 80 | 42,2 | 46,6 |
| 111 | 88 | 2,7 | 15 | 5 | 3:1 | 200 | 18,5 | 10,8 |
| | | | | | | 80 | 44,6 | 49,4 |
| 112 | 88 | 2 | 15 | 5 | 3:1 | 200 | 18,0 | 11,6 |
| | | | | | | 80 | 45,7 | 51,2 |
| 113 | 88 | 8 | 16 | 4 | 4:1 | 200 | 23,2 | 13,5 |
| | | | | | | 80 | 36,2 | 36,6 |
| 114 | 88 | 4 | 16 | 4 | 4:1 | 200 | 18,6 | 12,4 |

TABLE 28-continued

Effect on sieve residues of the feed material charge of limestone in the case of alteration of the ratio of length of the first chamber to the second chamber and grinding element grading

| No. 1 | Mean-weight ball diameter [mm] 2 | Ratio of the grinding media charge to the limestone charge 3 | Duration of grinding (min) [mm] 1 chamber 4 | 2 chamber 5 | Ratio of the length of the first to the second chamber 6 | Sieve size of the sieve test [μm] 7 | Sieve residue [%] 1 chamber 8 | 2 chamber 9 |
|---|---|---|---|---|---|---|---|---|
| 115 | 88 | 2,7 | 16 | 4 | 4:1 | 80<br>200 | 42,6<br>18,0 | 48,4<br>11,3 |
| 116 | 88 | 2 | 16 | 4 | 4:1 | 80<br>200 | 46,4<br>17,7 | 51,2<br>14,0 |
| 117 | 88 | 8 | 17 | 3 | 5,6:1 | 80<br>200 | 48,3<br>20,4 | 52,7<br>13,6 |
| 118 | 88 | 4 | 17 | 3 | 5,6:1 | 80<br>200 | 38,9<br>16,3 | 38,7<br>13,2 |
| 119 | 88 | 2,7 | 17 | 3 | 5,6:1 | 80<br>200 | 46,2<br>15,4 | 49,9<br>12,8 |
| 120 | 88 | 2 | 17 | 3 | 5,6:1 | 80<br>200 | 48,6<br>14,9 | 54,3<br>12,6 |
|  |  |  |  |  |  | 80 | 50,1 | 56,2 |
| Offered binary ball grading with the ball size of 90 and 40 mm | | | | | | | | |
| 121 | 84,7 | 8 | 10 | 10 | 1:1 | 200<br>80 | 39,4<br>22,3 | 18,8<br>28,2 |
| 122 | 84,7 | 4 | 10 | 10 | 1:1 | 200<br>80 | 29,2<br>36,5 | 14,9<br>36,6 |
| 123 | 84,7 | 2,7 | 10 | 10 | 1:1 | 200<br>80 | 26,8<br>42,0 | 12,0<br>39,4 |
| 124 | 84,7 | 8 | 12 | 8 | 1,5:1 | 200<br>80 | 34,2<br>24,7 | 14,4<br>28,6 |
| 125 | 84,7 | 4 | 12 | 8 | 1,5:1 | 200<br>80 | 26,4<br>36,7 | 12,0<br>337,4 |
| 126 | 84,7 | 2,7 | 12 | 8 | 1,5:1 | 200<br>80 | 24,8<br>40,2 | 11,4<br>41,8 |
| 127 | 84,7 | 8 | 13 | 7 | 1,86:1 | 200<br>80 | 32,0<br>26,1 | 13,6<br>29,8 |
| 128 | 84,7 | 4 | 13 | 7 | 1,86:1 | 200<br>80 | 24,8<br>38,6 | 11,4<br>39,0 |
| 129 | 84,7 | 2,7 | 13 | 7 | 1,86:1 | 200<br>80 | 23,7<br>42,6 | 10,8<br>42,4 |
| 130 | 84,7 | 8 | 14 | 6 | 2,33:1 | 200<br>80 | 30,6<br>28,8 | 12,8<br>29,4 |
| 131 | 84,7 | 4 | 14 | 6 | 2,33:1 | 200<br>80 | 24,2<br>39,1 | 10,2<br>39,8 |
| 132 | 84,7 | 2,7 | 14 | 6 | 2,33:1 | 200<br>80 | 20,6<br>41,1 | 7,7<br>41,3 |
| 133 | 84,7 | 8 | 15 | 5 | 3:1 | 200<br>80 | 25,8<br>29,2 | 3,6<br>29,7 |
| 134 | 84,7 | 4 | 15 | 5 | 3:1 | 200<br>80 | 19,6<br>41,8 | 8,4<br>42,4 |
| 135 | 84,7 | 2,7 | 15 | 5 | 3:1 | 200<br>80 | 18,4<br>42,6 | 5,4<br>44,8 |
| 136 | 84,7 | 8 | 16 | 4 | 4:1 | 200<br>80 | 24,8<br>32,1 | 10,1<br>30,4 |
| 137 | 84,7 | 4 | 16 | 4 | 4:1 | 200<br>80 | 18,8<br>41,8 | 9,8<br>43,4 |
| 138 | 84,7 | 2,7 | 16 | 4 | 4:1 | 200<br>80 | 17,0<br>43,8 | 8,9<br>47,0 |
| 139 | 84,7 | 8 | 17 | 3 | 5,6:1 | 200<br>80 | 22,3<br>33,8 | 14,3<br>30,6 |
| 140 | 84,7 | 4 | 17 | 3 | 5,6:1 | 200<br>80 | 17,2<br>42,4 | 12,4<br>40,4 |
| 141 | 84,7 | 2,7 | 17 | 3 | 5,6:1 | 200<br>80 | 16,0<br>43,8 | 11,6<br>42,4 |

Table 28: Effect on sieve residues of the feed material charge of limestone in the case of alteration of the ratio of length of the first chamber to the second chamber and grinding element grading.

The results set out in Table 28 show that the optimum grinding of the grinding media, in order to grind raw meal to residues on the 80 $\mu$m sieve of 30–50% and on the 200 $\mu$m sieve of 5–30%, for binary ball charge corresponds to a mean-weight ball diameter of 84.7 mm and for the usual ball charge consisting of various ball sizes this corresponds to an increased mean-weight ball diameter of 82 to 88 mm.

The increase in length of the first chamber by corresponding simultaneous shortening of the length of the second chamber leads, in the case of simultaneous increase in the limestone charge in the mill up to 2–4 times, as is carried out in known processes, to an increase in the residue on the 80 μm sieve without a proportional increase in the residue on the 200 μm sieve. This means that if a mean-weight ball diameter of the grinding media grading used in the usual raw meal grinding is too small, with an increased feed material charge this leaves behind much more oversize material in the feed material than with the newly proposed grinding process.

The optimum ratio of lengths of the first chamber to the second chamber in this case is 2:1 to 5.6:1. An increase in the ratio of the length of the first chamber to the second chamber to over 4:1 leads to a slight increase in the residue on the 80 μm sieve with a simultaneous considerable increase in the residue on the 200 μm sieve. A reduction in the ratio of the length of the first chamber to the second chamber below 2:1 leads to a drastic reduction in the residue on the 80 μm sieve.

The calculations carried out with the results obtained have shown clearly that the ratio of the grinding media charge to the feed material charge must lie between 2 and 5 for coarse grinding. From this it can be seen that the throughput of the mill with the same energy consumption can be increased by 2–4 times and the specific metal abrasion, based on feed material, of grinding media and armoured cladding is to be correspondingly reduced.

In this way under the proposed conditions with a specific surface area of 1500–1800 $cm^2/g$ according to Bleine coarse grinding causes a 2–4 times lower specific energy consumption and correspondingly a 3 times lower specific metal abrasion. Furthermore, the noise level during operation of the tube mill is correspondingly drastically reduced. The energy consumption based on 1 $cm^2$ produced surface is in a single passage under proposed conditions approximately 1.5 times less than with conventional fine grinding below a fineness of the feed material of approximately 3000–3200 $cm^2/g$.

Since the chambers of a compound mill which are arranged subsequently for the fine grinding cannot perform at such an extremely high output of the first chamber, the first chamber for example in the case of a two-chamber mill must be separated off, i.e. must be operated separately. A new grinding installation can also be designed where these basic requirements can be met. In principle the preconditions described above for the newly developed method can be met easily on the basis of a double rotator mill (double rotator drying and grinding mill). This means that the design features of a double rotator mill should be adapted to the basic requirements of the newly developed grinding method.

In a ninth preferred embodiment of the invention it is provided that the preheating stage—based on the guiding of the raw material—is of double-string construction, wherein exclusively the coarse grain class fraction of the basic raw meal component with grain sizes of 60–500 μm up to 80–2000 μm is delivered into one preheating string and exclusively the mixture of the acidic raw meal components ground below 30–80 μm and the grain class fraction of the basic raw meal component fine-ground below 30–80 μm is delivered into the other preheating string, wherein furthermore the coarsest fraction with grain sizes of 125–500 to 200–2000 μm of the coarse grain class fraction of the basic raw meal component is already separated off under the effect of gravity in the hot gas pipe and in this way falls through by way of gas pipes into the calciner for calcination, and all or at least a fine fraction with grain sizes of 60–125 μm to 80–200 μm of the coarse grain class fraction of the basic raw meal component heat treated in the first three cyclones or in the first cyclone is introduced subsequently (in the direction of movement of the material) after the third or first cyclone of the three-stage to five-stage preheater into the reaction zone of the kiln between the transition zone and the sintering zone in order that the fine fraction with grain sizes of 60–125 μm to 80–200 μm of coarse grain class fraction of the basic raw meal component (60–2000 μm) can be chemically incorporated into the clinker.

It is advantageous, particularly in the clinker sintering, that all or at least a part of the basic raw meal component in the intermediate grain size range from 60 to 200 μm is introduced after the third cyclone of the four-stage or five-stage preheater directly into the zone between the sintering zone and transition zone of the kiln in order to incorporate the limestone particles from the intermediate grain size range of 60–200 μm into the clinker.

In this case the intermediate fractional proportion of the basic raw meal component is already heated from the delivery into the zone between the transition and sintering zones approximately to above 600° C. This accelerates the heating of the intermediate fraction to the sintering temperature during feeding into the kiln and relieves the thermal load on the sintering zone. It is very important that the proportion of the basic raw meal component which is separated off from the third cyclone stage amounts to no more than 10–20% of the total raw meal or 20–40% of the basic (calcite-containing) component fraction separately fed into the second preheating string.

Approximately 60–80% of the basic (calcite-containing) component fraction with grain sizes of approximately 200 to 2000 μm fed separately into the second preheating string falls through because the calcite grains are too large out of the second cyclone stage into the fourth cyclone stage. From there this limestone fractional proportion is introduced directly or through the calciner into the kiln.

The raising of the intermediate limestone fraction of 60–200 μm into the zone between the transition zone and sintering zones of the kiln is carried out by injection both through the inlet and through the outlet of the kiln. Nowadays there are various technical solutions for injecting the material to be roasted into the kiln.

In order to utilise the technical work capacity of the hot gases completely without loss in order to preheat the raw materials, at least a part of the raw meal from the preheating string in which the mixture consisting of the acidic raw meal components and fine basic proportion of the basic raw meal component had already been heat treated is introduced into the lowest cyclone of the other preheating string in which the coarse grain size (coarse grain class fraction) of the raw meal component had been heat treated.

The advantage according to the invention of the described method of roasting raw meal reside in the fact that the fine and coarse fractions of the raw meal are heat treated separately in the preheating and calcining arrangements under optimally adapted conditions. In order additionally to increase the reactivity of the raw meal during clinker sintering it is possible for the intermediate grain material with grain sizes of 80–125 μm to 80–200 μm of basic raw meal components to be separated off in a separate preheating string during heat treatment of raw meal and fed into the kiln. The invention is explained below in greater detail with reference to an embodiment for FIGS. 1 and 3.

In a tenth preferred embodiment of the invention it is provided that in the double-string preheating stage—based on the guiding of the raw material—while the basic raw material from the preheating string supplied with hot gases from the precalcination stage with grain sizes from 60–200 $\mu$m to 80–200 $\mu$m is introduced directly in the sintering stage into the zone between the sintering and transition zones with a temperature of 1250–1450° C., the basic raw material with grain sizes of 125–500 $\mu$m to 200–2000 $\mu$m which falls through under the effect of gravity from the second cyclone stage of the same preheating string into the fourth cyclone stage (precipitator of the precalcination arrangement) is introduced into the reaction chamber (reaction zone) between the sintering and recalcination stages together with the remaining proportion of raw meal, wherein free oxygen in the kiln exhaust gases is fixed by the coarse-grained reducing agent introduced upwards with the gas stream and having a grain size of 0.01–3000 $\mu$m, the $Fe_2O_3$ oxide contained in the fine-ground proportion of raw meal is partially reduced to the FeO oxide and the thermal decomposition particularly of the coarse calcite particles of 200 $\mu$m to 2000 $\mu$m is accelerated at high temperatures.

This is explained as follows:

Due to the fixing of the oxygen contained in the kiln exhaust gases and partially of the carbon dioxide to the carbon monoxide a reducing gas medium is produced in the reaction zone which, as experimental and thermodynamic investigations show, leads to the reduction of the decomposition temperature of calcite. Following the thermal-chemical reactions the exhaust gas oxygen, preferably hot air from the cooling stage is introduced, so that if appropriate the resulting CO oxide can still be burnt after the decomposition of the calcite had been accelerated. In this way the resulting heat can be utilised for calcining the fine-ground proportion of raw meal. This means that after the decomposition of the calcite is accelerated under reduction conditions in the reaction chamber the fine-ground proportion of raw meal can be additionally heated by afterburning of the CO. Thus a dual effect is achieved in the clinker formation. Thus, put another way, combustible reducing agent introduced optionally in excess into the reaction chamber, such as for example pit coal an brown coal, lean coal and comminuted used tyres, can advantageously be utilized after partial utilisation of the reduction potential for reducing the $Fe_2O_3$ oxide. The invention will be explained below with reference to an embodiment for FIGS. 1 and 3.

In an eleventh further embodiment of the invention it is provided that a reducing agent and/or a catalyst is introduced for thermal-chemical activation of the quartz contained in the hot raw meal, wherein according to the drying process the reducing agent is delivered into the hot meal between the sintering and calcination stages and, if the preheating stage and calcination stage are of double-string construction, delivered between the sintering stage and the string of the calcination or recalcination stage in which the fine proportion of the raw meal ground below 30–80 $\mu$m is heat treated, and the catalyst is fed in during grinding of the fine proportion of raw meal to be ground below 30–80 $\mu$m, and furthermore wherein according to the wet process the reducing agent is delivered to the sintering stage between the transition and calcination zones and the catalyst is fed in during grinding of the fine proportion of raw meal to be ground below 80 $\mu$m.

This has the advantage that the object of the reducing agent and catalyst in the $SiO_2$-enriched grain size fraction of the raw meal is fulfilled, so that the maximum effectiveness of chemical activation of the quartz is achieved. The invention will be described in greater detail below with reference to FIGS. 1 and 3.

In a preferred embodiment of the invention it is provided according to claim 18 that a coarse-grained fuel with grain sizes from 0.01–3000 $\mu$m to 500–3000 $\mu$m as reducing agent—based on the complete burn-out of the reducing agent up to the boundary between the sintering and transition zone of the rotating kiln, i.e. up to 1200–1250° C.—is introduced in excess into the kiln exhaust gases in the region of a location where raw material from the preheating stage is added to the kiln exhaust gases, so that the unburnt coarse fraction falls through via the kiln inlet and in this way is mixed together with the raw meal.

This has the advantage that on the one hand the oxygen contained in the exhaust gases is completely fixed by the fine proportion of the reducing agent, and on the other hand the unburnt coarse-grained proportion of the reducing agent which passes together with hot meal into the kiln causes a reduction gas medium in the burning layer of the kiln up to 1150–1250° C. with combustion in stages. This accelerates the crystal-chemical conversions of the quartz to CS and $C_3S_2$ and expulsion of the rest of the carbon dioxide from the basic raw meal component. Following the thermal-chemical redox reactions of the reducing agent hot air is preferably introduced from the cooling stage into the calciner so that if appropriate incompletely burnt fuel which has been converted into CO undergoes secondary combustion in order to use the resulting heat for recalcining the raw materials. It may be noted that the feed quantity of the reducing agent is dependent upon the oxygen content in the kiln exhaust gases and moreover upon the grain sizes and the burn-out speed of the fuel. The invention is described in greater detail below with reference to an embodiment for FIG. 3. The invention is described in greater detail below with reference to FIGS. 1, 2 and 3.

In a twelfth embodiment of the invention it is provided that as catalyst fluorine-containing substances or industrial waste (e.g. phosphor slag) and magnesium-containing additives are introduced during grinding into the proportion of the raw meal to be ground below 80 $\mu$m, so that the catalyst together with the fine proportion of the raw meal is precipitated in the lowest cyclone after heat treatment in the preheater and calciner and thereafter is introduced into the kiln, in which case the quantity of magnesium-containing additives, in conformity with the actual content of the alkalis and of the MgO in the hot meal at the start of the kiln, must be guaranteed a ratio of the MgO content to the total alkali content of 2:1 to 5:1. Thus in the case of utilisation of the industrial waste for clinker production the dual effect is achieved, since on the one hand the clinker information is significantly accelerated and on the other hand the industrial waste is used effectively. The invention is described in greater detail below with reference to FIGS. 1 and 3 and is convincing according to the results in Table 20.

In a thirteenth preferred embodiment of the invention it is provided that in the case of a preheating stage of double-string construction—based on the guiding of the raw material—instead of a preheating string which is connected to the precalcination stage or correspondingly connected on the material discharge and gas side to one of two calciners present and in which exclusively the coarse grain class fraction of the basic raw meal component with grain sizes of 60–500 $\mu$m to 80–2000 $\mu$m is heat treated, together with the connected precalcination stage or correspondingly together with one of two calciners present a fluidised bed reactor or a or a swirling flow calcination chamber (convex chamber) with a hot gas producer is installed.

The use of the fluidised bed reactor or a swirling flow calcination chamber (convex chamber) with a hot gas producer as calciner instead of the precalcination stage with the preheating arrangement for calcining the coarse-grained proportion of basic raw meal component has the advantage that the dissociation time necessary for the calcite decomposition is maintained.

The advantages of the described method of roasting raw meal which are achieved with the invention reside in the fact that the fine and coarse fractions of the raw meal are heat treated separately in the preheating and calcining arrangements under optimally adapted conditions. In order additionally to increase the reactivity of the raw meal in the clinker sintering, it is possible for the intermediate grain material with grain sizes of 80–125 $\mu$m to 80–200 $\mu$m of basic raw meal components to be separated off during heat treatment of the coarse fraction of raw meal in a separate preheating string and fed into the kiln. The invention is described in greater detail below with reference to an embodiment for FIG. 12.

In a further preferred embodiment of the invention it is provided according to claim 21 that in a preheating stage of double-string construction—based on the guiding of the raw material—where exclusively the coarse grain class fraction of the basic raw meal component with grain classes from 60–500 $\mu$m to 80–2000 $\mu$m is heat treated in a preheating string connected to the precalcination stage or correspondingly to one of two calciners present on the material discharge and gas side, instead of the connected precalcination stage or corresponding to the particular calciner a fluidised bed reactor or a swirling flow calcination chamber (convex chamber) with a hot gas producer is installed, so that the calcination of the coarse grain class fraction of the basic raw meal component with grain sizes from 60–2000 $\mu$m to 80–2000 $\mu$m or coarsest fraction with grain sizes from 125–500 $\mu$m to 200–2000 $\mu$m of the coarse grain class fraction of the basic raw meal component is carried out in the fluidised bed reactor or a swirling flow calcination chamber (convex chamber) with a hot gas producer.

The use of the fluidised bed reactor or a swirling flow calcination chamber (convex chamber) with a hot gas producer as calciner instead of the precalcination stage for calcination of the coarse-grained fraction of basic raw meal component has the advantage that the dissociation time necessary for the calcite decomposition is maintained.

The advantages of the described method of roasting raw meal which are achieved with the invention reside in the fact that the fine and coarse fractions of the raw meal are heat treated separately in the preheating and calcining arrangements under optimally adapted conditions. In order additionally to increase the reactivity of the raw meal in the clinker sintering, it is possible for the intermediate grain material with grain sizes of 80–125 $\mu$m to 80–200 $\mu$m of basic raw meal components to be separated off during heat treatment of the coarse fraction of raw meal in a separate preheating string and fed into the kiln. The invention is described in greater detail below with reference to an embodiment for FIG. 13.

According to a fifteenth preferred embodiment of the invention apparatus for carrying out the method according to the invention which an includes arrangement for preheating, calcination, sintering and cooling of cement raw material or cement clinker, wherein the calciner is divided into precalcination and recalcination arrangements which are separated from one another in such a way that the precalcination arrangement is connected to a hot gas producer and the recalcination arrangement is connected to the exhaust gas side of the sintering arrangement, and wherein furthermore between the recalcination arrangement and the sintering arrangement a reaction chamber with feed arrangement for coarse-grained reducing agent is disposed between the recalcination arrangement and sintering arrangement for chemical activation of the quartz contained in the raw meal or of the circumstances for modification thereof and of the tridymite and crystabolite, and wherein furthermore a feed arrangement for the intermediate grain size fractional proportion of the basic raw meal component of 60–125 $\mu$m to 80–200 $\mu$m is disposed in the region of a point on the feed arrangement for the fuel of the sintering arrangement.

In this way the quartz contained in the raw meal and circumstances for modification thereof can be chemically incorporated into the CS and $C_3S_2$ before the sintering zone. This results in an increase in the reactivity.

The advantage of the described method of roasting raw meal which are achieved with the invention reside in the fact that the fine and coarse fractions of the raw meal are heat treated separately in the preheating and calcining arrangements under optimally adapted conditions. In order additionally to increase the reactivity of the raw meal in the clinker sintering, it is possible for the intermediate grain material with grain sizes of 80–125 $\mu$m to 80–200 $\mu$m of basic raw meal components to be separated off during heat treatment of the coarse fraction of raw meal in a separate preheating string and fed into the kiln. The invention is described in greater detail below with reference to an embodiment for FIGS. 1 and 3.

In a sixteenth embodiment of the invention it is provided that in the reaction chamber, viewed in the direction of flow of the exhaust gases from the sintering arrangement, the feed arrangement for the coarse-grained burnable reducing agent for amorphisation of the quartz and furthermore in the sintering arrangement the feed arrangement for the partially precalcined intermediate grain size fraction of the basic (calcite-containing) raw meal component with grain sizes from 60–200 $\mu$m to 80–200 $\mu$m which is or is not preheated or for the basic raw material with grain sizes of 200–2000 $\mu$m or for the mixture of the proportion of the basic (calcite-containing) raw meal component fine-ground below 60–80 $\mu$m and the fine-ground acidic raw meal components ($SiO_2$, $Al_2O_3$ and $Fe_2O_3$ carriers) are disposed upstream in the gas stream and the feed arrangement for air/oxygen is disposed downstream. The invention is described in greater detail below with reference to an embodiment for FIGS. 1 and 3.

In seventeenth of the invention it is provided that turbulence inserts are used in the hot gas producer. The invention is described in greater detail below with reference to FIGS. 1 and 3.

In an eighteenth preferred embodiment of the invention it is provided that the preheating arrangement consists of two separate preheating units for the cement raw material, wherein on the gas side one preheating unit is connected to the recalcination arrangement and the other preheating arrangement is connected to the precalcination arrangement. The invention is described in greater detail below with reference to FIGS. 1 and 3.

In an ninteenth particularly preferred embodiment of the invention it is provided that the preheating unit connected on the gas side to the precalcination arrangement is connected on the material discharge side either to the hot gas producer of the precalcination arrangement and/or to the sintering arrangement (the kiln), and that the preheating unit connected on the gas side to the recalcination arrangement is connected on the material discharge side to the precalcination arrangement. The invention is described in greater detail below with reference to FIGS. 1 and 3.

In a twentieth embodiment of the invention it is provided that the reaction chamber and the recalcination arrangement consists of a tubular gas riser which is connected to the sintering arrangement and preferably contains turbulence inserts, followed by a cyclone separator. The invention is described in greater detail below with reference to FIGS. 1 and 3.

In twenty-first embodiment of the invention it is provided that on the gas side throttle devices are connected to the cyclone preheater in the uppermost part. The invention is described in greater detail below with reference to FIG. 2.

According to a twenty-second preferred embodiment of the invention also includes apparatus for carrying out the method according to the invention which is distinguished by an arrangement for separate grinding and drying of the acidic and basic raw meal components, their separate and/or common preheating, calcination, common sintering and cooling of cement clinker, wherein in the preheating string in which the basic raw meal component is separately heat treated, below the double cyclone dust extraction, there is disposed a multi-component classifier which divides the basic raw meal component precipitated in the double cyclone dust extraction into three grain size fractions, of which the finest grain size fraction with grain sizes of <60–80 $\mu$m is discharged via the down pipe and introduced into the gas pipe of the other (parallel) preheating string, the intermediate grain size fraction with grain sizes of 60–125 $\mu$m to 80–200 $\mu$m is discharged via the down pipe and introduced with the aid of a feed arrangement directly through the flame of the kiln behind the sintering zone into the temperature range of 1250–1400° C. in order to incorporate the clinker, and the coarsest grain size fraction with grain sizes of 125–500 $\mu$m to 200–2000 $\mu$m is discharged via the down pipe and introduced into the gas pipe of the same preheating string.

The advantages of the described method of roasting raw meal which are achieved with the invention reside in the fact that the fine and coarse proportions of the raw meal are heat treated separately under optimally adapted conditions in the preheating and calcination arrangements. In order additionally to increase the reactivity of the raw meal in the clinker sintering it is possible for the intermediate grain material with grain sizes from 80–125 $\mu$m to 80–200 $\mu$m of basic raw meal components to be separated off during heat treatment of the coarse proportion of raw meal in a separate preheating string and fed into the kiln. The invention is described in greater detail below with reference to FIG. 2.

According to a twenty-third preferred embodiment of the invention apparatus for carrying out the method is distinguished by an arrangement for drying and grinding, disagglomeration, classification and precipitation, wherein a roller press which is connected in closed circuit to a hammer mill intended in advance for the disagglomeration of the pressed scabs produced from the limestone and to a static classifier built up on a pneumatic conveyor dryer is connected downstream behind the cyclone, on the material discharge side and on the gas side, since the coarse finished product contained in the gas stream with grain sizes from 80–500 $\mu$m to 125–2000 $\mu$m is precipitated in the cyclone connected afterwards, to a ball mill connected into the closed circuit with a cyclone and a blower, and wherein furthermore an electrostatic filter in which the fine finished product which is contained with grain sizes smaller than 32–70 $\mu$m is precipitated is arranged afterwards in the direction of flow of the exhaust gases towards the blower, and wherein furthermore a feed arrangement for the basic and hard acidic raw meal components is disposed on the roller press and a feed arrangement for the argillaceous acidic raw meal components is disposed on the hammer mill.

The advantages of the described method of grinding raw meal which are achieved with the invention reside in the fact that the reactivity of the raw meal during clinker sintering is increased. For example it is possible to remove the intermediate grain material with grain sizes of 70–90 $\mu$m to 30–200 $\mu$m of basic raw meal components and during grinding of the acidic raw meal components with a necessary proportion of the basic raw meal component to achieve a fineness far below 80 $\mu$m. The invention is described in greater detail below with reference to FIG. 4.

In a twenty-fourth further embodiment of the invention it is provided that a feed arrangement for acidic raw meal components with a part of the limestone of approximately 5–15% of the total raw meal is disposed on the ball mill and a feed arrangement only for basic raw meal components is disposed on the roller press. The invention is described in greater detail below with reference to FIG. 4.

According to twenty-fifth a preferred embodiment of the invention also includes apparatus for carrying out the method according to the invention which is distinguished by an arrangement for drying and grinding, disagglomeration, classification and precipitation, wherein a material bed roller press for the coarse grinding of the raw meal in closed circuit is connected to a hammer mill intended in advance for the disagglomeration of the pressed scabs produced from the raw meal and with a static pre-classifier built up on a pneumatic conveyor dryer is connected on the material discharge side and on the gas side, since the tailings contained in the gas stream with grain sizes coarser than 500–2000 $\mu$m are precipitated in the pre-classifier, to—connected one after the other—a final classifier where the coarse material with grain sizes of 80–500 $\mu$m to 125–2000 $\mu$m is precipitated, a cyclone, a blower and an electrostatic filter.

The advantages of the described method of grinding raw meal which are achieved with the invention reside in the fact that in this case it is possible to divide the basic raw meal component into the fine fraction with grain sizes <80 $\mu$m and coarse fraction with grain sizes from 80–500 $\mu$m to 80–2000 $\mu$m in the necessary ratio. The invention is described in greater detail below with reference to FIG. 5.

A twenty-sixth preferred embodiment of the invention also includes apparatus, which is distinguished by an arrangement for drying and grinding, conveying, classification and precipitation, wherein a roller mill operated in closed circuit for the coarse grinding of the raw meal has connected to it by way of a bucket elevator a dynamic classifier which is connected on the classifier discharge side to the finished product conveyor by the coarse finished product with grain sizes from 125–500 $\mu$m to 200–2000 $\mu$m of the basic raw meal component and is connected to the mill feed of the roller mill for further grinding by the tailings with grain sizes coarser than 500–2000 $\mu$m, and wherein furthermore a static classifier is disposed between the roller mill and an electrostatic filter on the pneumatic conveyor dryer in order to precipitate the particles with grain sizes from 80–125 $\mu$m to 60–200 $\mu$m of the basic raw meal component as intermediate finished product in the static classifier and to precipitate the remaining portion of the fine material with grain sizes smaller than 60–80 $\mu$m, produced from the acidic and basic raw meal components, in the electrostatic filter.

The advantages of the described method of grinding raw meal which are achieved with the invention reside in the fact that the basic raw meal component is divided into three fractions and the grain classes present can be used according to any proposed method. For example, in order to increase the reactivity of the raw meal in clinker sintering, it is possible to remove the intermediate grain material with grain sizes from 70–90 μm to 30–200 μm of basic raw meal components or to feed it into the kiln or the grain size fraction of basic (calcite-containing) raw meal components enriched with quartz crystal grains larger than 40 μm is separated off (divided off) and then fine-ground below 40–80 μm separately or together with the acidic raw meal components and the basic raw meal component provided for the fine-ground fraction. The invention is explained in greater detail below with reference for FIG. 6.

A twenty-seventh preferred embodiment of the invention includes apparatus, which is distinguished by an arrangement for drying and grinding, conveying, classification and precipitation, wherein a roller mill operated in closed circuit for the coarse grinding of the raw meal has a bucket elevator connected to it in order to feed the tailings with grain sizes over 500–2000 μm to the roller mill again, and a discharge arrangement is disposed below the static classifier installed in the roller mill in order to separate off the coarse finished product with grain sizes from 125–500 μm to 200–2000 μm of the basic raw meal component from the finished product, and wherein furthermore a static classifier is disposed between the roller mill and an electrostatic filter in the pneumatic conveyor dryer in order to precipitate the particles with grain sizes from 80–125 μm to 60–200 μm of the basic raw meal component as intermediate finished product and to precipitate the remaining portion of the fine material with grain sizes smaller than 60–80 μm, consisting of the acidic and basic raw meal components, in the electrostatic filter.

The advantages of the described method of grinding raw meal which are achieved with the invention reside in the fact that the grain classes present can be used according to any proposed method. For example, in order to increase the reactivity of the raw meal in clinker sintering, it is possible to remove the intermediate grain material with grain sizes from 70–90 μm to 30–200 μm of basic raw meal components or to feed it into the kiln or the grain size fraction of basic (calcite-containing) raw meal components enriched with quartz crystal grains larger than 40 μm is separated off (divided off) and then fine-ground below 40–80 μm separately or together with the acidic raw meal components and the basic raw meal component provided for the fine-ground fraction. The invention is explained in greater detail below with reference to FIG. 7.

A twenty-eight preferred embodiment of the invention also includes apparatus, which is distinguished by an arrangement for drying and grinding, conveying, classification and precipitation, wherein in a double rotator drying and grinding mill, which is operated in closed circuit for the coarse grinding of the raw meal and includes a feed on both sides for the feed material or tailings as well as the hot gases, a pre-dryer, a fine- and coarse-grinding chamber and feed spigots, a partition for separate central discharges of basic components and of acidic components is disposed between the fine-grinding chamber and the coarse-grinding chamber, wherein furthermore the rotary air separator which is connected on the material discharge side to the fine-grinding chamber, to which a predominantly acidic component is fed, via the bucket elevator and parallel via the discharge housing with subsequent static classifier, and to the coarse-grinding chamber, to which a basic component is fed, only via the discharge housing with subsequent static classifier, is connected on the material classification side by the coarse material with grain sizes coarser than 60–80 μm only to the mill feed of the fine-grinding chamber and by the fine material with grain sizes smaller than 60–80 μm with a fine proportion of the basic raw meal component (approximately 5–60%) to the fine finished product conveyor, wherein moreover the rotary air separator connected on the material discharge side to the coarse-grinding chamber via the bucket elevator is connected on the material classification side by the tailings with grain sizes coarser than 500–2000 μm of the basic raw meal component to the mill feed, to which only fresh material of the basic raw meal component is fed, and is connected by the finished product with grain sizes from 80–500 μm to 80–2000 μm of the basic raw meal component to the finished product conveyor, and wherein furthermore the finished product with grain sizes from 80–500 μm to 80–2000 μm of the basic raw meal component is delivered to the sintering stage separately or together with the fine material with grain sizes smaller than 80 μm of the acidic and basic raw meal components precipitated in the rotary air classifier, cyclones and electrostatic filter.

The advantages of the described method of grinding raw meal which are achieved with the invention reside in the fact that the reactivity of the raw meal in clinker sintering is increased by the removal of the intermediate grain material with grain sizes of 70–90 μm to 30–200 μm of basic raw meal components. The invention is described in greater detail below with reference to FIG. 8.

In a twenty-ninth much preferred embodiment of the invention it is provided that a multi-component classifier is disposed on the material discharge side of the coarse-grinding chamber of the double rotator drying and grinding mill over the bucket elevator and in it the classification material is separated into four grain size fractions, wherein the multi-component classifier is connected on the material discharge side by the discharge arrangement for the tailings with grain sizes larger than 500–2000 μm to the mill intake arrangement, is also connected on the material discharge side to the mill intake by two discharge arrangements for the coarse classification material with an overall grain size range of 60–2000 μm by that discharge arrangement in which the coarse classification material is enriched with quartz grains coarser than 60 μm, is connected to the finished product conveyor by the other discharge arrangement in which the coarse classification material does not have any enrichment with quartz crystals larger than 60 μm, and is connected to the finished product conveyor by the discharge arrangement for the fine material with grain sizes smaller than 60–80 μm.

The advantages of the described method of grinding raw meal which are achieved with the invention reside in the fact that the grain classes present can be used according to any proposed method. For example, in order to increase the reactivity of the raw meal in clinker sintering it is possible for the intermediate grain material with grain sizes from 70–90 μm to 30–200 μm of basic raw meal components to be removed or fed into the kiln. The invention is described in greater detail below with reference to FIG. 9.

A thirtieth preferred embodiment of the invention also includes apparatus, which is distinguished by an arrangement for drying and grinding, conveying, classification and precipitation, wherein in a double rotator drying and grinding mill, which is operated in closed circuit for the coarse and fine grinding of the raw meal and includes a feed on both sides for the feed material or tailings as well as the hot gases, a pre-dryer fine-grinding chamber, a coarse-grinding chamber, and a partition with feed spigots on both sides disposed between the fine-grinding chamber and the coarse-grinding chamber for separate central discharges of both components, a static classifier built up over the combined discharge housing is connected directly to the separate central discharges and connected parallel is a bucket elevator disposed over a pneumatic trough conveyor connected to the separate central discharge of the fine-grinding chamber, wherein furthermore during the discharge of the coarse-ground material both the static classifier built up on the discharge housing and the bucket elevator connected via the pneumatic conveyor trough to the central discharge of the fine-grinding chamber are connected on the material discharge side by the coarse material with grain sizes coarser than 60–80 $\mu$m only to the pre-dryer fine-grinding chamber, to which the acidic components are principally fed for example as fresh material, and during the intake of feed material (for example <60–80 $\mu$m) the static classifier built up on the discharge housing is connected both to the pre-dryer fine-grinding chamber and to the coarse-grinding chamber and the bucket elevator connected via the pneumatic trough conveyor is only connected to the pre-dryer fine-grinding chamber, wherein furthermore a rotary air separator, which is connected via another bucket elevator during the receipt of the coarse-ground material of basic raw meal components (on the material intake side) on an impact crusher-dryer into which only a limestone is fed as fresh material, is connected on the material classification side by the tailings present with grain sizes over 500–2000 $\mu$m (for example of the limestone) to the coarse-grinding chamber and is connected to the finished product conveyor through the finished product present with grain sizes from 60–500 to 80–2000 $\mu$m (for example also of the limestone), wherein furthermore in the direction of flow of the exhaust gases the static classifier, bucket elevator and rotary air separator are connected parallel to a cyclone which is connected on the material discharge side by the fine material consisting of the acidic raw meal components with a fine proportion of the basic raw meal component (approximately 5–60%) with grain sizes smaller than 80 mm to the finished product conveyor and a blower is disposed thereafter in succession.

The advantages of the described method of grinding raw meal which are achieved with the invention reside in the fact that the reactivity of the raw meal is increased during clinker sintering by the removal of the intermediate grain material with grain sizes from 70–90 $\mu$m to 30–200 $\mu$m of basic raw meal components. The invention is described in greater detail below with reference to FIG. 10.

A thirty-first preferred embodiment of the invention also includes apparatus, which is distinguished by an arrangement for drying and grinding, pneumatic conveying and drying, classification and precipitation, wherein between a ball mill or tube mill operated in the pneumatic drying and grinding circuit for the fine grinding of principally acidic raw meal components and an impact mill operated in closed circuit for the coarse grinding of the basic raw meal components there is disposed a multi-component classifier connected via a dryer pipe connected to the impact hammer mill (high-speed pulveriser) and then a cyclone, wherein the multi-component classifier is connected on the material classification side by the tailings present with grain sizes over 500–2000 $\mu$m (for example of the limestone) to the impact mill thus operated with a circulating load, is connected to the finished product conveyor by the coarse material present with grain sizes from approximately 125–500 $\mu$m to 200–2000 $\mu$m (for example also of the limestone), is connected to the air-swept mill or to the kiln by the intermediate grain material present with grain sizes from 60–125 $\mu$m to 80–200 $\mu$m (for example also of the limestone), and is connected to the finished product conveyor by the fine material present with grain sizes smaller than 50–80 $\mu$m (for example also of the limestone), wherein furthermore in the direction of flow of the exhaust gases the static classifier and cyclone are connected in parallel to a cyclone which is connected to the finished product conveyor by the precipitated fine material consisting of the acidic raw meal components with a fine proportion of the basic raw meal component (approximately 5–60%) with grain sizes smaller than 80 mm, and a blower is disposed after this.

It should be noted that the ball mill or tube mill which is operated in the pneumatic drying and grinding circuit for fine grinding of the raw meal and on which a static classifier built up over the pneumatic conveyor dryer is disposed directly on the material and gas side, wherein furthermore the static classifier built up on the pneumatic conveyor dryer is connected on the material side by the coarse classification material with grain sizes coarser than 60–80 $\mu$m to the air-swept fine-grinding mill to which for example principally acidic components are fed as fresh material via a feed built into the pneumatic conveyor dryer, and a multi-component classifier is connected via a dryer pipe connected to the impact hammer mill (high-speed pulveriser) and then a cyclone to the impact hammer mill (high-speed pulveriser) which is operated in closed circuit for coarse grinding and to which a limestone is fed for example as fresh material.

The advantages of the described method of grinding raw meal which are achieved with the invention reside in the fact that the grain classes present can be used according to the methods according to the invention. For example, in order to increase the reactivity of the raw meal during clinker sintering it is possible to the intermediate grain material with grain sizes from 70–90 $\mu$m to 30–200 $\mu$m of basic raw meal components to be removed or fed into the kiln. The invention is described in greater detail below with reference to FIG. 11.

In a thirty-second further embodiment of the invention it is provided that the multi-component classifier is directly connected on the material discharge side to the impact hammer mill (high-speed pulveriser) via a cyclone connected on a dryer pipe. The invention is described in greater detail below with reference to FIG. 11.

In a thirty-third further embodiment of the invention it is provided that a proportion of the exhaust gas stream from the grinding installation is delivered in the circuit in parallel to the air-swept mill and to the impact hammer mill (high-speed pulveriser) in order to assist the conveying of the feed material to the cyclone and static classifier. The invention is described in greater detail below with reference to FIG. 11.

A thirty-fourth preferred embodiment of the invention also includes apparatus which is distinguished by an arrangement for preheating, calcination, sintering and cooling of cement raw materials or cement clinker, wherein in the preheating and calcining arrangement which consists of two separate preheating units and two calcining units, instead of one preheating unit and one calcining unit for separate preheating and deacidification of the coarse-ground raw meal fraction parallel with the other preheating and calcining unit a fluidised bed reactor or a swirling flow calcination chamber (convex chamber) with a separate hot gas producer is provided.

The advantages of the described method of roasting raw meal which are achieved with the invention reside in the fact that the fine and coarse fractions of the raw meal are heat treated separately in the preheating and calcining arrangements under optimally adapted conditions. In order additionally to increase the reactivity of the raw meal in the clinker sintering it is possible for the intermediate grain material with grain sizes from 80–125 $\mu$m to 80–200 $\mu$m of the basic raw meal components to be separated off during heat treatment of the coarse fraction of raw meal in a separate preheating string and fed into the kiln. The invention is described in greater detail below with reference to FIG. 12.

A thirty-fifth preferred embodiment of the invention includes apparatus which is distinguished by an arrangement for preheating, calcination, sintering and cooling of cement raw materials or cement clinker, wherein in the preheating and calcining arrangement which consists of two separate preheating units and two calcining units, instead of one calcining unit for separate deacidification of the coarse-ground raw meal fraction under the hot gases of the hat gas producer parallel with the other calcining unit a fluidised bed reactor or a swirling flow calcination chamber (convex chamber) with a separate hot gas producer is provided.

The advantages of the described method of roasting raw meal which are achieved with the invention reside in the fact that the fine and coarse fractions of the raw meal are heat treated separately in the preheating and calcining arrangements under optimally adapted conditions. In order additionally to increase the reactivity of the raw meal in the clinker sintering it is possible for the intermediate grain material with grain sizes from 80–125 μm to 80–200 μm of the basic raw meal components to be separated off during heat treatment of the coarse fraction of raw meal in a separate preheating string and fed into the kiln. The invention is described in greater detail below with reference to FIG. 13.

In a thirty-sixth embodiment of the invention it is proposed by treatment of the basic and acidic raw materials in stages by means of a drying and grinding stage, a pneumatic conveying and drying stage, a classification and precipitation stage that that between a ball mill or tube mill which is operated in the pneumatic drying and grinding circuit for fine grinding of the raw meal and with which is associated a static classifier which is connected directly on the material intake side and one the gas side via the pneumatic conveyor dryer, into which fresh material consisting principally of acidic components is fed via a built-in feed, and is connected on the material classification side to the feed of the air-swept fine-grinding mill by the coarse material with grain sizes coarser than 60–80 μm, and an impact hammer mill (high-speed pulveriser) which is operated in closed circuit for the coarse grinding and to which the basic components are fed as fresh material, via a dryer pipe connected to the impact hammer mill (high-speed pulveriser) and then a cyclone a connected multi-component classifier is connected on the material classification side by the tailings present with grain sizes over 500–2000 μm of the basic components to the impact mill thus operated with a circulating load, is connected to the finished product conveyor by the coarse material present with grain sizes from approximately 125–500 μm to 200–2000 μm of the basic components, is connected to the air-swept mill by the intermediate grain material present with grain sizes from 60–125 μm to 80–200 μm of the basic components, and is connected to the finished product conveyor by the fine material present with grain sizes smaller than 60–80 μm of the basic components, wherein furthermore in the direction of flow of the exhaust gases a cyclone connected to the static classifier and cyclone is connected to the finished product conveyor by the precipitated fine material which consists of the acidic raw meal components with a fine proportion of the basic raw meal component (approximately 5–60%) with grain sizes smaller than 80 mm.

The advantages of the described method of grinding raw meal which are achieved with the invention reside in the fact that the grain classes present can be used according to the method according to the invention. For example, in order to increase the reactivity of the raw meal in the clinker sintering it is possible for the intermediate grain material with grain sizes from 70–90 μm to 30–200 μm of basic raw meal components to be removed or fed into the kiln. The invention is descried in greater detail below with reference to FIG. 11.

The invention is described in greater detail with reference to the accompanying drawing wherein:

FIG. 1 shows a schematic representation of the guiding of the raw material and gas during the heat treatment of the raw materials to produce cement clinker.

FIG. 2 shows an installation for producing cement clinker from cement raw materials in which a double-string heat exchanger and prepol calciner is disposed and in which furthermore the basic raw meal component is ground separately and acidic raw meal components are likewise ground separately or together with a proportion of the basic raw meal component of 5–15% and delivered to the preheating stage in a ratio which ensures the necessary LS II, SM and TM.

Figure 2:
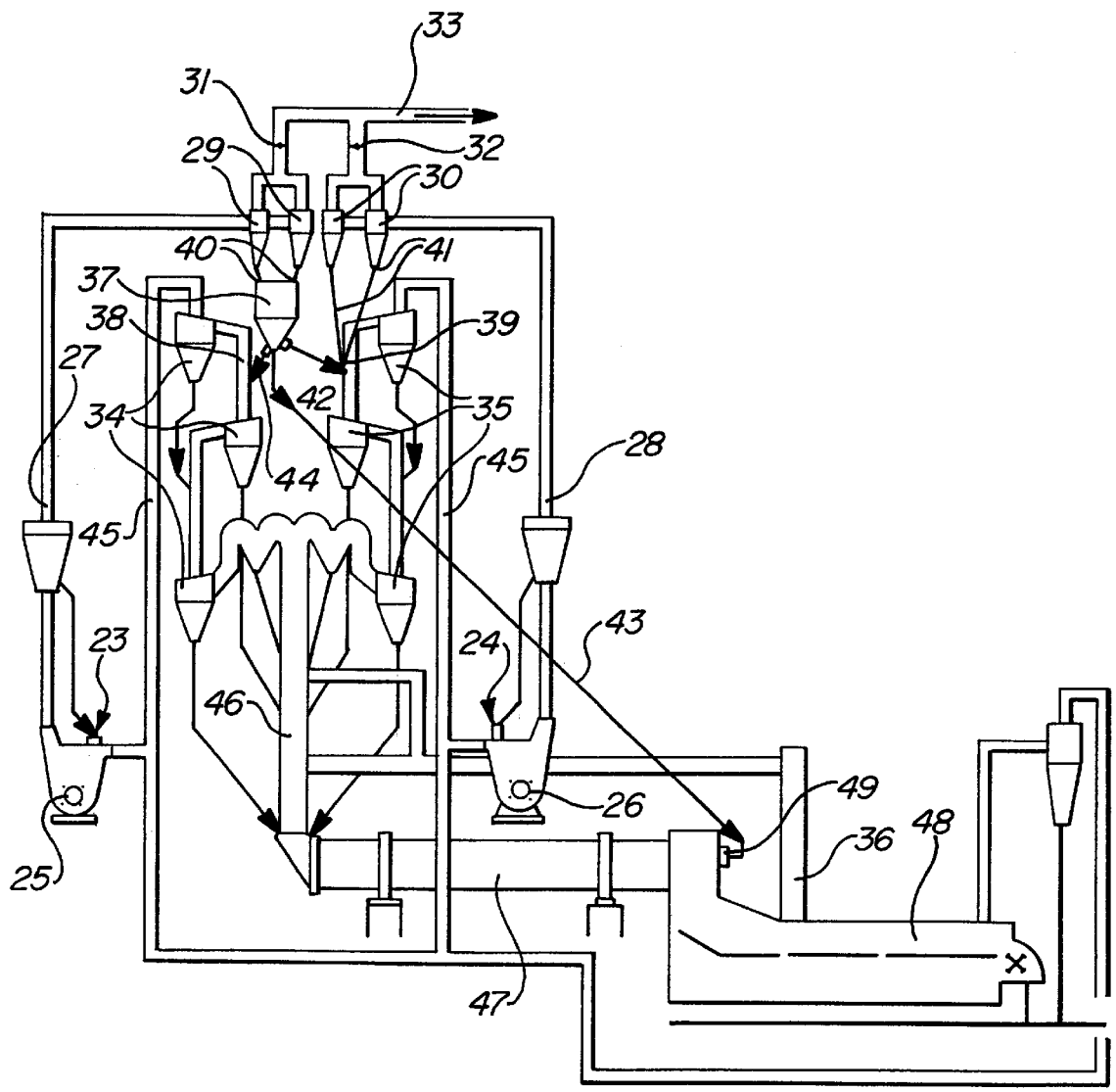
Figure 12:
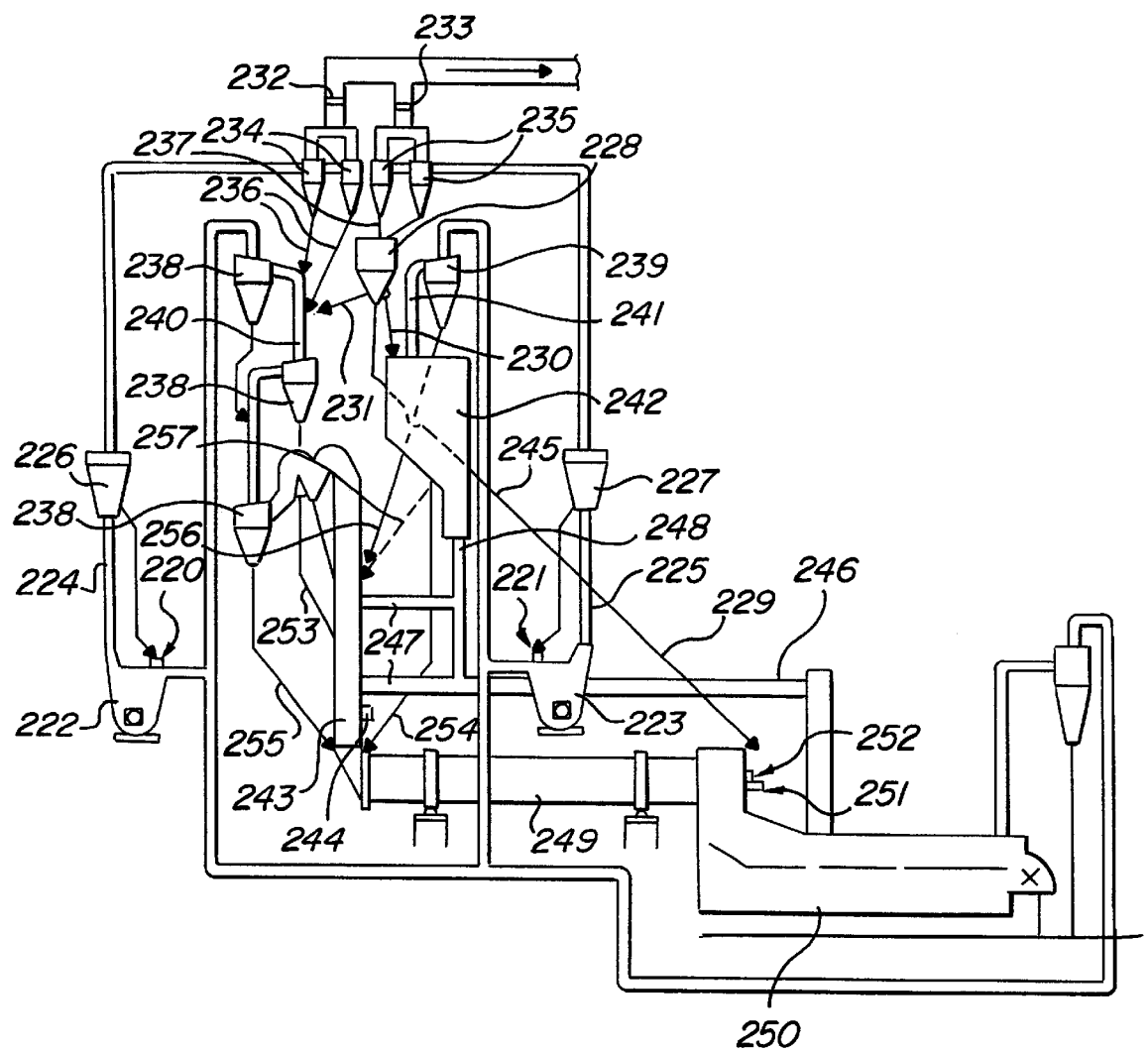

FIG. 12 shows shows an installation for producing cement clinker from cement raw materials, in which the heat exchanger when compared with the production installation according to FIG. 2 is also double-string, and in which furthermore a preheating string which is connected on the gas side to the precalcination stage is replaced together with the precalcination stage by a fluidised bed reactor or swirling flow calcination chamber (convex chamber) with a hot gas producer.

Figure 13:
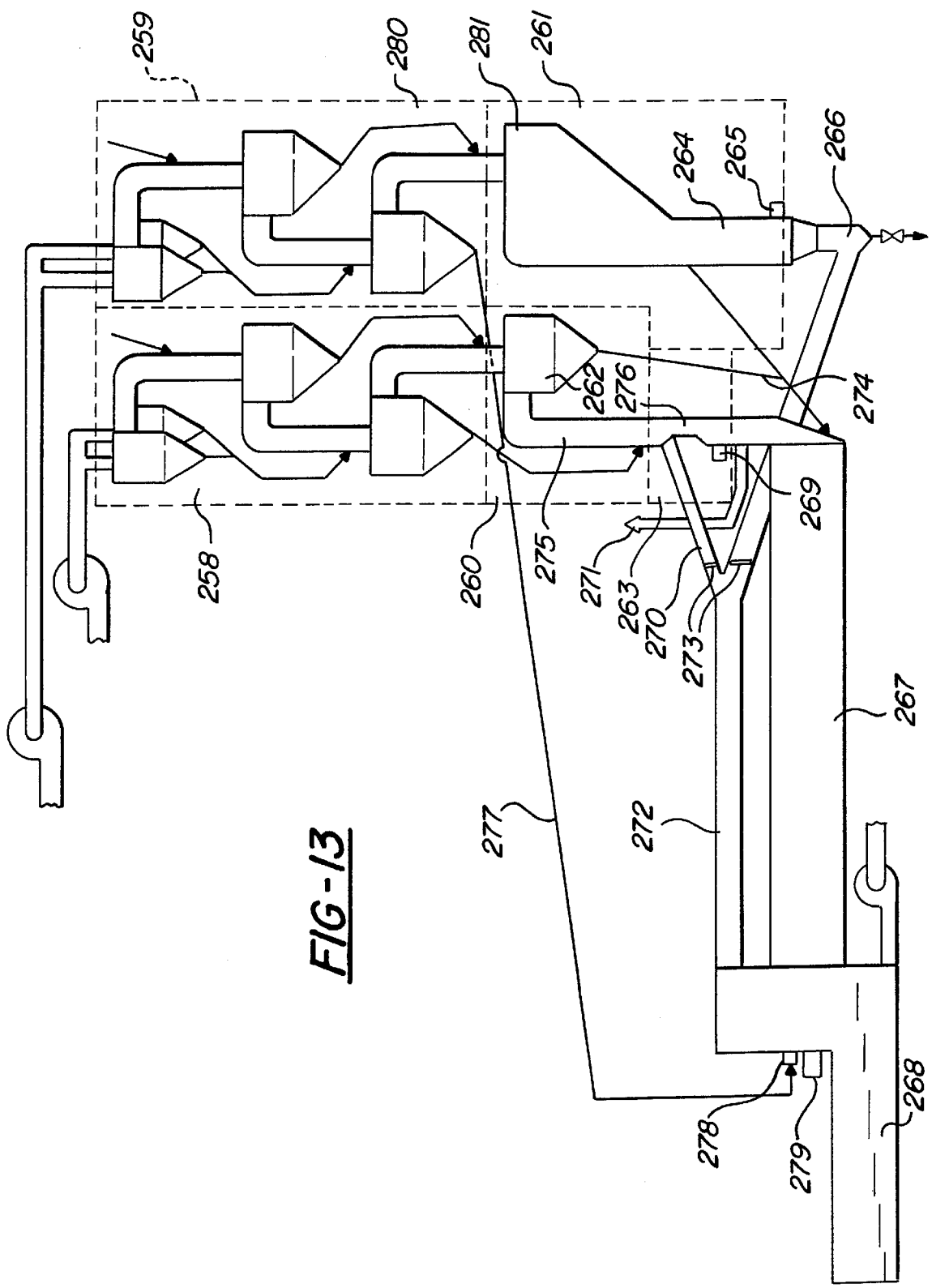

FIG. 13 shows an installation for producing cement clinker from cement raw materials, in which the heat exchanger when compared with the production installation according to FIG. 2 is also double-string, and in which furthermore a preheating string which is connected on the gas side to the precalcination stage is replaced together with the precalcination stage by a fluidised bed reactor or swirling flow calcination chamber (convex chamber) with a hot gas producer.

DETAILED DESCRIPTION

Figure 1:
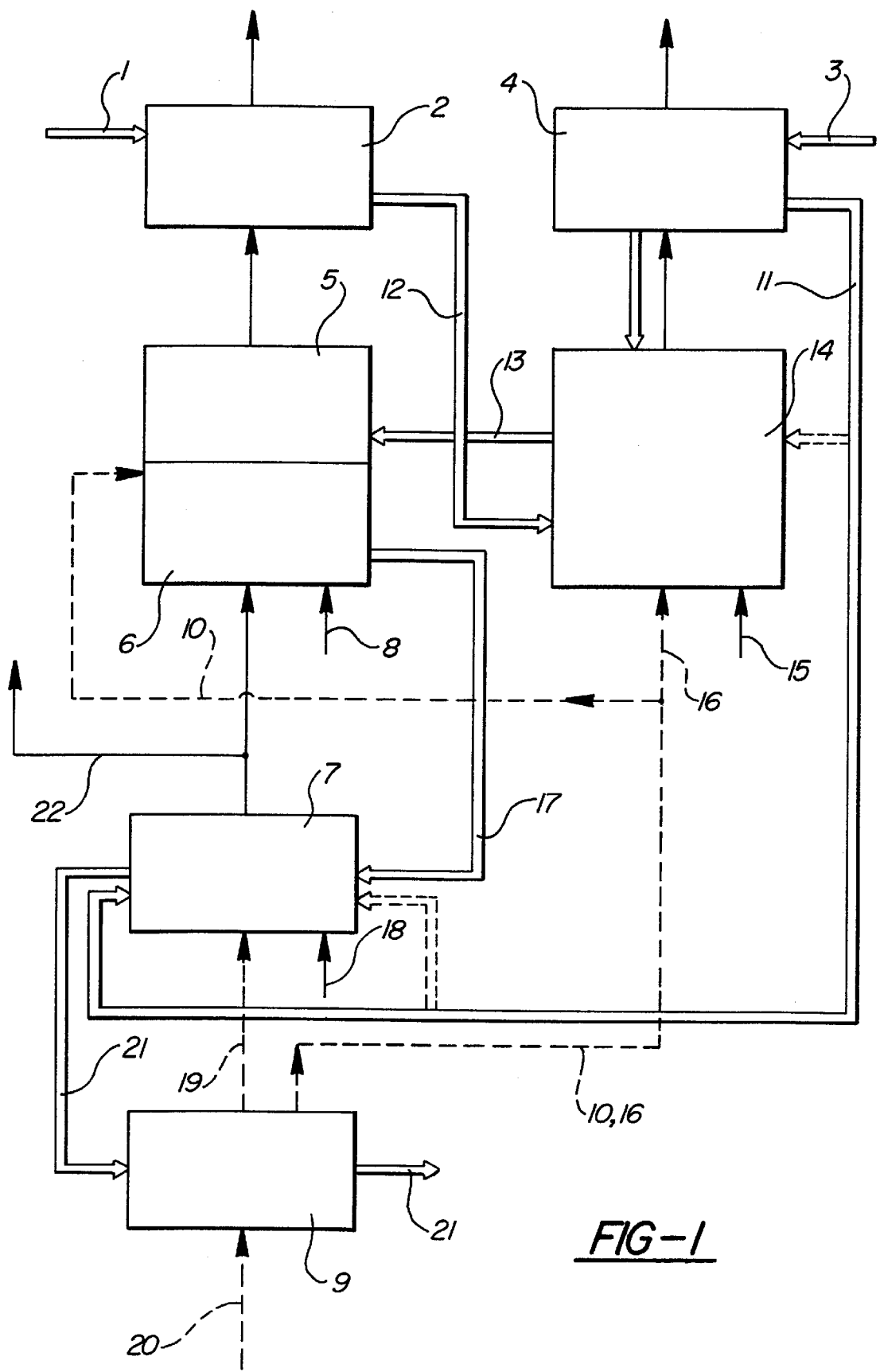

FIG. 1 shows the schematic representation of the progress of the method according to the invention without giving special components for the individual method stages.

Of the total raw material a part-quantity 1 which consists of the acidic raw meal components ground below 80 μm and the fine grain size fraction (<80 μm) of the basic raw meal component from 0.01–60 μm to 0.01–80 μm in one single preheating stage 2 supplied with the exhaust gases from a recalcination stage 5. The other part-quantity 3 which consists only of the coarse grain class proportion of the basic raw meal component with a grain size of 60.01–2000 μm to 80.1–2000 μm is preheated in parallel in at least one preheating stage 4 supplied only with the exhaust gases from a precalcination stage 14. A reaction zone 6 which is supplied exclusively with the exhaust gases from the sintering stage 7 is arranged before the recalcination stage in the direction of flow of the gases. In the reaction zone 6 a coarse-comminuted fuel 8 as reducing agent is only partially burnt, so that reducing gas proportions (CO) in the fuel are produced up to the region between the sintering and transition zones, i.e. up to 1150–1200° C., which reduce the iron oxides and partially silicon dioxides in the fuel and lead to the thermal-chemical activation of the quartz contained in the hot raw meal. The exhaust gases from the reaction zone 6 are introduced into the recalcination stage 5 with simultaneous delivery of hot air originating from the cooling stage 9 for the secondary combustion of the excess proportion of fuel.

The grain class proportion 3 with a grain size from 60.01–125 μm to 80.01–200 μm of the preheated basic raw meal component from the preheating stage 4, which is connected on the gas side to the precalcination stage 14, is introduced into the sintering stage 7 in the region between the sintering and transition zones at 1250–1400° C. so that the fixing there of the freshly produced free lime is accelerated. The raw material 12 coming from the preheating stage 2 is led directly into the precalcination stage 14. The precalcination stage 14 is heated exclusively by combustion of a proportion of fuel 15 in hot air originating from the cooling stage 9. Thus the $CO_2$ partial pressure is reduced in hot gases by comparison with kiln exhaust gases and the deacidification temperature of the calcite is lowered. The grain class proportion of the basic raw meal component with a grain size from 125–2000 μm to 200–2000 μm coming from the preheating stage 4 can likewise be introduced partially or completely into the precalcination stage 14. The entire precalcined raw material 13 which consists of the acidic raw meal components and the proportion of the basic raw meal component fine-ground below 60–80 μm and coarse-ground above 125–200 μm is introduced into the recalcination stage 5. The material 17 which has been recalcined and thus to a high finish-calcined is introduced from the recalcination stage 5 into the sintering stage 7 which is heated by combustion of the proportion of fuel 18 in hot air originating from the cooling stage 9. The clinker 21 burnt in the sintering stage 7 is introduced into the cooling stage 9 where it is cooled by means of air 20 and extracted from the heat treatment system as finished product. Between the sintering stage 7 and the reaction zone 6 a part-quantity of gas 22 is extracted if required in order to prevent circulation of pollutants caused in particular by the volatile alkali, chlorine and sulphur compounds contained in the hot gases from the sintering stage 7.

FIG. 2 shows an embodiment of apparatus for the method according to the invention. The illustrated cement production plant comprises two high-speed pulverisers 25 and 26, two pneumatic conveyor dryers 27 and 28 with the built-in static classifiers, a multi-component classifier 37, the down pipe 44 for the grain size fraction from 125–500 μm to 200–2000 μm, the down pipe 43 for the grain size fraction from 40–125 μm to 80–200 μm, down pipes 42 for the grain size fraction from 0–40 μm to 0–80 μm, two sickle-type dampers (throttle devices) 31 and 32, two double down pipes 40 and 41, two exhaust gas pipes 45, two double-cyclone extractors 29 and 30, two separate preheating strings 34 and 35 which are supplied in parallel with the exhaust gases from the calciner 45, a rotary kiln 47, a cooler 48 and a feed arrangement 49 for a proportion of the raw meal in addition to the already existing fuel supply arrangement disposed on the rotary kiln. In this case the preheating strings 34 and 35 each consist of individual cyclones which are connected to one another with gas pipes. The rotary kiln 47 is connected to the preheating strings 34 and 35 via a gas riser of a calciner 46. On the discharge side the cyclones of the preheating strings 34 and 35 are connected via the down pipe to the gas pipes or to the calciner 46.

In operation, the raw material to be treated is used as follows for clinker production.

The basic raw meal component which is separately dried and coarse-ground after the high-speed pulveriser 25 and the pneumatic conveyor dryer 27 is precipitated in the double-cyclone extractor 29, from there is discharged via the double down pipes 40 and introduced into the multi-component classifier 37. The multi-component classifier divides the coarse-ground raw meal component (e.g. limestone, lime marl or chalk) into three grain size fractions: 0–40 to 0–80 μm, 40–125 to 80–200 μm and 125–500 to 200–2000 μm. The grain size fraction with a grain size of 0–40 μm to 0–80 μm is discharged via the down pipe 42 and together with acidic raw meal components discharged via the double down pipes 41 of the double-cyclone extractor 30 is introduced into the gas pipe 39 which connects the uppermost cyclone 35 via the high-speed pulveriser 43 and the pneumatic conveyor dryer 28 with the built-in static classifier to the double cyclone 30.

The grain size fraction with a grain size from 0–40 μm to 0–80 μm of the basic raw meal component together with the acidic raw meal components is taken up and preheated by the hot gases from the lower (middle) cyclone of the preheating string 35 and is precipitated and mixed in the uppermost cyclone of the preheating string 35, from there it is correspondingly discharged via the down pipe, introduced in the gas pipe disposed at the bottom, i.e. the operation as far as the cyclone standing at the bottom and the calciner is repeated. Within these operations the mixture of the acidic raw meal components and the fine proportion of the basic raw meal component in the quantity supplied only for the formation of $C_3A$, $C_4FA$, CS and/or $C_3S_2$ is heated and ultimately deacidified. The grain size fraction (intermediate fraction) with a grain size from 40–125 μm to 80–200 μm is discharged via the down pipe 43 and introduced directly through the flame of the kiln 47 behind the sintering zone into the temperature range of 1250–1400° C. in order to incorporate the clinker. Thus the unwanted formation of the $C_2S$ before the sintering zone is avoided (prevented) and the proportion of clinker melt is increased. The grain size fraction with a grain size from 125–500 μm to 200–2000 μm is discharged via the down pipe 44 and introduced into the gas pipe 38, where it is separately heated, precipitated in the uppermost cyclone of the preheating string 34 and from there is introduced again by means of the down pipe into the gas pipe disposed at the bottom. This means that the operation as far as the lowest cyclone and calciner of this string is also repeated. Within these operations the correct proportion of the basic raw meal component is heated and deacidified.

The acidic raw meal components which are dried and fine-ground together after the high-speed pulveriser 26 and the pneumatic conveyor dryer 28 are precipitated, possibly with a proportion of the basic raw meal component of approximately 5–15% in the double-cyclone extractor 30, discharged from there via the double down pipes 41 and introduced into the gas pipe 39. From there the mixture to be roasted is heated as far as the lowest cyclone and calciner and ultimately deacidified. Finally the material to be roasted is introduced into the rotary kiln 47 for sintering.

Thus coarse-grained limestone (the particles from 125–500 to 200–2000 μm) which can only be converted to clinker by the melt in the sintering zone is heat treated in one preheating string and a fine-grained mixture of the acidic components with limestone in the ratio which causes the increase in the clinker melt is heat treated in the other preheating string.

Since the grain classes of the proportions of the raw meal to be heated treated differ to a large extent, it is necessary to ensure a necessary (sufficient) underpressure in order to create optimum conditions for the heat treatment in both strings. Two sickle-type dampers (throttle devices) 31 and 32 make it possible to keep a necessary underpressure in both strings of the preheater based on the difference in the grain size.

The invention is not limited only to the described embodiments. Thus for example instead of the multi-component classifier 37 a conventional classifier can be used which divides the limestone into two grain size fractions 0–80 μm and 80–2000 μm. This means that the intermediate grain size fraction from 40–125 μm to 80–200 μm which is to be discharged via the down pipe 43 and introduced directly into the kiln 47 is excluded in this case. For this reason the 0–80 μm fraction is heat treated together with acidic raw meal components in one preheating string and the 80–2000 μm fraction is heat treated separately in the other preheating string. In order to increase the reactivity of the raw meal in this case, a part of the coarse fractional proportion of basic (calcite-containing) raw meal component (80 to 2000 μm) or the mixture consisting of acidic raw meal components ground below 80 μm with limestone is blown in (introduced) separately (in a more or less large quantity) directly from the classifier 37 or from any cyclones (apart from the lowest one) of the string 34 through the flame of the kiln 47 with the aid of the feed arrangement 49 behind the sintering zone into the temperature range of 1250–1350° C. In this case the proportion of clinker melt is increased, since with the introduction of the said raw meal component passing over the transition zone directly into the sintering zone the formation of the belite before the sintering zone is more reduced.

Figure 3:
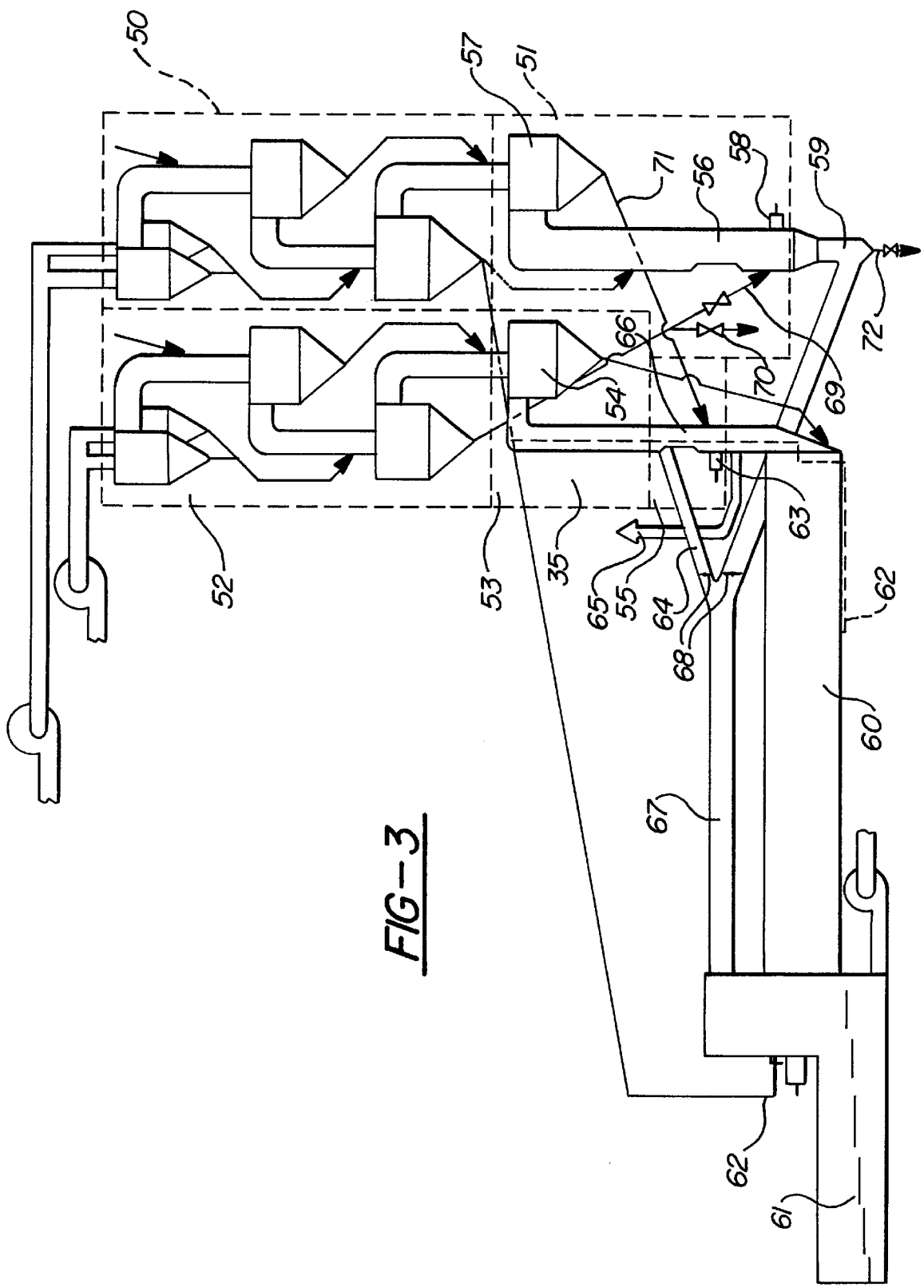
FIG. 3 shows an installation for producing cement clinker from cement raw materials, in which the heat exchanger when compared with the production installation according to FIG. 2 is also double-string, and in which furthermore the calciner is divided into a precalcination stage and a recalcination stage.

FIG. 3 shows an embodiment of apparatus for the method according to the invention. The illustrated cement production plant contains two separate preheating strings, wherein one preheating string 50 is supplied with the exhaust gases from the precalcination arrangement 51 and the other preheating string 52 is supplied with the exhaust gases from the recalcination arrangement 53. In this case the preheating strings each consist of individual cyclones which are connected to one another by gas pipes. This cement production plant is particularly suitable for large throughputs of more than 3000 tonnes per day.

The recalcination arrangement 53 consists of a tubular gas riser 35 which contains turbulence inserts and is connected to a precipitator 54; the reaction chamber 55 is constructed as a reactor tube and merges directly into the recalcination arrangement; the precalcination arrangement 51 is likewise constructed as a tubular hot gas pipe 56 with precipitator 57 and is provided with a burner 58 and a hot air supply pipe 59; the sintering arrangement 60 is constructed as a rotary kiln and the cooling arrangement 60 as a grate cooler. In order to accelerate the quartz conversion the MgO-containing additives and/or substances containing F and Cl as catalysts which are necessary for the optimal MgO:alkali ratio are introduced into the reaction chamber 55 with the aid of the feed arrangement 71 or introduced together with fine-ground proportion of the raw meal into the gas pipe of the preheating string 52, and at approximately the same height as the feed arrangement 71 a coarse-comminuted fuel is introduced as reducing agent with the aid of the feed arrangement 63.

In order to eliminate excess quantities of gaseous pollutants, such as volatile alkali, sulphur or chlorine compounds, a proportion of the hot kiln gases is removed from the system via the bypass pipe 65.

Above the throttle point 66 in the tube reactor hot exhaust air from the cooler is introduced by means of the hot air pipe 64 for combustion of the burnable reducing agent used (introduced) in excess. Preheated raw material from the preheating string 52 connected to the recalcination arrangement 53 is introduced at approximately the same height as the burner 58 into the hot gas pipe 56 of the precalcination arrangement 51.

The coarse-grained proportion of basic raw meal component with grain sizes of 60–500 to 80–2000 μm introduced into the preheating string 50 is classified into two grain classes, i.e. into the so-called intermediate grain class with grain sizes from 60–125 μm to 80–200 μm and the coarse gain class with grain sizes from 125–500 μm to 200–2000 μm as follows:

The coarse-ground basic raw meal component with grain sizes from 60–500 to 80–2000 μm is introduced into the gas pipe which connects the double cyclone to the central cyclone of the preheating string 50. The grain class proportion with grain sizes from 60–200 to 80–200 μm is taken up by the hot gases from the central cyclone of the preheating string 50, heated and precipitated in the double cyclone, from there is discharged via the down pipe of the double cyclone, introduced into the gas pipe which connects the central cyclone to the lowest cyclone of the preheating string 50, is heated there, precipitated in the central cyclone, from there is discharged via the down pipe of the central cyclone, introduced into the gas pipe which connects the lowest cyclone to the precipitator 57, is further heated again there, precipitated in the lowest cyclone of the preheater 50, from there is discharged via the down pipe 62 and fed into the kiln 60 with the aid of the feed arrangement 62. The intermediate grain class in the grain size range from 60–125 to 80–200 μm is discharged by a gas stream, the speed of which can be adjusted to the desired ultimate grain size.

As it is fed in, the coarse grain class with grain sizes from 125–500 to 200–2000 μm is already falling through under the effect of gravity into the gas pipe which connects the double cyclone to the central cyclone of the preheating string 50, via the central cyclone, the down pipe and the gas pipe which connects the precipitator 57 to the lowest cyclone 50 and enters the precipitator 57. From there the coarse grain class with grain sizes of 125–500 to 200–2000 μm which is separated off by gravity, together with the fine-ground proportion of raw meal precipitated in the precipitator 57, discharged from the preheater 52 via the down pipe 69 and introduced into the precalciner 51, is discharged via the down pipe 71 and delivered to the recalcination arrangement 53.

As fuel and oxygen are delivered into the hot gas pipe 56 the preheated materials are precalcined in the hot gases which are freed thereby of pollutants and which moreover have an even lower $CO_2$ partial pressure than the kiln exhaust gases, and finally the materials are introduced from the precipitator 57 of the precalcination arrangement 51 into the reaction chamber 55 with the aid of the feed arrangement 71 at the same height as catalyst for the $SiO_2$ conversion.

As kiln exhaust gases and fuel with oxygen are fed into the reaction chamber 55 and gas riser 35, the precalcined materials are recalcined and the quartz contained in the raw meal is superficially at least partially amorphised under the action of the reducing atmosphere produced in the incomplete combustion of the introduced reducing agent and in gaseous alkali, fluorine, sulphur and chlorine compounds contained in the kiln exhaust gases, and finally is led out of the precipitator 54 into the rotary kiln 60 for sintering. A bypass discharge pipe 72 which is provided with a shut-off device and can be guided into the rotary kiln is disposed in the lower region of the hot gas pipe 56. Shut-off devices 68 are disposed in the hot gas pipe 59, 64 for better distribution of the hot air to the reaction chamber 55 and the precalcination arrangement 51.

In order also to be able to operate the plant with the precalcination arrangement 51 out of operation, a bypass pipe 70 as well as shut-off devices which are not detailed are disposed in the down pipe 69 of the central cyclone of preheating string 52, so that if required the cement plant can be operated at only half of the throughput provided for, but nevertheless the catalysts for the quartz amorphisation can be fed in and gaseous pollutant fractions in the kiln exhaust gases can be eliminated before the hot kiln gases are used for preliminary heat treatment of the cement raw materials fed into the plant. In this case it should be noted that all raw meal components must either be fed in together into the first cyclone preheater or only without the basic raw meal component with a grain size range from 60–125 μm to 80–200 μm which has not been heated, which can be separated off with the aid of the classifier and fed to the kiln.

The invention is not limited only to the embodiments described. Thus for example the double-string cyclone preheater can be used with the separately functioning calciners. As catalysts for the quartz conversion it is possible instead of or as well as the already recommended reducing agents to use the fine-grained carbonaceous industrial waste as well as oil shale, clinker from the Welz process, ash and slag waste.

Figure 4:
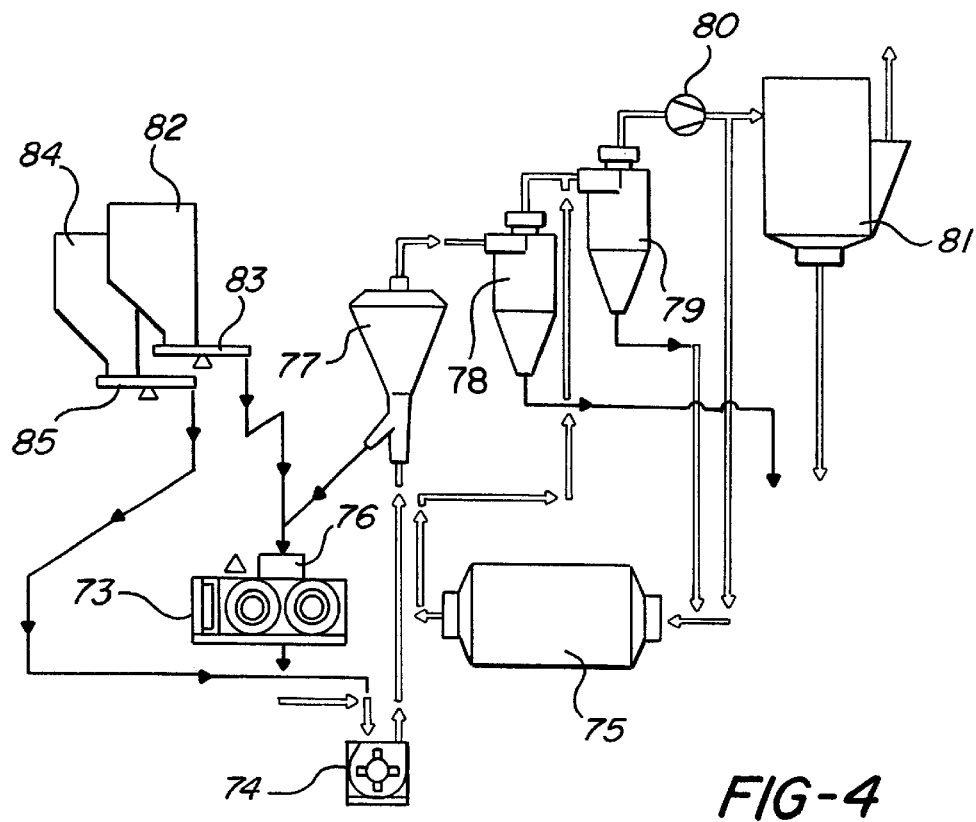
FIG. 4 shows a schematic representation of the guiding of the raw material and gas during the grinding of a raw meal consisting of a limestone and a clay, the raw meal components of which contain finely divided quartz crystals, and of a raw meal consisting of a clay and a sand, the sand of which contains quartz crystals larger than 60 μm.

FIG. 4 shows an embodiment of apparatus for the method of grinding according to the invention both for the raw meal consisting of limestone and clay, the raw meal components of which contain finely divided quartz crystals, and for the raw meal consisting of a limestone, a clay and a sand, the clay and sand of which contain quartz crystals larger than 60 μm. These starting data for the raw meal are the reason why the raw meal consisting of limestone and clay according to claims 1, 2, 3 and 4 can be ground together in one plant and the raw meal consisting of a limestone, a clay and a sand is ground separately.

According to claim 5 the fine grain size fraction of the raw meal with grain sizes below 125–200 μm is ground below 32–70 μm grain size after the joint grinding in a mall operated in closed circuit.

The illustrated raw meal production plant consists of a roller press 73, a hammer mill 74, a ball mill 75, a pneumatic conveyor dryer 76 with static classifier 77, cyclones 78 and 79, a blower 80 and an electrostatic filter 81.

In operation the limestone 82 to be ground is fed to the roller press 73 with the aid of the proportioning belt scale 83. Then the pressed scabs produced from the limestone proceed into the hammer mill 74, where they are disagglomerated. The argillaceous proportion of the raw meal 84 is added directly to the hammer mill 74. After this all raw meal components are dried together in the pneumatic conveyor dryer 76. The tailings of the limestone returned by the static classifier 77 are introduced into the roller press 73.

The grain size fraction of the raw meal with grain sizes from 125–500 μm to 200–2000 μm which is precipitated in the cyclone 78 is introduced into the finished product as coarse fraction of the raw meal. The grain size fraction with grain sizes below 125–200 μm which is precipitated in the cyclone 79 is introduced according to claim 5 into the ball mill 75 in order to be ground below 32–70 μm. The grain size fraction with grain sizes from 0.01–32 to 0.01–70 μm precipitated in the electrostatic filter 81 is delivered to the finished product conveyor as fine fraction of the raw meal. The finished products obtained are passed directly after or without preliminary mixing to the heat treatment. Thus the intermediate grain size fraction with grain sizes from 32–125 μm to 80–200 μm are excluded from the clinker formation, which increases the reactivity of the raw meal.

With such hybrid grinding of the acidic raw meal components 84, i.e. during pre-grinding in the hammer or impact mill 74, energy savings up to 25% and an increase in production up to 60% can be achieved. During coarse grinding of the limestone 82 in the roller press 73 with subsequent disagglomeration in the hammer or impact mill 74, the energy consumption is reduced by about three times and the throughput is increased by about three times.

If the acidic raw meal component cannot be reduced in size below 125 μm after the hammer mill 74, it must be fed from the hammer mill 74 directly into the ball mill 75.

In operation, the limestone 82 to be ground is fed to the roller press with the aid of the proportioning belt scale 83. Then the pressed scabs produced from the limestone proceed into the hammer mill 74, where they are disagglomerated. The argillaceous proportion 84 of the raw meal with a part of the limestone of approximately 5–15% of the total raw meal is passed directly through a ball mill 75 operated in closed circuit (it can also be operated in open circuit). Thereafter the argillaceous proportion of the raw meal with the proportion of the raw meal ground below 125–200 µm and precipitated in the cyclone 79 is appropriately redried in a separate pneumatic conveyor dryer which is installed between the ball mill 75 and the cyclone 79. The tailings of the limestone returned by the static classifier 77 are introduced into the roller press 73.

The grain size fraction of the raw meal with grain sizes from 125–500 µm to 200–2000 µm which is precipitated in the cyclone 78 is introduced into the finished product. The grain size fraction with grain sizes below 125–200 µm which is precipitated in the cyclone 79 is introduced according to claim 5 into the ball mill 75 in order to be ground below 32–70 µm. The grain size fraction with grain sizes from 0.01–32 to 0.01–70 µm precipitated in the electrostatic filter 81 is delivered to the finished product conveyor 87. The finished products obtained are passed directly after or without preliminary mixing to the heat treatment. Thus the intermediate grain size fraction with grain sizes from 32–125 µm to 80–200 µm are excluded from the clinker formation, which increases the reactivity of the raw meal.

If the raw meal to be ground contains acidic raw meal components with quartz grains larger than 60–80 µm, it is used in operation as follows for the coarse grinding.

A predominant proportion of the limestone 82 from 85 to 100% is principally coarse-comminuted separately in the roller press 73. The acidic components 84 such as clay, iron ore, sand and possibly some (a quantity of 5–15%) limestone proceed as a moist mixture (up to approximately 6–8% moisture) directly escaping the hammer or impact mill 74 into the ball mill 75. Added to this is the proportion of limestone pre-ground in the roller press below 125–200 µm and then precipitated in the cyclone 79.

Moist mixture comminuted in the roller press and consisting exclusively of basic raw meal components 82 is disagglomerated in the hammer or impact mill 74 and then dried in the pneumatic conveyor dryer 76, in the static classifier 77 built up on the pneumatic conveyor dryer 76, in order to be ground to a grain size below 500–2000 µm, the particles over 500–2000 µm are separated off and the rest delivered by the air stream to the cyclone dust extraction 78.

The grain size fraction of the raw meal with grain sizes from 125–500 µm to 200–2000 µm which is precipitated in the cyclone 78 is introduced into the finished product. The grain size fraction with grain sizes below 125–200 µm which is precipitated in the cyclone 79 is introduced according to claim 5 into the ball mill 75 in order to be ground below 32–70 µm. The grain size fraction with grain sizes from 0.01–32 to 0.01–70 µm precipitated in the electrostatic filter 81 is delivered to the finished product conveyor. The finished products obtained are passed directly after or without preliminary mixing to the heat treatment. Thus the intermediate grain size fraction with grain sizes from 32–125 µm to 80–200 µm is excluded from the clinker formation, which increases the reactivity of the raw meal.

The hot gases or exhaust gases from the kiln and cooler can be delivered both to the hammer mill 74 and also simultaneously to the hammer mill 74 and to the ball mill 75.

The discharge of the feed material from the hammer or impact mill 74 via the pneumatic conveyor dryer 76 and the static classifier 77 into the cyclone 78 and from the ball mill 75 by way of the pneumatic conveyor dryer into the cyclone 79 takes place by a gas stream, the speed of which can be adjusted to the desired ultimate grain size.

Figure 5:
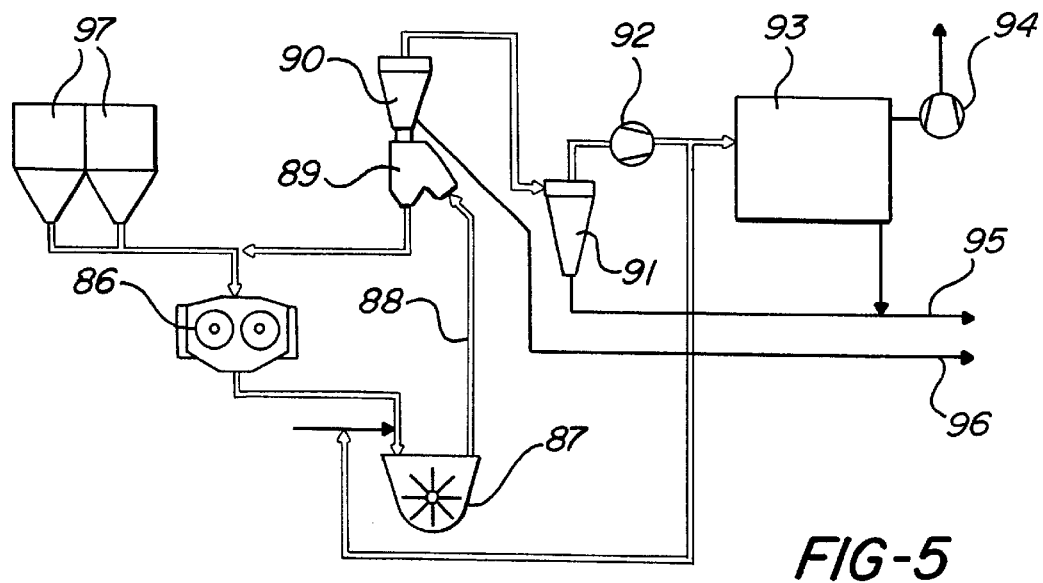
FIG. 5 shows a schematic representation of the guiding of the raw material and gas during the grinding of raw meal consisting of a limestone and a clay, the raw material components of which contain finely divided quartz crystals.

FIG. 5 shows an embodiment of apparatus for carrying out the grinding method according to the invention for the raw meal consisting of limestone and clay, the raw meal components of which contain finely divided quartz crystals and can therefore be ground together in a plant according to claims 1 and 3.

In the illustrated drying and grinding plant the material bed roll mill 86 is operated in a cycle. The scabs produced in the roll mill 86 are delivered to a hammer mill 87, disagglomerated there and dried by hot gases in the pneumatic conveyor dryer 88 and delivered to a static preliminary and final classifier 89 and 90. The tailings with grain sizes larger than 500–2000 µm separated off in the preliminary classifier 89 are fed back to the roll mill 86 for further grinding. The grain size fraction of the basic raw meal component from 80–500 µm to 80–2000 mm separated off in the final classifier is used as coarse finished product 96 of the raw meal for heat treatment separately or together with fine finished product 95. The fine finished product 95 produced in the hot gas stream after the classifiers 89 and 90 from the acidic and basic raw meal components is precipitated in cyclones 90 and electrostatic filter 93 and used according to the proposed method as the proportion of raw meal for the heat treatment.

It should be noted that instead of the hammer mill 87 a ball mill can also be used.

The advantages of such a grinding plant lie essentially, apart from the saving of energy which can be achieved, in the simple mechanical construction of the plant and in the possibility of dividing the (fine-ground) proportion of raw meal which is capable of solid reaction from the (coarse-ground) proportion of raw meal which is capable of melting reaction.

Figure 6:
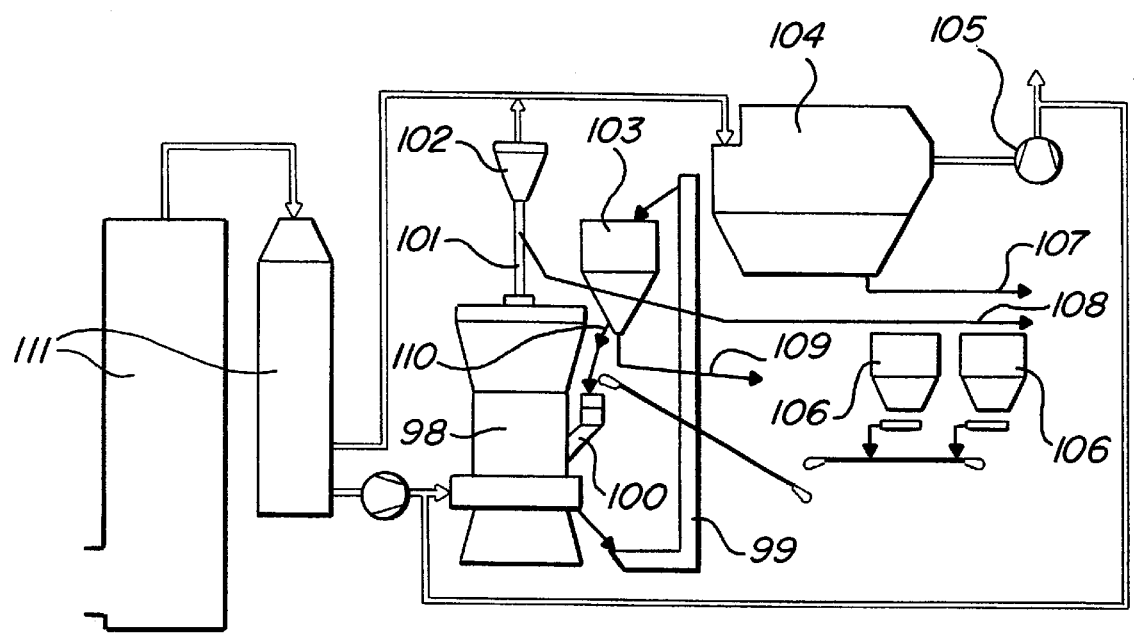
FIG. 6 shows a schematic representation of the guiding of the raw material and gas during the grinding of raw meal consisting of a limestone and a clay, the raw meal components of which contain finely divided quartz crystals.

FIG. 6 shows an embodiment of apparatus for the grinding method according to the invention for the raw meal consisting of limestone and clay, the raw meal components of which contain finely divided quartz crystals and can therefore be ground together in a plant according to claims 1 and 3.

The raw meal production plant consists of a roller mill 98, a bucket elevator 99, a mill feed 100, a pneumatic conveyor dryer 101 with static classifier 102, a dynamic classifier 103, an electrostatic filter 104 and a blower 105. The exhaust gases from a hot gas producer 111 are utilised for drying the raw meal.

In operation, the raw meal components 106 to be ground are fed with the air of the proportioning belt scale 107 to the roller mill 98 via the mill feed 100. The comminuted feed material reaches the rim of the grinding table, where it is borne upwards to the classifier by a gas stream coming out of the louvre air ring. The coarse material precipitated in the static classifier of the roller mill 98 falls centrally back onto the grinding table, whilst the fine material (the particles predominantly smaller than 200 µm) is delivered with the aid of the dust-containing hot gas to the subsequent static classifier 102. There the particles which are still coarse with grain sizes from 80–200 µm to 60–200 µm are precipitated out of the gas stream and used as intermediate grain size fraction 108 of the basic raw meal component for the raw meal production. The remaining proportion of the fine material with grain sizes smaller than 60–80 µm 107, which is produced from the acidic and basic raw meal components is precipitated in the electrostatic filter 104 and used according to the proposed method as the proportion of raw meal for the heat treatment. If insufficient gas is present, then the coarse material is not carried along and falls down through the louvre air ring whence it is conveyed by a bucket elevator 99 to a dynamic classifier 100. There the separation into the tailings 110 and the coarse finished product 109 takes place. The tailings 110 are fed to the roller mill 98 for further grinding. The coarse finished product 100 produced from the particles with grain sizes from 125–500 µm to 200–2000 µm of the basic raw meal component is likewise delivered to the raw meal according to the method used.

Figure 7:
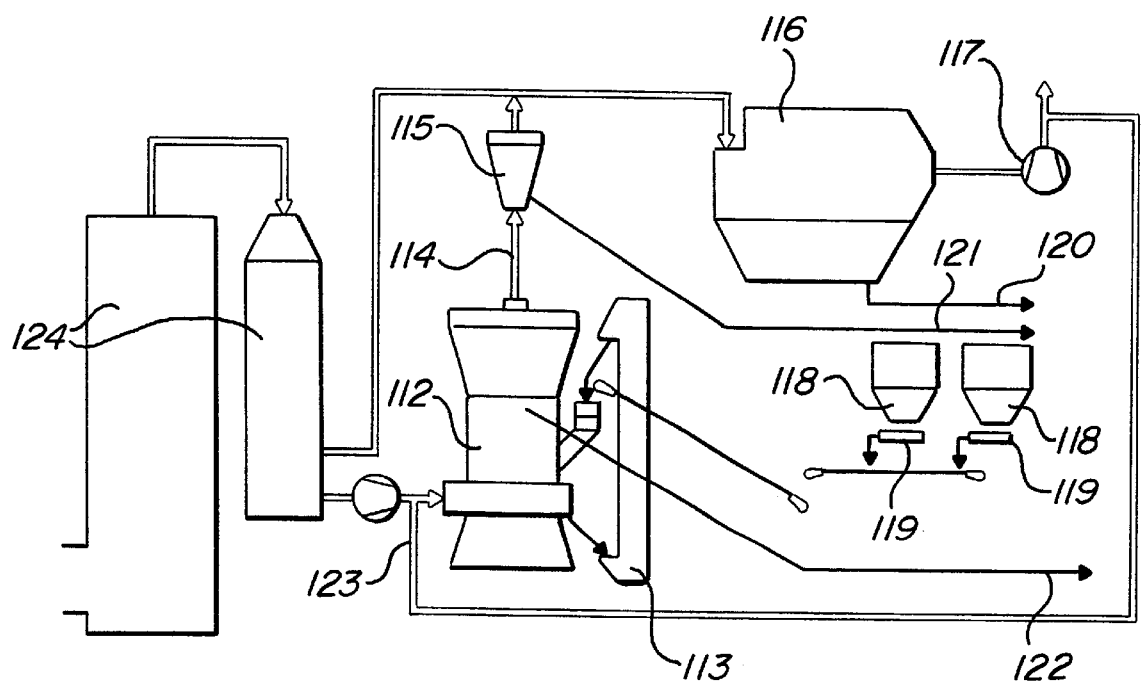
FIG. 7 shows a schematic representation of the guiding of the raw material and gas during the grinding of raw meal consisting of a limestone and a clay, the raw meal components of which contain finely divided quartz crystals.

FIG. 7 shows an embodiment of apparatus for the grinding method according to the invention for the raw meal consisting of limestone and clay, the raw meal components of which contain finely divided quartz crystals and can therefore be ground together in a plant according to claims 1 and 3.

The raw meal production plant consists of a roller mill 112, a bucket elevator 113, a pneumatic conveyor dryer 114 with static classifier 115, an electrostatic filter 116 and a blower 117. The exhaust gases from a hot gas producer 124 are utilised for drying the raw meal.

In operation, the raw meal components 118 to be ground are fed with the aid of the proportioning belt scale 119 to the roller mill 112. The comminuted feed material reaches the rim of the grinding table, where it is borne upwards to the classifier by a gas stream coming out of the louvre air ring. The coarse material precipitated in the static classifier of the roller mill 112 (the particles of limestone larger than 125–200 µm) 122 is led out of the roller mill and delivered to the raw meal as coarse fraction of the basic raw meal component. The fine material (particles predominantly smaller than 125–200 µm) is delivered with the aid of the dust-containing hot gas to the connected static classifier 115 by way of the pneumatic conveyor dryer 114. There the particle which are still coarse with grain sizes from 60–125 µm to 80–200 µm 121 are precipitated out of the gas stream and used as intermediate grain size fraction 121 of the basic raw meal component for the raw meal production. The remaining proportion of the fine material with grain sizes smaller than 60–80 µm, which is produced from the acidic and basic raw meal components is precipitated in the electrostatic filter 116 and used according to the proposed method as the proportion of raw meal for the heat treatment. If insufficient gas is present, then the coarse material with grain sizes greater than 60–2000 µm is not carried along and falls down through the louvre air ring hence it is conveyed by a bucket elevator 113 to the mill feed of the roller mill 112.

Figure 8A:
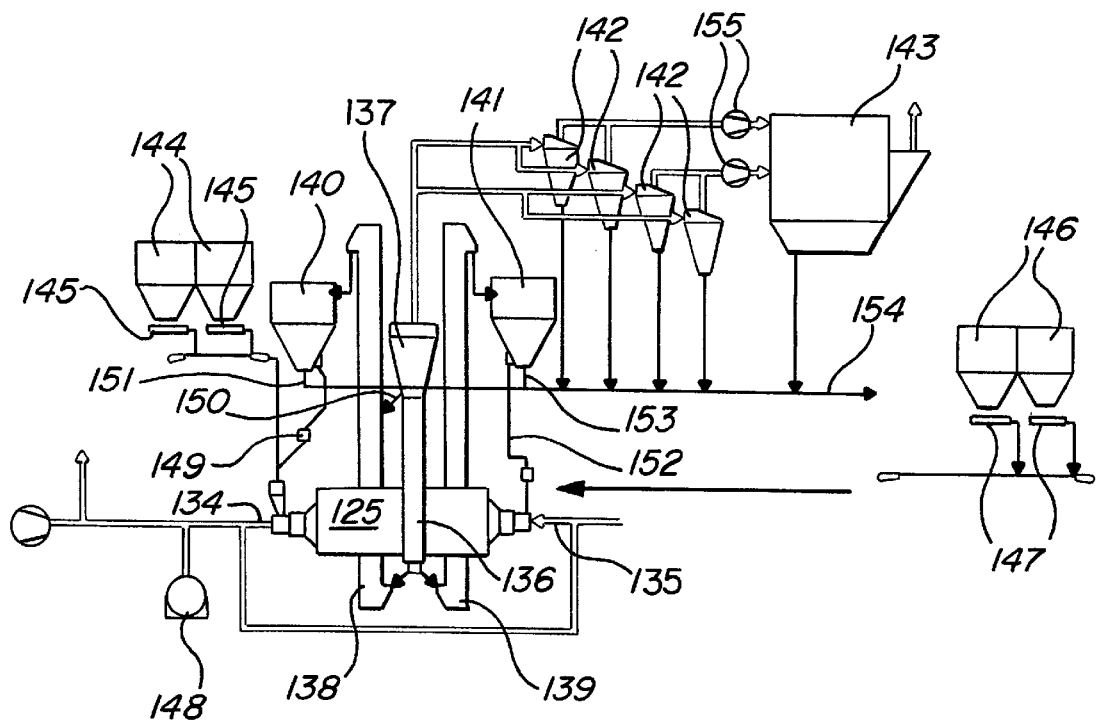
FIG. 8 shows a schematic representation of the guiding of the raw material and gas during the grinding of raw meal consisting of a limestone, a clay and a sand, in which the clay and sand contain quartz crystals greater than 60 μm and the limestone after grinding contains an enrichment in a certain grain class of quartz crystals coarser than 60 μm.
Figure 8B:
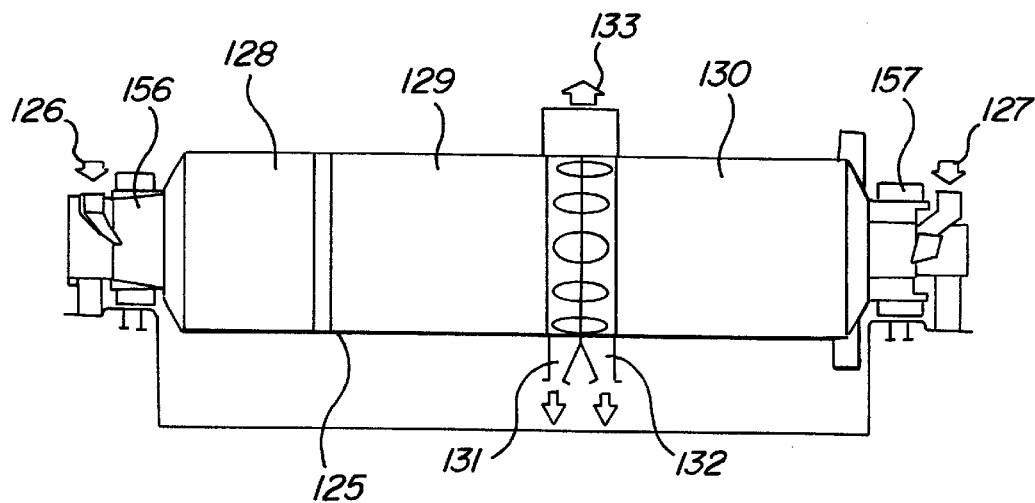

FIG. 8 shows an embodiment of apparatus for the grinding method according to the invention for the raw meal consisting of limestone, clay and sand, the acidic raw meal components of which contain the quartz crystals larger than 60–80 µm and must therefore be ground together in a plant according to claims 1 and 3.

The illustrated raw meal production plant (drying and grinding plant) consists of a double rotator drying and grinding mill 125, which includes feeding on both sides of the feed material 126, 127 or oversize material as well as the hot gases 134, 135, a pre-dryer 128, a fine-grinding and coarse-grinding chamber 129, 130, a partition 133, separate central discharges 131, 132 of both components, and feed spigots 156 and 157, and the plant also consists of a pneumatic conveyor dryer (discharge housing) 136, a static classifier 137, two bucket elevators with pneumatic trough conveyors 138, 139, two air classifiers 140, 141, cyclones 142, an electrostatic filter 143, proportioning belt scales 145, 147, a hot gas producer 148 and blowers 155.

In operation, the acidic raw meal components 144 and basic raw meal components 146 which are to be ground are appropriately fed on opposite sides to the double rotator drying and grinding mill 125 with the aid of the proportioning belt scales 145 and 147. In detail, the acidic raw meal components 144 which usually have a high moisture content are first of all introduced into the predrying chamber 128 together with the hot gas stream through the feed 126 and the feed spigot 156 of the double rotator drying and grinding mill 125. From the drying chamber 128 the acidic raw meal components 144 to be fine-ground proceed through a slotted screen provided with lifters into the fine-grinding chamber 129, from which they pass through the separate central discharge 131, via the pneumatic trough conveyor with the bucket elevator 138 and moreover parallel through the discharge housing 136 and the static classifier 137 into the air classifier 140. From here the fine proportion of the basic raw meal component with grain sizes below 125–200 µm also passes into the air classifier 140 from the coarse-grinding chamber 130, through the separate central discharge 132, via the discharge housing 136 and the static classifier 137. The oversize material 149 precipitated here in the air classifier 140 (the particles coarser than 60–80 µm) of the acidic raw meal components with a fine proportion of the basic raw meal component from the coarse-grinding chamber 130 is added to the argillaceous fresh material 144. The fine material precipitated here in the air classifier 140 (the particles smaller than 60–80 µm) 151 of the acidic raw meal components with a fine proportion of the basic raw meal component (approximately 5–60% is used as fine proportion of the finished product 154. In this case it should be noted that by the regrinding of the fine proportion of basic raw meal component with grain sizes smaller than 80–125 µm below 60–80 µm the intermediate grain size fraction with grain sizes of 60–125 µm is removed. This results according to claim 5 in an increase in the raw meal reactivity.

The basic raw meal component 146, which usually has a low moisture content, it introduced together with the hot gas stream or with the exhaust gases 135 from a suspension preheater through the feed 127 and the feed spigot 157 of the double rotator drying and grinding mill 125 into the coarse grinding chamber 130. The proportion of the coarse fraction of coarse-ground basic raw meal component with grain sizes from 80–500 µm to 125–2000 µm proceeds through the separate central discharge 132 via the pneumatic trough conveyor and the bucket elevator 139 into the air classifier 141. It should be noted that the separate central discharge 132 is divided from the separate central discharge 131 by the partition 133, so that mixing together of the acidic and basic raw meal components is precluded with the separate central discharges 131, 132. The mixing together of the acidic and basic raw meal components is only to be observed when they are discharged via the discharge housing 136 with an air stream into the static classifier 137.

The proportion of the fine fraction of coarse-ground basic raw meal component 146 with grain sizes smaller than 125–200 µm proceeds, partially through the separate central discharge 132 via the discharge housing 136 and the static classifier 137 into the air classifier 140, to which the fine-ground acidic raw meal components 144 also proceed in a similar manner. Explained another way, the exhaust gas from the mill leaves the mill 125 likewise through the central discharges 131, 132 and proceeds through the discharge housing 136 into the static classifier 137, where the coarse material contained in the gas with grain sizes from approximately 30–125 µm to 30–200 µm is precipitated and delivered to the bucket elevator 138 or then to the air classifier 140.

The residual fine finished product 154 from the acidic and basic raw meal components which is still present in the hot gas stream after the static classifier 137 is precipitated in the cyclones 142 and in the electrostatic filter 143. The finished product from the air classifiers 140 and 141, cyclones 142 and the electrostatic filter 143 is led off through a common pneumatic trough conveyor and used as raw meal according to the proposed method for the heat treatment.

Figure 9A:
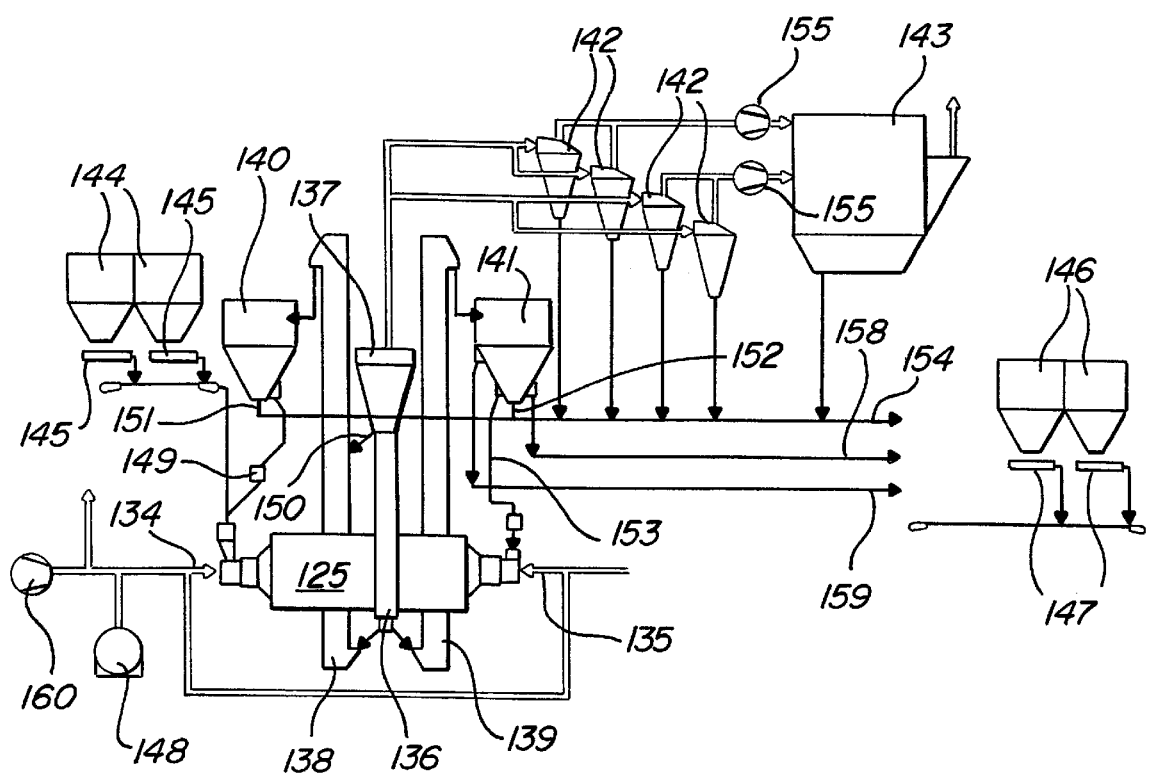
FIG. 9 shows a schematic representation of the guiding of the raw material and gas during the grinding of raw meal consisting of a limestone, a clay and a sand, in which the clay and sand contain quartz crystals greater than 60 μm and the limestone after grinding contains an enrichment in a certain grain class of quartz crystals coarser than 60 μm.
Figure 9B:
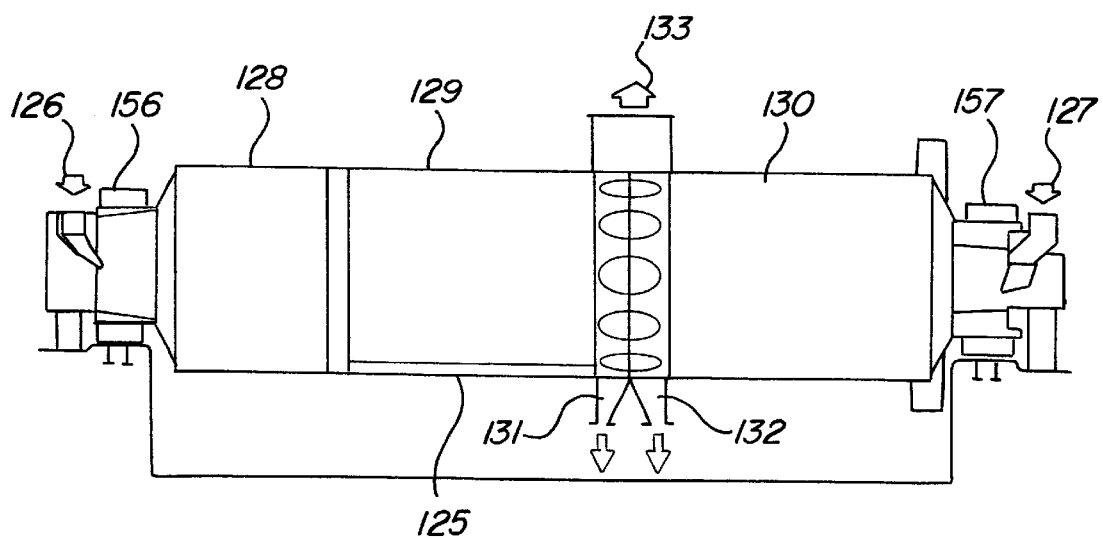

FIG. 9 shows an embodiment of apparatus for the grinding method according to the invention for the raw meal consisting of limestone, clay and sand, the acidic raw meal components of which contain the quartz grains larger than 80 $\mu$m and must therefore be ground separately according to claims 1 and 3.

The illustrated raw meal production plant (drying and grinding plant) consists of a double rotator drying and grinding mill 125, which includes feeding on both sides of the feed material 126, 127 or oversize material as well as the hot gases 134, 135, a pre-dryer 128, a fine-grinding and coarse-grinding chamber 129, 130, a partition 133, separate central discharges 131, 132 of the two acidic and basic components fed on opposite sides, and feed spigots 156 and 157, and the plant also consists of a pneumatic conveyor dryer (discharge housing) 136, a static classifier 137, two bucket elevators with pneumatic trough conveyors 138, 139, by contrast with FIG. 8 instead of two air classifiers one air classifier 140 and a multi-component classifier 141, cyclones 142, an electrostatic filter 143, proportioning belt scales 145, 147, a hot gas producer 148 and blowers 155.

In operation, the acidic raw meal components 144 and basic raw meal components 146 which are to be ground are appropriately fed to the double rotator drying and grinding mill 125 with the aid of the proportioning belt scales 145 and 147. In detail, the acidic raw meal components 144 which usually have a high moisture content are first of all introduced into the predrying chamber 128 together with the hot gas stream through the corresponding feeds 126, 134 and the feed spigot 156 of the double rotator drying and grinding mill 125. From the drying chamber 128 the acidic raw meal components 144 to be fine-ground proceed through a slotted screen provided with lifters into the fine-grinding chamber 129, from which they pass through the separate central discharge 131, via the pneumatic trough conveyor with the bucket elevator 138 and moreover parallel through the discharge housing 136 and the static classifier 137 into the air classifier 140. From here the fine proportion of the basic raw meal component with grain sizes below 125–200 $\mu$m also passes into the air classifier 140 from the coarse-grinding chamber 130, through the separate central discharge 132, via the discharge housing 136 and the static classifier 137.

The oversize material 149 precipitated here in the air classifier 140 (the particles coarser than 60–80 $\mu$m) of the acidic raw meal components with a fine proportion of the basic raw meal component from the coarse-grinding chamber 130 is added to the fresh material 144. The fine material precipitated here in the air classifier 140 (the particles smaller than 60–80 $\mu$m) 151 of the acidic raw meal components with a fine proportion of the basic raw meal component (approximately 5–60% is used as fine proportion of the finished product 154.

The basic raw meal component 146 which usually has a low moisture content is introduced together with the hot gas stream or with the exhaust gases 135 from a suspension preheater and the exhaust air from cooler through the corresponding feeds 127 and 135 and the feed spigot of the double rotator drying and grinding mill 125 into the coarse-grinding chamber 130. The proportion of the coarse fraction of coarse-ground basic raw meal component with grain sizes from 80–500 $\mu$m to 125–2000 $\mu$m proceeds through the separate central discharge 132, via the bucket elevator 139 into the multi-component classifier 141. It should be noted that the separate central discharge 132 is divided from the separate central discharge 131 by the partition 133.

In the multi-component classifier 141 the basic raw meal component produced predominantly from the grain sizes from approximately 80–500 $\mu$m to 80–2000 $\mu$m is divided into the following four grain size fractions:

Grain size fraction 152, which consists of the basic raw meal components with grain sizes <60–80 $\mu$m. This fine proportion of the basic raw meal component is delivered to the fine proportion from the fine-grinding chamber 129 in order to keep the ratio between basic and acidic raw meal components in the fine proportion of the raw meal high, i.e. the basicity of the fine proportion of the raw meal must be so high, that the formation of the CS and $C_3 S_2$ instead of the $C_2S$ in addition to the $C_3A$ and $C_4AF$ can be guaranteed.

Grain size fraction 158, which consists of the basic raw meal component with grain sizes from 60–125 $\mu$m to 80–200 $\mu$m, the so-called intermediate grain size fraction which can be reground below 32–70 $\mu$m by feeding into the fine-grinding chamber or can be delivered to the kiln in the region between the sintering and the transition zones.

Grain size fraction 159, which consists of the basic raw meal component with grain sizes from 125–500 $\mu$m to 200–2000 $\mu$m, is delivered directly to the raw meal or partially blown into the kiln in the region between the sintering and transition zones. It can be added to the grain size fraction 152, which consists of the basic raw meal component with grain sizes of >500–2000 $\mu$m.

The proportion of the fine fraction with grain sizes smaller than 125–200 $\mu$m of coarse-ground basic raw meal component 146 proceeds, as has already been explained above, partially through the separate central discharge 132 via the discharge housing 136 and the static classifier 137 into the air classifier 140, to which the fine-ground acidic raw meal components 144 also proceed in a similar manner. Explained another way, the exhaust gas from the mill leaves the mill 125 likewise through the central discharges 131, 132 and proceeds through the discharge housing 136 into the static classifier 137, where the coarse material contained in the gas with grain sizes from approximately 30–125 $\mu$m to 339–200 $\mu$m is precipitated and delivered to the bucket elevator 138 or then to the air classifier 140.

The fine finished product 154 from the acidic and basic raw meal components which is still present in the hot gas stream after the static classifier 137 is precipitated in the cyclones 142 and in the electrostatic filter 143 and depending upon the proposed method is used separately or also jointly as the proportion of raw meal for the heat treatment.

In this case it should be noted that by the regrinding of the fine proportion of the basic raw meal component with grain sizes smaller than 80 $\mu$m below 60–80 $\mu$m the intermediate grain size fraction with grain sizes of 60–80 $\mu$m is removed. This likewise results according to claim 5 in an increase in the raw meal reactivity.

Figure 10:
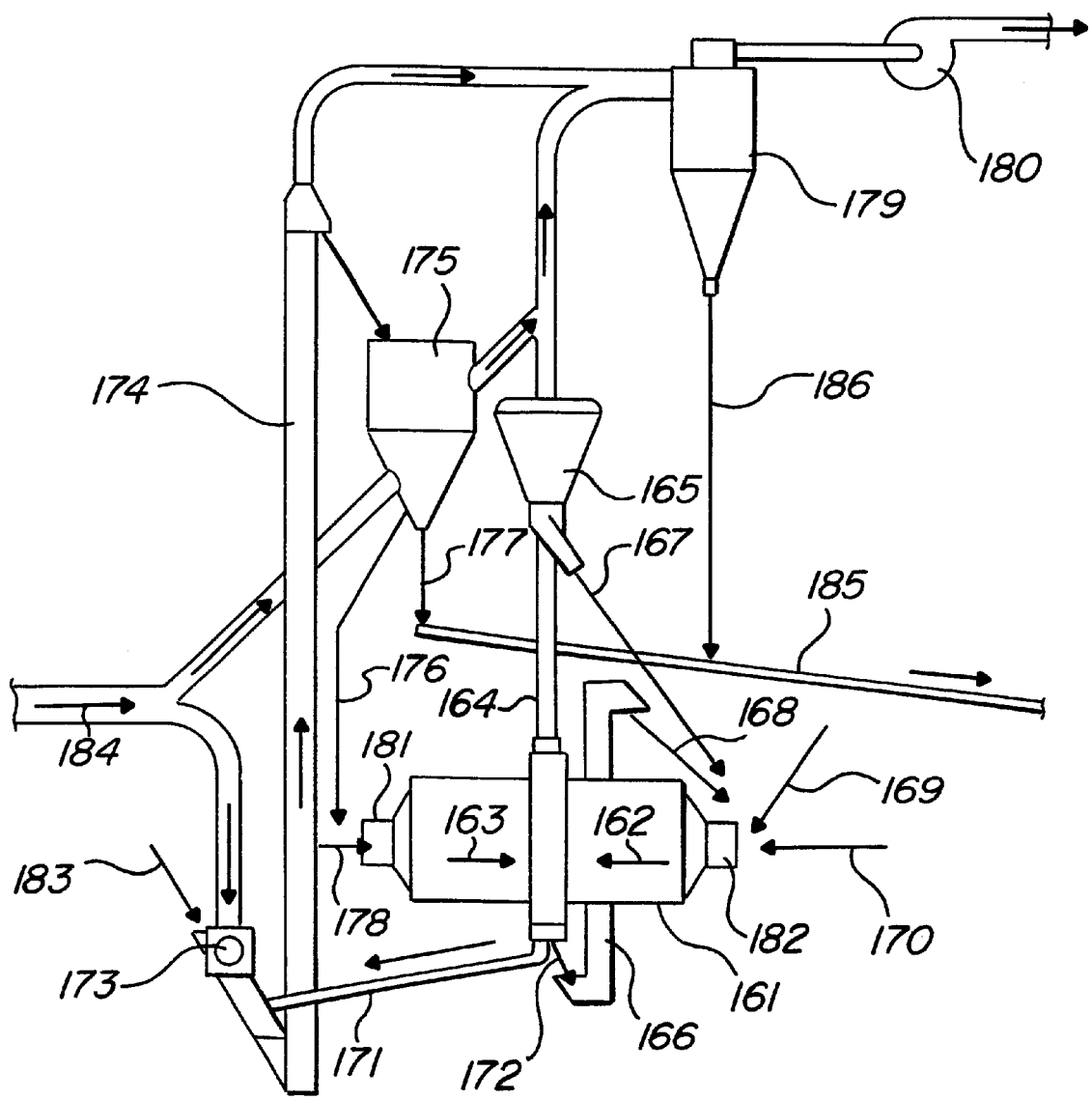
FIG. 10 shows a schematic representation of the guiding of the raw material and gas during the grinding of raw meal consisting of a limestone, a clay and a sand, in which the clay and sand contain quartz crystals greater than 60 μm and the limestone after grinding contains an enrichment in a certain grain class of quartz crystals coarser than 60 μm.

FIG. 10 shows an embodiment of apparatus for the grinding method according to the invention for the raw meal consisting of limestone, clay and sand, the acidic and basic raw meal components of which contain the quartz grains larger than 60–80 $\mu$m and must therefore be ground separately according to claims 1 and 3.

The illustrated raw meal production plant (drying and grinding plant) consists of a double rotator drying and grinding mill 161, which includes feeding on both sides of the feed material 169, 176 or oversize material as well as the hot gases 170, 178, a pre-dryer fine-grinding chamber 162, a coarse-grinding chamber 163, separate central discharges 171, 172 for both components, and feed spigots 181, 182, and the plant also consists of a discharge housing 164, a static classifier 165, two bucket elevators with pneumatic trough conveyors 166, 174, a rotary air separator 175, a cyclone 179, and a blower 180. The predrying chamber, which is located before the grinding chamber, is provided for the purpose of increasing the drying capacity of the mill.

The raw meal to be ground, the acidic raw meal components of which contain the quartz grains larger than 60–80 $\mu$m, is treated as follows in operation according to the proposed grinding method for the coarse grinding.

The basic raw meal component 183, which usually has a low moisture content, is delivered together with the hot gases or exhaust gases 184 from a suspension preheater to the impact crusher-dryer 173, where it is comminuted and predried. Then the mill feed material is first of all fed with the aid of the bucket elevator 174 to the rotary air separator 175, where it is separated and principally dried. While the feed material is being conveyed in the bucket elevator 174 it is also partially dried.

Coarse material from the air classifier (tailings, oversize material) 176 with grain sizes larger than 500–2000 $\mu$m is introduced together with the exhaust gases 178 fro a suspension preheater through the feed spigot 181 of the double rotator drying and grinding mill 161 into the coarse-grinding chamber 163 for grinding. The proportion of the coarse fraction of basic raw meal component coarse-ground in the coarse-grinding chamber 163 of the mill 161 with grain sizes coarser than 125–200 $\mu$m proceeds through the separate central discharge 171, via the bucket elevator 174 into the rotary air separator 175, where it is again separated. It should be noted that the separate central discharge 17 is divided from the separate central discharge 172, precisely as illustrated in FIGS. 8 and 9, by the partition 133.

Fine material 177 from the air classifier with grain sizes smaller than 500–2000 $\mu$m is used as a proportion of the finished product.

The proportion of the fine fraction of coarse-ground basic raw meal component 176 with a grain sizes smaller than 125–200 $\mu$m produced in the coarse-grinding chamber after the double rotator drying and grinding mill 161 proceeds through the separate central discharge 171 via the discharge housing 164 into the static classifier 165, to which the fine-ground acidic raw meal components 169 likewise proceed in a similar manner. Explained another way, the exhaust gas leaves the mill 161 also through the central discharges 171, 172 and proceeds through the discharge housing 164 into a static classifier 165, where the coarse material contained in the gas with grain sizes coarser than 60–80 $\mu$m is precipitated and delivered to the fine-grinding chamber 162 of the double-rotator drying and grinding mill 161.

The acidic raw meal components 169, which usually have a high moisture content, are introduced together with the hot gas stream through the feed spigot 182 of the double-rotator drying and grinding mill 161 in succession into the predrying and fine-grinding chamber 162. The coarse proportion of the feed material obtained in the fine-grinding chamber 162 with grain sizes greater than approximately 125–200 $\mu$m is introduced through the separate central discharge 172 via the pneumatic trough conveyor with bucket elevator 166 into the closed circuit grinding system. The fine proportion of the acidic mill feed obtained in the fine-grinding chamber with grains sizes smaller than 125–200 $\mu$m is introduced parallel through the discharge housing 164 into the static classifier 165. The fine proportion of the basic raw meal component with grain sizes below approximately 125–200 $\mu$also proceeds from the coarse-grinding chamber 163 through the separate central discharge 171 via the discharge housing 164 into the static classifier 165, as explained above.

The coarse material 167 (the particles coarser than 60–80 $\mu$m) of the acidic raw meal components precipitated here in the static classifier 165 with a fine proportion of the basic raw meal component from the coarse-grinding chamber 163 is fed to the fresh material 169. The fine material (the particles smaller than approximately 30 $\mu$m) of the acidic raw meal components contained in the hot gas stream after the static classifier 165 with a fine proportion of the basic raw meal component (approximately 5–60%) is precipitated in the cyclone 179 as a fine proportion 186 of the finished product 185.

The finished product 177, 186 from the rotary air separator 175 and cyclones 179 is led off through a common pneumatic trough conveyor and used as raw meal for heat treatment according to the proposed method.

Figure 11:
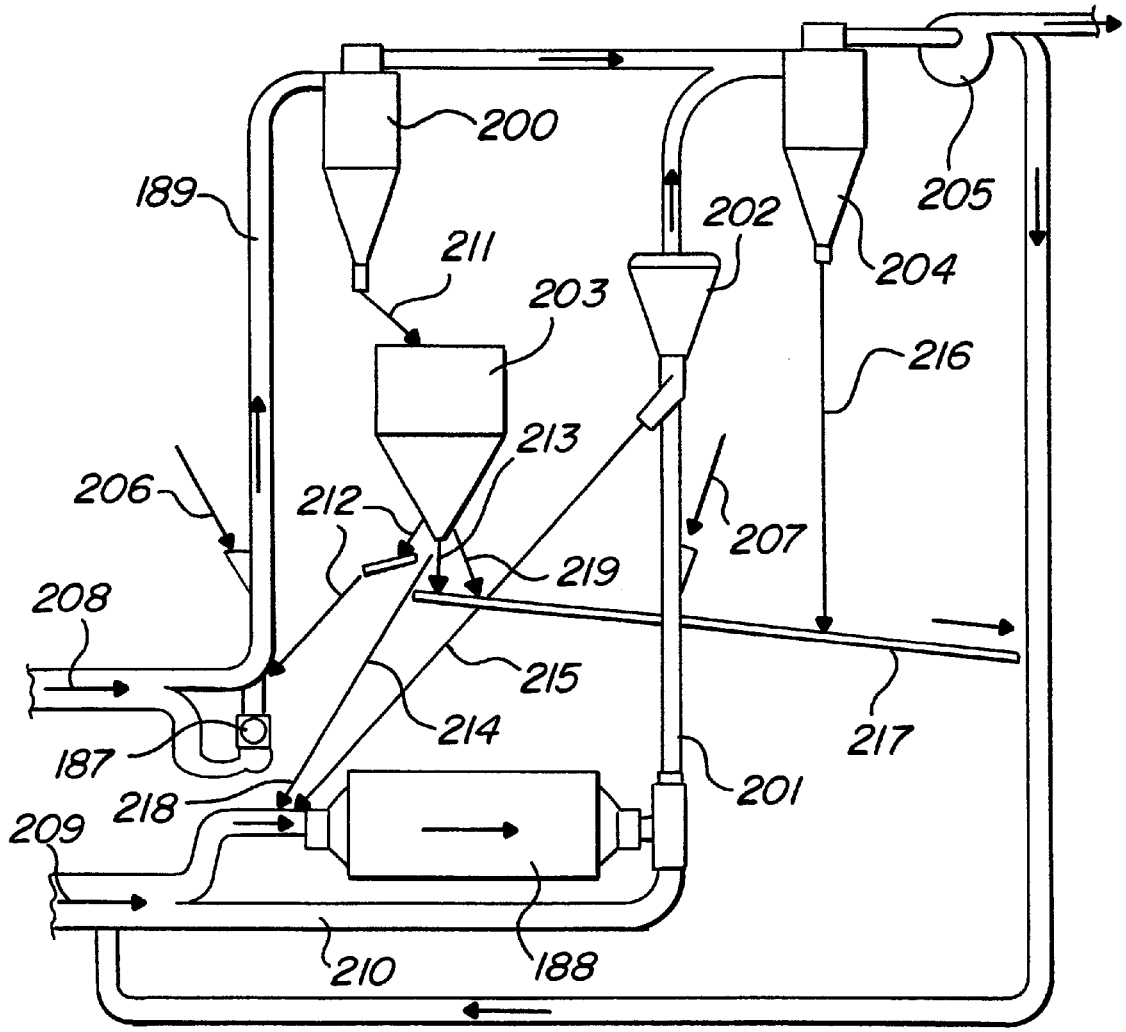
FIG. 11 shows a schematic representation of the guiding of the raw material and gas during the grinding of raw meal consisting of a limestone, a clay and a sand, in which the clay and sand contain quartz crystals greater than 60 μm and the limestone after grinding contains an enrichment in certain grain class of quartz crystals coarser than 60 μm.

FIG. 11 shows an embodiment of apparatus for the grinding method according to the invention for the raw meal consisting of limestone, clay and sand, the acidic and basic raw meal components of which contain the quartz grains larger than 60–80 $\mu$m and are therefore ground separately according to claims 1 and 3.

The raw meal production plant (drying and grinding plant) consists of an impact hammer mill (high-speed pulveriser) 187 operating in closed circuit and an air-swept mill 188 operating in closed circuit, a dryer pipe 189, a cyclone 200, a pneumatic conveyor dryer 201, a static classifier 202, a multi-component classifier 203, a cyclone 203, and a blower 205. The impact hammer mill 187 has a closed grinding base instead of a grate.

The basic raw meal component 206, which consists of components up to 100 mm lump size and usually has a low moisture content, is fed together with the hot gases or exhaust gases from the rotary kiln and/or with the exhaust air 208 from the cooler to the impact hammer mill 187, where the basic raw meal component is comminuted and predried. The discharge material from the impact hammer mill 187 is passed pneumatically through the dryer pipe 189 to the cyclone 200. Then the classification feed material 211 is fed to the multi-component classifier 203, where it is classified. Tailings 212 from the air classifier with grain sizes larger than 500–2000 $\mu$m are passed back to the impact hammer mill 187 for regrinding. Oversize material 213 from the air classifier with grain sizes from approximately 125–500 $\mu$m to 200–2000 $\mu$m serves predominantly as the proportion of the finished product 217 capable of melting reaction. The intermediate grain material 218 with grain sizes of approximately 50–125 $\mu$m, where the coarse quartz grains probably occur, is introduced for common grinding with acidic raw meal components 207. The fine material 219 with grain sizes smaller than approximately 50 $\mu$m is delivered to the finished product. In the contrary case, if the quartz in the limestone or lime marl is finely and regularly distributed, this fraction can be blown into the kiln.

Pneumatic drying and grinding circuit is to be used for the acidic raw meal components 207 with a high moisture content.

For this the acidic raw meal components are fed into a pre-dryer riser pipe 201 for the purpose of predrying, so that only predried material enters the mill. Only a small part of the hot gases is led into the mill for the purpose of redrying. A maximum grain size of the mill feed material of 15 mm is a prerequisite for effective grinding.

The drying and grinding mill 188 is heated during feeding of acidic raw meal components 207 with hot air 209 from a generator.

The acidic feed material with grain sizes coarser than approximately 60–80 μm is precipitated in the static classifier 202.

The coarse material 215 precipitated here in the static classifier with grain sizes coarser than approximately 60–80 μm of the jointly ground acidic raw meal components with an intermediate grain material 218 of the basic raw meal component (intermediate grain material 218 from the air classifier with grain sizes from approximately 50–125 μm to 80–200 μm) is delivered to the mill 188. The fine material (the particles smaller than 60–80 μm) of the acidic raw meal components contained in the hot gas stream after the static classifier 202 with a fine-ground proportion of the basic raw meal component (approximately 5–60) is precipitated in the cyclone 204 as fine proportion 216 of the finished product 217.

The finished product 213 from the multi-component classifier 203 and finished product 216 from the cyclone 204 is led off via a common pneumatic trough conveyor and used as raw meal for heat treatment according to the proposed method.

FIG. 4 shows an embodiment of apparatus for the method according to the invention in which a fluidised bed reactor or a swirling flow calcination chamber (convex chamber) with a hot gas producer is disposed instead of a preheating string.

The reason for this is as follows: The coarse particles (>200 or 500 μm) cannot be suspended under the usual conditions which prevail in the cyclones but they simply fall through the cyclones. As a result the coarse particles are not heated to the necessary temperature. Corresponding alterations in the technical parameters of the heat exchanger and calciner, when a heat exchanger and calciner are used, lead to an increase in the energy consumption due to an increase in the pressure loss. Therefore it is sensible from the economic point of view to install a fluidised bed reactor or a swirling flow calcination chamber (convex chamber) with a hot gas producer.

The illustrated cement production plant includes a feed arrangement 220 for acidic raw meal components, which may contain up to approximately 5–20% of the basic raw meal component, and another feed arrangement 221 only for basic raw meal components, two high-speed pulverisers 222 and 223, two pneumatic conveyor dryers 224 and 225 with the built-in static classifiers 226 and 227, a multi-component classifier 228, a down pipe 229 for the grain size fraction from 125–500 μm to 200–2000 μm, a down pipe 230 for the grain size fraction from 40–125 μm to 80–200, a down pipe 231 for the grain size fraction from 0–40 μm to 0–80 μm, two sickle-type dampers (throttle devices) 232 and 233, two double-cyclone dust extractors 234 and 235, two double down pipes 236 and 2337, a separate preheating string 238 supplied with the exhaust gases from the calciner 243, a cyclone 239, two exhaust gas pipes 240 and 241, a fluidised bed reactor or a swirling flow calcination chamber (convex chamber) with a hot gas producer 242, a feed arrangement 244 for the fuel for the calciner 243, a feed arrangement 245 for the fuel for the fluidised bed reactor or a swirling flow calcination chamber (convex chamber) with a hot gas producer 242, a hot air pipe 246 which is divided into two hot air pipes 247 for the calciner and a hot air pipe 248 for the fluidised bed reactor or a swirling flow calcination chamber (convex chamber) with a hot gas producer, a rotary kiln 249m, a cooler 250 and in addition to the existing fuel feed arrangement 251 already disposed on the rotary kiln an additional feed arrangement 252 for a proportion of the raw meal (the intermediate or coarse grain size fraction of the limestone or fine grain size fraction of the raw meal). The preheating string 238 consists of individual cyclones which are connected to one another by gas pipes. The rotary kiln 249 is connected on the gas side to the preheating string 238 via a gas riser of the calciner 243. On the discharge side the cyclones of the preheating string 238 are connected via down pipes 253 to the calciner 243 and then via down pipes 255 to the kiln. By contrast, the fluidised bed reactor or a swirling flow calcination chamber (convex chamber) with a hot gas producer has no connection on the gas side to the kiln 249. On the discharge side the fluidised bed reactor or a swirling flow calcination chamber (convex chamber) is connected directly to a hot gas producer 242 via the down pipe 254 or is connected indirectly to a hot gas producer 242 via the down pipe 257 between the calciner 243 and the fluidised bed reactor or a swirling flow calcination chamber (convex chamber). On the gas side the fluidised bed reactor or a swirling flow calcination chamber (convex chamber) with a hot gas producer 242 is connected to the hammer mill 223 via the exhaust gas pipe 241 and cyclone 239. On the discharge side the cyclone 239 is connected to the calciner 243 via the down pipe 256.

In operation the raw material is used as follows for the production of clinker:

The basic raw meal component which is dried separately and coarse-ground after the high-speed pulveriser 223 and the pneumatic conveyor dryer 225 is precipitated in the double-cyclone dust extractor 235, from there is discharged via the double down pipe 237 and introduced into the multi-component classifier 228. The multi-component classifier 228 divides the coarse-ground raw meal component (e.g. limestone or chalk) into three grain size fractions: 0–40 to 0–80 μm, 40–125 to 80–200 μm and 125–500 to 200–2000 μm. The grain size fraction from 0–40 to 0–80 μm is discharged via the down pipe 231 and introduced together with acidic raw meal components discharged via the double down pipe 236 of the double-cyclone dust extractor 234 into the gas pipe 240 which connects the uppermost cyclone 238 via the high-speed pulveriser 222 and the pneumatic conveyor dryer 224 with the built-in static classifiers 226 to the double-cyclone 334.

The grain size fraction from 0–40 μm to 0–80 μm of the basic raw meal component together with the acidic raw meal components is taken up and preheated by the hot gases from the central cyclone of the preheating string 238 and is precipitated and mixed in the uppermost cyclone of the preheating string 238, from there it is appropriately discharged via down pipes, introduced in the gas pipe connected at the bottom, i.e. the process is repeated, as is known, as far as the lowest cyclone and calciner 243. Within these processes the mixture of the acidic raw meal components and the fine proportion of the basic raw meal component, in a quantity which is only delivered for the formation of $C_3A$, $C_4FA$, CS and/or $C_3S_2$, is heated and finally deacidified.

The intermediate fraction with grain sizes from 40–125 μm to 80–200 μm is discharged via the down pipe 230 and introduced directly through the flame of the kiln 249 behind the sintering zone into the temperature range of 1250–1400° C. in order to incorporate it into the clinker. Thus the unwanted formation of the $C_2S$ before the sintering zone is prevented and the proportion of clinker melt is increased.

The grain size fraction from 125–500 μm to 200–2000 μm is discharged via the down pipe 229 and introduced into the fluidised bed reactor or a swirling flow calcination chamber (convex chamber) with a hot gas producer 242. Within this process the coarsest proportion of the raw meal component is heated and deacidified.

The acidic raw meal components which are dried and fine-ground together after the high-speed pulveriser 222 and the pneumatic conveyor dryer 224 possibly with a part of the basic raw meal component of 5–15% are precipitated in the double-cyclone dust extractor 234, discharged from there via the double down pipe 236 and introduced into the gas pipe 240. From there, as has already been explained, the mixture to be roasted is heated as far as the lowest cyclone and calciner and finally deacidified. Then the material to be roasted is introduced into the rotary kiln 245 for sintering.

Thus in the fluidised bed reactor or a swirling flow calcination chamber (convex chamber) with a hot gas producer coarse-grained limestone with grain sizes from 125–500 to 200–2000 μm, which can only be converted into clinker through the melt in the sintering zone, is heated treated in the fluidised bed reactor or a swirling flow calcination chamber (convex chamber) with a hot gas producer, and a fine-grained mixture of the acidic components with limestone in a ratio which brings about the increase in the clinker melt is heat treated in the preheating string.

Since the grain size of the heat treated proportions of the raw meal and the arrangements for calcination differ greatly, it is necessary, in order to create optimum conditions for heat treatment in the preheating string and in the tailings kiln or fluidised bed reactor or a swirling flow calcination chamber (convex chamber) with a hot gas producer, i.e. to ensure a necessary (sufficient) underpressure, to arrange two sickle-type dampers (throttle devices) 232 and 233 in the exhaust gas pipes of the preheater and of the tailings kiln or fluidised bed reactor or a swirling flow calcination chamber (convex chamber) with a hot gas producer.

The invention is not limited only to the described embodiments. Thus for example instead of the multi-component classifier 228 a conventional classifier can be used which divides the limestone into two grain size fractions of 0–80 μm and 80–2000 μm. This means that the intermediate grain size fraction from 40–125 μm to 80–200 μm, which should be discharged via the down pipes 230 and introduced directly into the kiln 249, is excluded in this case. Therefore, the 0–80 μm fraction of the basic raw meal component together with acidic raw meal components is heat treated in the preheating string consisting of the cyclones, and the 80–2000 μm fraction is separately heat treated in the preheating string as which the fluidised bed reactor or a swirling flow calcination chamber (convex chamber) with a hot gas producer serves. In order to increase the reactivity of the raw meal in this case, a part of the coarse fractional proportion of basic raw meal components (80–2000 μm) or the mixture consisting of the acidic raw meal components ground below 80 μm with limestone separately is blown in directly from the classifier 228 or from any cyclones of the strong 34 through the flame of the kiln 249 behind the sintering zone into the temperature range from 1250–1350° C. In this case the proportion of clinker melt is increased, since with the introduction of the said raw meal component passing over the transition zone directly into the sintering zone the formation of the belite before the sintering zone is reduced.

FIG. 13 shows an embodiment of apparatus for the method according to the invention. The cement production plant contains two separate preheating strings, one preheating string 259 being supplied with the exhaust gases from the fluidised bed reactor or a swirling flow calcination chamber (convex chamber) with a hot gas producer 261 and the other preheating string 258 being supplied with the exhaust gases from the calciner 260. In each case the preheating strings consist of individual cyclones which are connected to one another by gas pipes. This cement production plant is particularly suitable for large throughputs of more than 3000 tonnes per day.

The calciner 260 consists of a gas riser 275 which contains tubular turbulence inserts and is connected to a precipitator 262; the reaction chamber 263 is constructed as a reactor tube and merges directly into the calciner; the fluidised bed reactor or a swirling flow calcination chamber (convex chamber) with a hot gas producer 261 is provided with a burner 265 and a hot air supply pipe 266; the sintering arrangement 267 is constructed as a rotary kiln and the cooling arrangement 268 is constructed as a grate cooler. In order to accelerate the quartz conversion the MgO-containing additives and/or F- and Cl-containing substances which are necessary for the optimum MgO:alkali ratio are introduced as catalysts into the reaction chamber 263 with the aid of the feed arrangement 276 or introduced together with the fine-ground proportion of the raw meal into the gas pipe of the preheating string 258. At approximately the same height as the feed arrangement 276 a coarse-comminuted fuel is introduced as reducing agent with the aid of the feed arrangement 269.

In order to eliminate excess gaseous proportions of pollutants, such as volatile alkali, sulphur or chlorine compounds, a part of the hot kiln gases is removed from the system via the bypass pipe 271.

Above the throttle point 272 in the tube reactor hot exhaust air from the cooler air is introduced by means of the hot air pipe 270 for combustion of the burnable reducing agent used (introduced) in excess.

By the delivery of fuel and oxygen into the fluidised bed reactor or a swirling flow calcination chamber (convex chamber) with a hot gas producer 261, the preheated coarse-grained basic raw meal component is calcined in the resulting pollutant-free hot gases, which moreover still have a low $CO_2$ partial pressure relative to the kiln exhaust gases, and finally is introduced into the rotary kiln for sintering. The intermediate grain size fraction from 60–125 μm to 80–200 μm of the basic raw meal component is introduced from the lowest cyclone of the preheater 259 on opposite sides into the kiln 267 with the aid of the feed arrangement 277.

The coarse-grained proportion of basic raw meal component with grain sizes from 60–500 μm to 80–2000 μm which is introduced into the preheating string 259 is classified as follows into two grains sizes, i.e. the intermediate grain class with grain sizes from 60–125 μm to 80–200 μm and the coarse grain class with grain sizes from 125–500 μm to 200–2000 μm. The coarse-ground basic raw meal component with grain sizes from 60–500 to 80–2000 μm is introduced into the gas pipe which connects the double cyclone to the central cyclone of the preheating string 259. The grain class proportion with grain sizes from 60–200 to 80–200 μm is taken up by the hot gases from the central cyclone of the preheating string 259, heated and precipitated in the double cyclone, from there is discharged via down pipes to the double cyclone, introduced into the gas pipe which connects the central cyclone to the lowest cyclone of the preheating string 259, heated there, precipitated in the central cyclone, from there is discharged via the down pipe of the central cyclone, introduced into the gas pipe which connects the lowest cyclone to the fluidised bed reactor or a swirling flow calcination chamber (convex chamber) with a hot gas producer, there it is again further heated, precipitated in the lowest cyclone of the preheater 259, from there is discharged via the down pipe 277 and fed into the kiln 267 with the aid of the feed arrangement 278. The intermediate grain class in a grain size range from 60–125 $\mu$m to 80–200 $\mu$m is discharged by a gas stream, the speed of which is to be adjusted to the desired ultimate grain size.

As the coarse grain class with grain sizes from 125–500 to 200–2000 $\mu$m is being fed in it is already falling under the effect of gravity into the gas pipe which connects the double cyclone to the central cyclone of the preheating string 259, via the central cyclone, the down pipe and the gas pipe 280 which connects the fluidised bed reactor or a swirling flow calcination chamber (convex chamber) with a hot gas producer to the lowest cyclone and proceeds into the fluidised bed reactor or a swirling flow calcination chamber (convex chamber) with a hot gas producer 261.

The preheated materials are calcined by delivery of kiln exhaust gases and fuel with oxygen into the reaction chamber 263 and gas riser 275 and the quartz grains contained in the raw meal are superficially partially amorphised under the effect of the reducing atmosphere produced during the incomplete combustion of the introduced reducing agent and of gaseous alkali, sulphur and chlorine compounds contained in kiln exhaust gases, and finally they are led from the precipitator 262 into the rotary kiln 267 for sintering. For better distribution of the hot air to the reaction chamber 263 and to the fluidised bed reactor or a swirling flow calcination chamber (convex chamber) with a hot gas producer 261, shut-off devices 273 are disposed in the hot gas pipe 266, 270.

In order also to be able to operate the plant with the fluidised bed reactor completely out of operation or with the swirling flow calcination chamber (convex chamber) with a hot gas producer 261 completely out of operation, the shut-off devices 273 can be used in the hot gas pipe 266 so that if appropriate the cement plant can be operated only at half the provided throughput, but nevertheless the catalysts can be fed into the quartz amorphisation and gaseous pollutant fractions in the kiln exhaust gases can be eliminated before the hot kiln gases are used for preliminary heat treatment of the cement raw materials fed into the plant. In this case it should be noted that all raw meal components must either be fed in completely together into the cyclone preheater disposed on the calciner, or only without the intermediate fraction of the basic raw meal component in the grain size range from 60–125 $\mu$m to 80–200 $\mu$m, which can be separated off with the aid of the classifier and fed to the kiln.

The invention is not limited only to the described embodiments. Instead of or in addition to reducing agents already recommended, the coarse-grained carbonaceous industrial waste as well as oil shale, clinker from the Weiz process, ash and slag waste can be used as catalysts for the quartz conversion. It is possible to use not only three-stage but also two-stage preheaters disposed on the fluidised bed reactor or a swirling flow calcination chamber (convex chamber) with a hot gas producer.

The invention is not limited only to the described embodiments. Thus for example both the single-string and the double-string cyclone preheater can be used with the separately functioning calciners. In this case one string of the double-string preheating and calcining arrangement is to be replaced not only by the fluidised bed reactor or a swirling flow calcination chamber (convex chamber) with a hot gas producer but also by other preheating and calcining devices which are suitable in any way for coarse-ground proportions of the raw meal. Thus using the method according to the invention it is possible to use not only limestone or lime marl, as follows from the present embodiments, but also marl and industrial waste materials which with regard to their chemical composition are similar to the chemical composition of the cement clinker.

What is claimed is:

1. A method of producing cement clinker from basic and acidic raw material components including:
   a. grinding and drying said raw material components,
   b. mixing the raw material components,
   c. preheating, calcining, and sintering said raw material components in stages to produce cement clinker, and
   d. cooling said cement clinker,
the improvement comprising:
   e. grinding the basic raw material components to form a fine grain fraction having a grain size of 0.01 to 80 $\mu$m and a coarse grain fraction having a grain size of 80.01 to 2000 $\mu$m with a grain size ratio of the fine grain fraction to the coarse grain fraction of 1.5:1 to 1:9; and
   f. heat treating the acidic raw material components having a grain size below 80 $\mu$m in a mixture with the fine grain fraction of said basic raw material components, wherein the proportion of the raw material components fine grain fraction relative to said acidic raw material components is in a range which in the sintering stage is sufficient only for the formation of CS and/or $C_3S_2$ and $C_2AS$, $C_3A$, $C_{12}A_7$ and $C_4FA$.

2. A method as claimed in claim 1, wherein the basic raw material coarse grain fraction has a grain size range of 80.01 to 500 $\mu$m.

3. A method as claimed in claim 1 including grinding the acidic raw material components and/or secondary substances with a module (M): M–CaO+MgO+FeO+0.31 $Fe_3O_4$/(0.93–1.4) $SiO_2$+0.94 $Al_2O_3$+0.7 $Fe_2O_3$+0.7×0.69× $Fe_3O_4$ of 0.25 to 1.2 for a melting temperature of a maximum of 1300° C. ground up with the basic raw material components.

4. A method as claimed in claim 3 wherein the heat treatment of the raw material component takes place in a temperature range from 850° C. to 1250° C. under reduced gas atmosphere.

5. A method as claimed in claim 1 wherein the proportion of basic raw material components fine grain fraction is ground with the acidic raw material components below 80 $\mu$m to a grain size of 0.01 to 32 $\mu$m to 0.01 to 70 $\mu$m, the proportion of basic raw material components coarse grain fraction above 80 $\mu$m is ground to a grain size of 90 to 2000 $\mu$m to 200 to 2000 $\mu$m, and an intermediate grain size fraction of from 70 to 90 $\mu$m to 32 to 200 $\mu$m of the basic material components is at least partly removed.

6. A method as claimed in claim 1 wherein basic raw material components enriched with quartz crystal grains greater than 40 $\mu$m is separated off and then fine-ground to a grain size below 40 to 80 $\mu$m with the acidic raw meal components and with the proportion of the basic raw material components.

7. A method as claimed in any one of claims 1–6 wherein a grain size class ratio of the 0.01 to 80 $\mu$m grain class to the 80.01 to 2000 $\mu$m grain class of basic raw material components 1.5:1 to 1:9 with regard to the acidic raw material components ground below 80 µm, the proportion of basic raw material components for the coarse grain fraction is ground separately of the proportion of the fine grain fraction of the basic raw material components, and the proportion of the fine grain fraction is ground with the acidic raw material components having a grain size below 80 µm and delivered to the sintering stage in a corresponding ratio based on an optimum LS II.

8. A method as claimed in any one of claims 1–6 wherein with regard to the acidic raw material components ground to a grain size below 80 µm, taking account of the effect of the circulation of alkali on the actual content of alkalis in the hot meal when it is fed into the sintering stage and with the content of the MgO capable of solid state reaction in the hot meal, the ratio of the MgO content to the total alkali content in the feeding of the MgO or alkali correcting additions is in a range from 2:1 to 5:1.

9. A method as claimed in any one of claims 1–6 wherein the coarse grain fraction of the basic raw material components having grain sizes of 80 to 500 µm to 80 to 2000 µm is introduced in corresponding quantities to the sintering stage at a temperature range of 1250 to 1350° C.

10. A method as claimed in claim 1 wherein an intermediate fraction of the basic raw material components having grain sizes of 60 to 125 µm to 80 to 200 µm is introduced in a selected quantity into the sintering stage having a temperature range of 1250 to 1400° C.

11. A method as claimed in claim 10 wherein the fine grain fraction of the basic raw material components below 60 to 80 µm together with the acidic raw material components below 60 to 80 µm, is introduced separately from the coarse grain fraction of the basic raw material components above 80 µm, through the sintering stage at a temperature range of 1100 to 1400° C.

* * * * *

UNITED STATES PATENT AND TRADEMARK OFFICE
CERTIFICATE OF CORRECTION

PATENT NO. : 6,264,738 B1
DATED : July 24, 2001
INVENTOR(S) : Paul Lorke and Alexander Lorke It is certified that error appears in the above-identified patent and that said Letters Patent is hereby corrected as shown below:

Column 3,
Line 39, change "linker" to -- clinker --.

Column 4,
Line 34, change "ration" to -- ratio --.

Column 6,
Line 21, change "as" (second occurrence) to -- a --.

Column 8,
Table 2, under the heading Ratio of the <80 $\mu$m to the >80 $\mu$m of the limestone (residue on the 80 $\mu$m sieve of the raw meal [%]), Raw meal 6, change "1:2 (45,7) " to -- 1:2 (48,7) --.

Column 9,
Table 3, change the heading "Pyrite cinder residue 1" to -- Pyrite cinder residue 2 --;
Line 65, after "invention" cancel -- that --.

Column 12,
Table 4, under the heading Chemical components, line 7, change "$P_2O_3$" to -- $P_2O_5$ --;
Line 57, cancel "of".

Column 14,
Line 14, change "in" to -- In --;
Line 18, cancel "described earlier";
Table 5, change "Results of investigations of the raw meal on the basis of the raw materials[1]" to -- Results of investigations of the raw meal on the basis of the raw materials 1 --; change "Raw meal according to Claim 1" to -- Raw meal according to the first embodiment --;
Table 6, change "Raw meal according to Claim 1" to -- Raw meal according to the first embodiment --.

Column 15,
Table 7, change "Raw meal according to Claim 1" to -- Raw meal according to the first embodiment --.

UNITED STATES PATENT AND TRADEMARK OFFICE
CERTIFICATE OF CORRECTION

PATENT NO.    : 6,264,738 B1
DATED         : July 24, 2001
INVENTOR(S)   : Paul Lorke and Alexander Lorke It is certified that error appears in the above-identified patent and that said Letters Patent is hereby corrected as shown below:

Column 21,
Line 1, cancel "Further"; same line, change "embodiments" to -- Embodiments --; same line, after "invention", insert -- set out according to a fourth embodiment --;
Line 4, after "3" insert -- of the second embodiment --;
Line 8, change "example according to Claim 3" to -- third embodiment --;
Line 9, change "residues" to -- resides --.

Column 22,
Table 12, change "Raw meal according to Claim 2" to -- Raw meal according to the second embodiment --; change "Raw meal according to Claim 4" to -- Raw meal according to the Fourth embodiment --; under the heading TM, change "6.69" to -- 6.59 --;
Table 13, change "Raw meal according to Claim 2" to -- Raw meal according to the second embodiment --; change "Raw meal according to Claim 4" to -- Raw meal according to the fourth embodiment --.

Column 23,
Line 7, change "described earlier" to -- according to the first embodiment --;
Line 15, cancel "a"; after "meal" insert -- according to the --;
Bridging lines 15 and 16, cancel "example described earlier";
Line 21, change "Such earlier described" to -- according to the second embodiment --.
Line 51, change "measurement" to -- measure --.

Column 24,
Line 55, after "1" insert -- according to --

Column 26,
Table 15, under the Heading, Grain Size fraction of the limestone $<80\,\mu m > 80\,\mu m$, change "0,01-72 2000-2000" to -- 0,01-72 200-2000 --.

Column 27,
Table 15, change "Raw meal according to Claim 1" to -- Raw meal according to the first embodiment --.

Column 28,
Table 16, under the Heading, Pyrite cinder, change "0.65" to -- 0.64 --.

UNITED STATES PATENT AND TRADEMARK OFFICE
CERTIFICATE OF CORRECTION

PATENT NO.    : 6,264,738 B1
DATED         : July 24, 2001
INVENTOR(S)   : Paul Lorke and Alexander Lorke It is certified that error appears in the above-identified patent and that said Letters Patent is hereby corrected as shown below:

Column 30,
Table 18, change "The quartz-enriched range from 63-200 $\mu$m is nor reground" to -- The quartz-enriched range from 63-200 $\mu$m is not reground --.

Column 32,
Line 3, change "embodimet" to -- embodiment --;
Table 19, line 33, change "wihtout" to -- without --.

Column 33,
Table 20, Change Heading "Grain range" to -- Grain size range --; change heading "Pyrite cinder residue > 80 $\mu$m" to -- Pyrite cinder residue < 80 $\mu$m --; under the heading Raw meal, change "$MgSiF_4$" to -- $MgSiF_6$ -- ; same column, change "$MgSiF_4$" to -- $MgSiF_6$ --; under the header SM, change "1,2" to -- 2,2 --; under the header Grain size range of the Limestone [%], change "9,01-250" to -- 0,01-250 --; under the heading Free lime content at 1450°C. [%], change "0,23" to -- 0,28 --.

Column 35,
Line 22, change "resistance" to -- resistant --

Column 36,
Table 21, under the header Additives, change "$Kg_2O$" to --- $K_2O$ --;
Table 22, change the header "Pyrite cinder residue >80$\mu$m" to -- Pyrite cinder residue <80$\mu$m --.

Column 38,
Line 26, after "to" insert -- the --;
Line 39, after "to" insert -- the --.

Column 40,
Line 58, change "invention" to -- data --.

Columns 41 and 42,
Table 25, change "For comparison an example according to Claim 7 of the raw meal 4." to -- For comparison an example according to the sixth embodiment of the raw meal 4 --; change "For comparison an example according to Claim 7 of the raw meal 7" to -- For comparison an example according to the sixth embodiment of the raw meal 7 --.

UNITED STATES PATENT AND TRADEMARK OFFICE
CERTIFICATE OF CORRECTION

PATENT NO.   : 6,264,738 B1
DATED        : July 24, 2001
INVENTOR(S)  : Paul Lorke and Alexander Lorke It is certified that error appears in the above-identified patent and that said Letters Patent is hereby corrected as shown below:

Column 55,
Table 28, under the header Sieve residue [%] 2 chamber 9, change "337,4" to -- 37,4 --;
Line 67, change "grinding" to -- grading --.

Column 59,
Line 43, cancel "an embodiment for".

Column 60,
Line 31, cancel "an embodiment for".

Column 61,
Line 19, change "further" to -- fourteenth --;
Line 20, cancel "according to claim 21";
Line 59, after "which" cancel "an"; same line, after "includes" insert -- an --.

Column 62,
Line 26, change "FIG." to -- FIGS. --;
Line 43, cancel "an embodiment for";
Line 44, after "In" insert -- a --; same line, after "seventeenth" insert -- embodiment --;
Line 56, change "an" to -- a --; same line, after "ninteenth" insert -- and --.

Column 63,
Line 6, after "In" insert -- a --.

Column 64,
Line 18, after "to" insert -- a --; same line, after "twenty-fifth" cancel "a".

Column 65,
Line 46, change "twenty-eight" to -- twenty-eighth --.

Column 66,
Line 54, cancel "also".

UNITED STATES PATENT AND TRADEMARK OFFICE
CERTIFICATE OF CORRECTION

PATENT NO. : 6,264,738 B1
DATED : July 24, 2001
INVENTOR(S) : Paul Lorke and Alexander Lorke It is certified that error appears in the above-identified patent and that said Letters Patent is hereby corrected as shown below:

Column 67,
Line 43, cancel "also";
Line 44, cancel "an";
Bridging lines 44 and 45, change "arrangement" to -- arrangements --.

Column 68,
Line 47, cancel "also".

Column 69,
Line 36, change "one" to -- on --.

Column 76,
Line 14, cancel "claims 1, 2, 3 and 4";
Line 17, change "claim 5" to -- one embodiment --;
Line 19, change "mall" to -- mill --;
Line 39, cancel "according to claim 5".

Column 77,
Line 14, cancel "according to claim 5";
Bridging lines 47 and 48, cancel "according to claim 5".

Column 78,
Line 4, cancel "in a plant according to claims 1 and 3";
Bridging lines 36 and 37, cancel "in a plant according to claims 1 and 3";
Line 45, change "air" to -- aid --.

Column 79,
Line 12, cancel "according to claims 1 and 3";
Line 31, change "particle" to
-- particles --;
Line 42, change "hence" to -- whence --;
Line 50, cancel "according to claims l and 3".

Column 80,
Line 33, cancel "according to claim 5".

Column 81,
Line 12, cancel "according to claims 1 and 3".

UNITED STATES PATENT AND TRADEMARK OFFICE
CERTIFICATE OF CORRECTION

PATENT NO.    : 6,264,738 B1
DATED         : July 24, 2001
INVENTOR(S)  : Paul Lorke and Alexander Lorke It is certified that error appears in the above-identified patent and that said Letters Patent is hereby corrected as shown below:

Column 82,
Line 57, cancel "according to claim 5";
Line 64, cancel "according to claims 1 and 3".

Column 84,
Line 4, change "ualso" to -- $\mu$m also --;
Line 28, cancel "according to claims 1 and 3";
Line 35, change "203" to -- 204 --.

Column 87,
Line 61, change "strong" to -- string --.

Column 88,
Line 37, cancel "air" (second occurrence).

Column 89,
Line 59, change "Weiz" to -- Welz --.

Column 90,
Line 47, change "component" to -- components --.

Signed and Sealed this

Twenty-ninth Day of October, 2002

Attest:

JAMES E. ROGAN
Attesting Officer         Director of the United States Patent and Trademark Office